United States Patent [19]

Miller et al.

[11] 4,208,925
[45] Jun. 24, 1980

[54] ELECTRONIC TRANSMISSION CONTROL AND METHOD THEREFOR

[75] Inventors: Robert G. Miller, East Peoria; Michael L. Render, Peoria, both of Ill.

[73] Assignee: Caterpillar Tractor Co., Peoria, Ill.

[21] Appl. No.: 823,769

[22] Filed: Aug. 11, 1977

[51] Int. Cl.² .............................................. B60K 41/04
[52] U.S. Cl. ...................................................... 74/866
[58] Field of Search ........................................ 74/866

[56] References Cited

U.S. PATENT DOCUMENTS

| | | | |
|---|---|---|---|
| 3,680,411 | 8/1972 | Ito et al. | 74/866 |
| 3,683,720 | 8/1972 | Wakamatsu et al. | 74/731 |
| 3,684,066 | 8/1972 | Kubo et al. | 74/866 X |
| 3,732,753 | 5/1973 | Olsen et al. | 74/866 |
| 3,752,011 | 8/1973 | Casey et al. | 74/866 X |
| 3,754,482 | 8/1973 | Sanders et al. | 74/752 A |
| 3,885,472 | 5/1975 | Wakamatsu et al. | 74/866 |
| 3,927,528 | 12/1975 | van der Kolk et al. | 74/865 X |
| 3,961,546 | 6/1976 | Gilmore et al. | 74/866 |
| 4,015,488 | 4/1977 | Akeso n et al. | 74/866 |
| 4,033,202 | 7/1977 | Ahlen et al. | 74/866 |

OTHER PUBLICATIONS

"Automatic Shift Control for Heavy Duty Transmissions", J. W. Schmidt, SAE Paper No. 720753, Sep. 1972.

"Electronically Controlled Semi-Automatic Transmissions for Heavy-Duty Trucks", Gerald L. Myers, SAE Paper No. 740266, Feb. 1974.

*Primary Examiner*—Leslie Braun
*Attorney, Agent, or Firm*—Phillips, Moore, Weissenberger, Lempio & Majestic

[57] ABSTRACT

A control for the automatic shifting of a multi-ratio power transmission. A memory is provided and programmed with the optimum vehicle speed shift points for upshift and downshift from each gear of the automatic range. The actual speed of the vehicle is periodically sampled, and each time it is, such speed is compared with the shift points for the gear which the transmission is in to see if a shift from such gear should be made. If it is determined from the speed sample that an upshift should be made, then the upshift speed points of higher gears are examined with reference to such speed sample to find the gear to which the transmission should be upshifted, i.e., the gear just above the highest gear having an upshift speed point which is less than the sampled speed. Having found such gear, the transmission is shifted thereto. Correspondingly, if it is determined from the speed sample that a downshift should be made (or can be made, in the event of a forced downshift condition), the downshift speed points of lower gears are examined with reference to such speed to find the gear to which a downshift should be made, i.e., the gear just below the lowest gear having a downshift speed point above the sampled speed. At any time, the operator may set any gear in the automatic range as the highest gear so that the transmission will not upshift beyond such gear.

123 Claims, 28 Drawing Figures

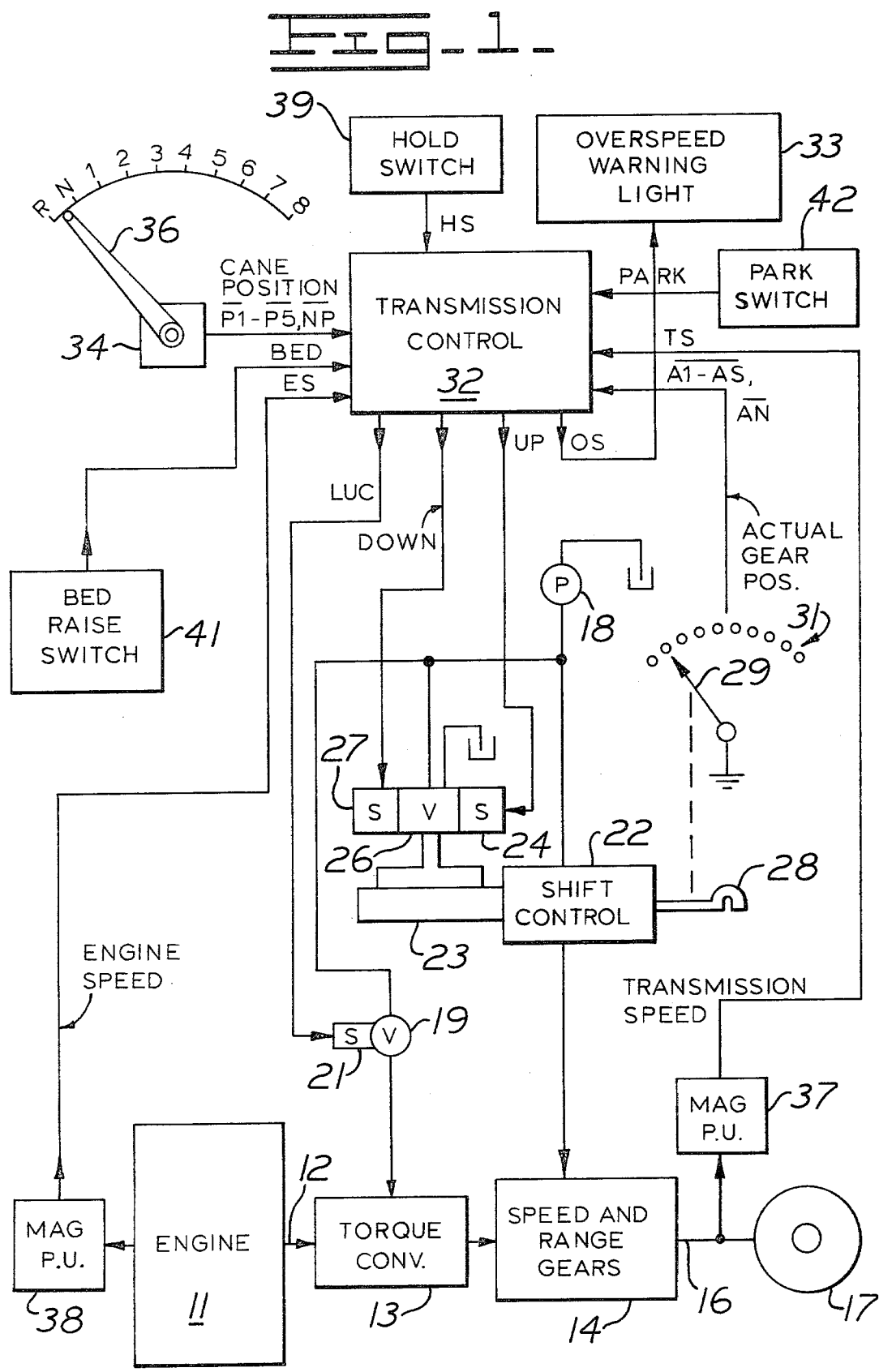
FIG_1.

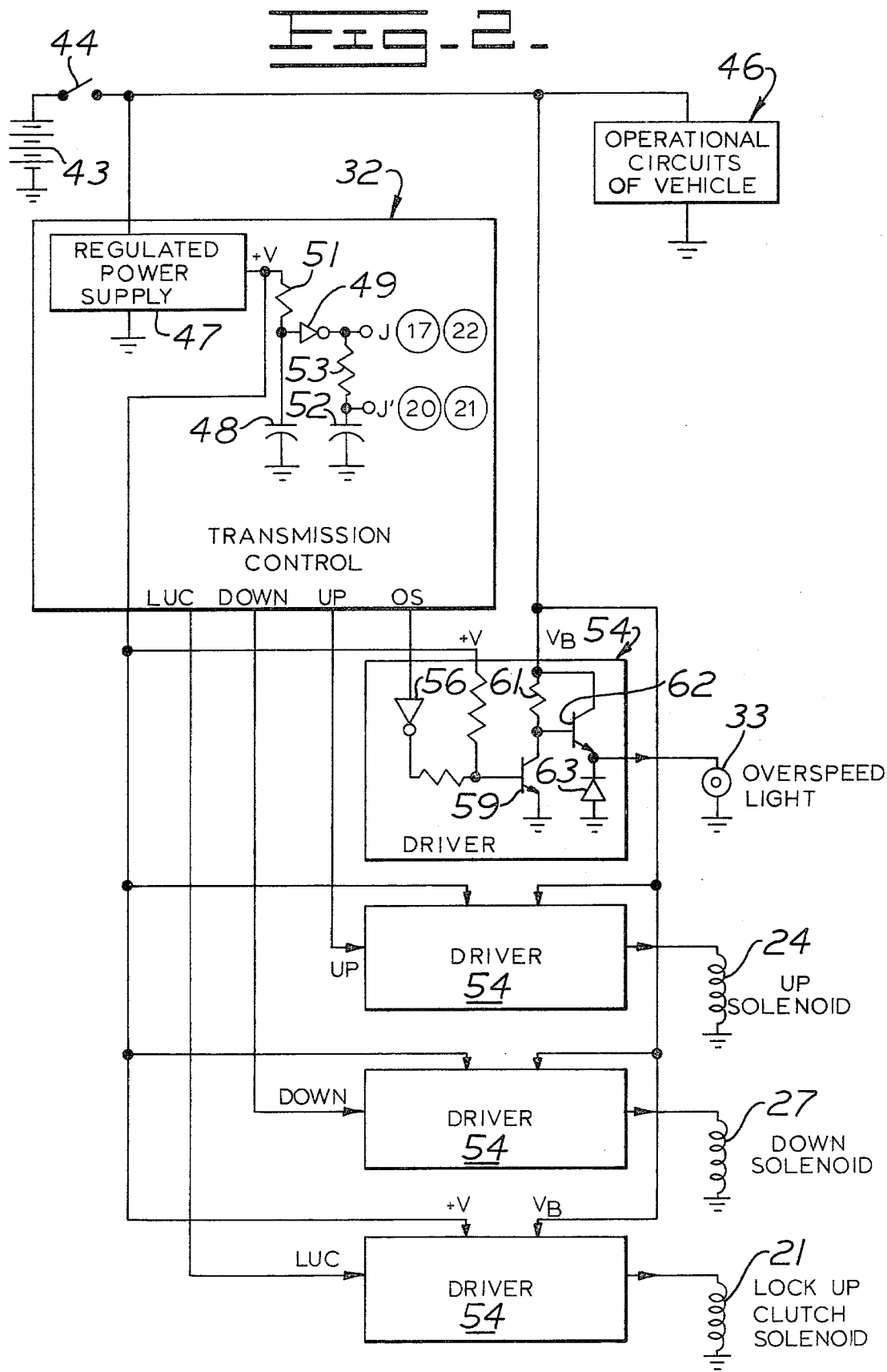

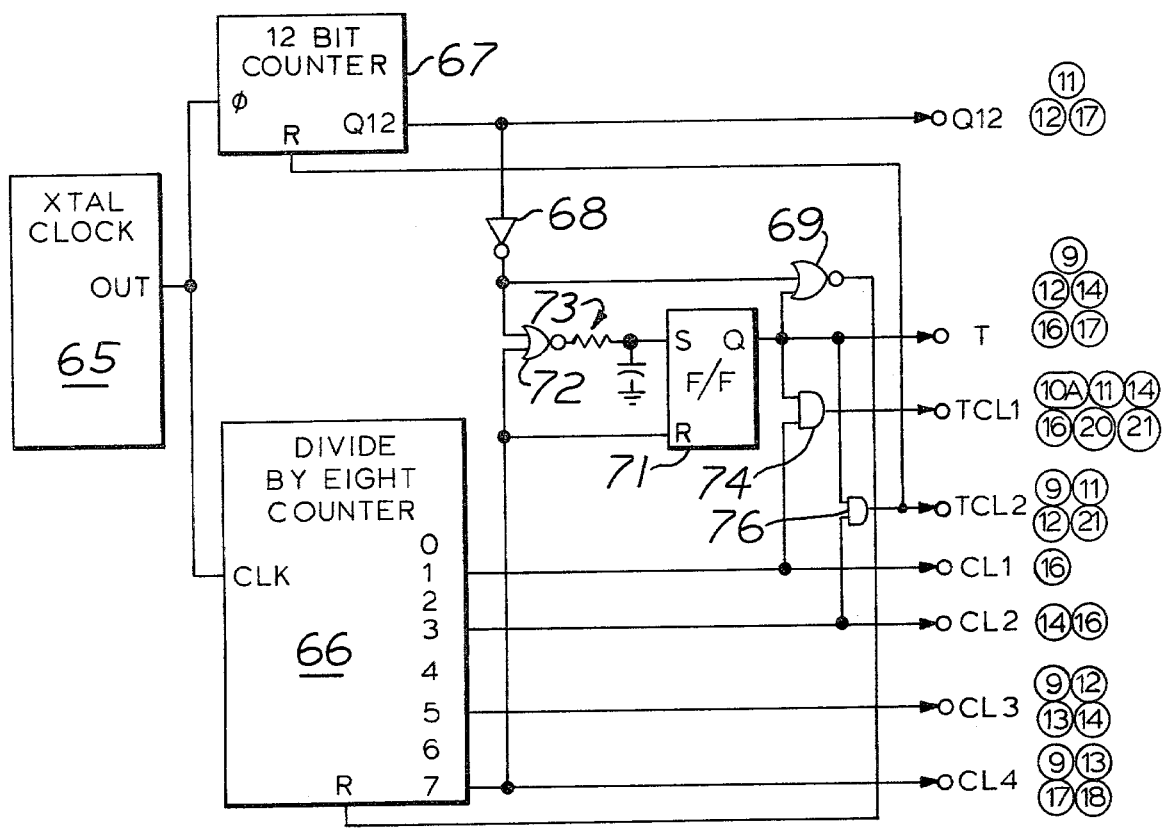
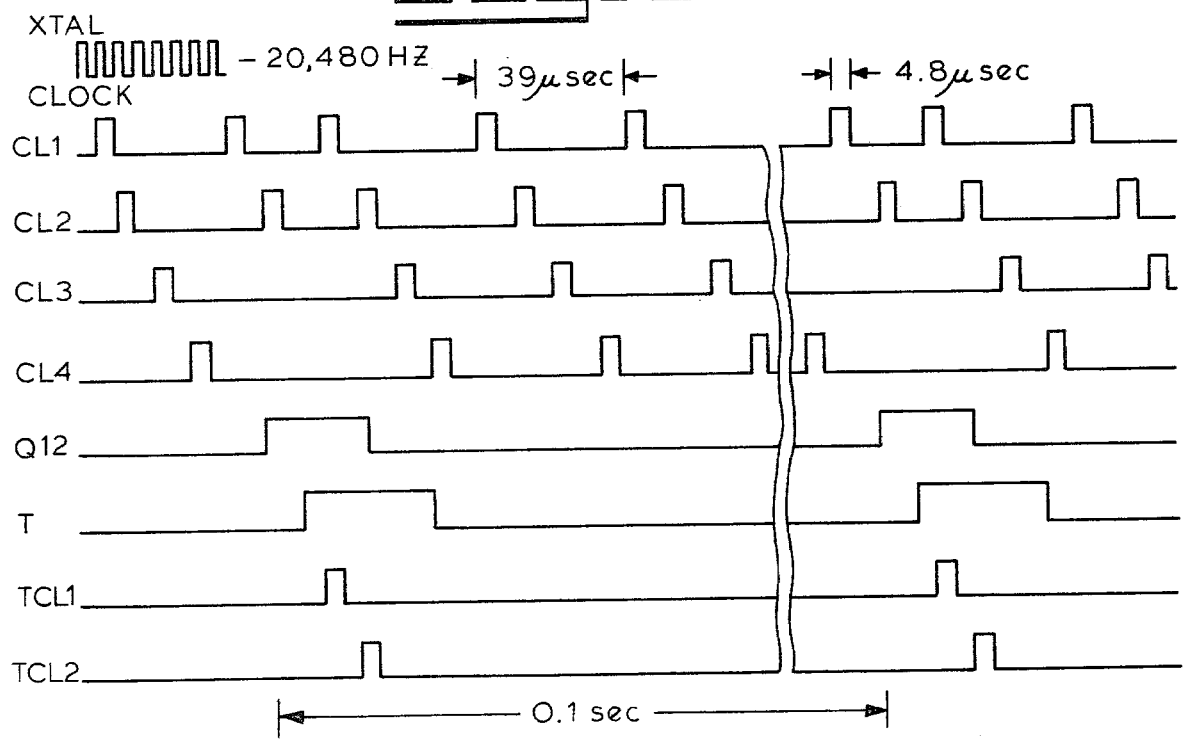

| CANE POSITION | CANE POSITION CODE | | | | | |
|---|---|---|---|---|---|---|
| | NP | P5 | P4 | P3 | P2 | P1 |
| REV. | 0 | 1 | 1 | 1 | 0 | 1 |
| NEUTRAL | 1 | 0 | 0 | 0 | 0 | 0 |
| 1 | 0 | 0 | 0 | 0 | 0 | 1 |
| 2 | 0 | 0 | 0 | 0 | 1 | 0 |
| 3 | 0 | 0 | 0 | 0 | 1 | 1 |
| 4 | 0 | 0 | 0 | 1 | 0 | 0 |
| 5 | 0 | 0 | 0 | 1 | 0 | 1 |
| 6 | 0 | 0 | 0 | 1 | 1 | 0 |
| 7 | 0 | 0 | 0 | 1 | 1 | 1 |
| 8 | 0 | 0 | 1 | 0 | 0 | 0 |

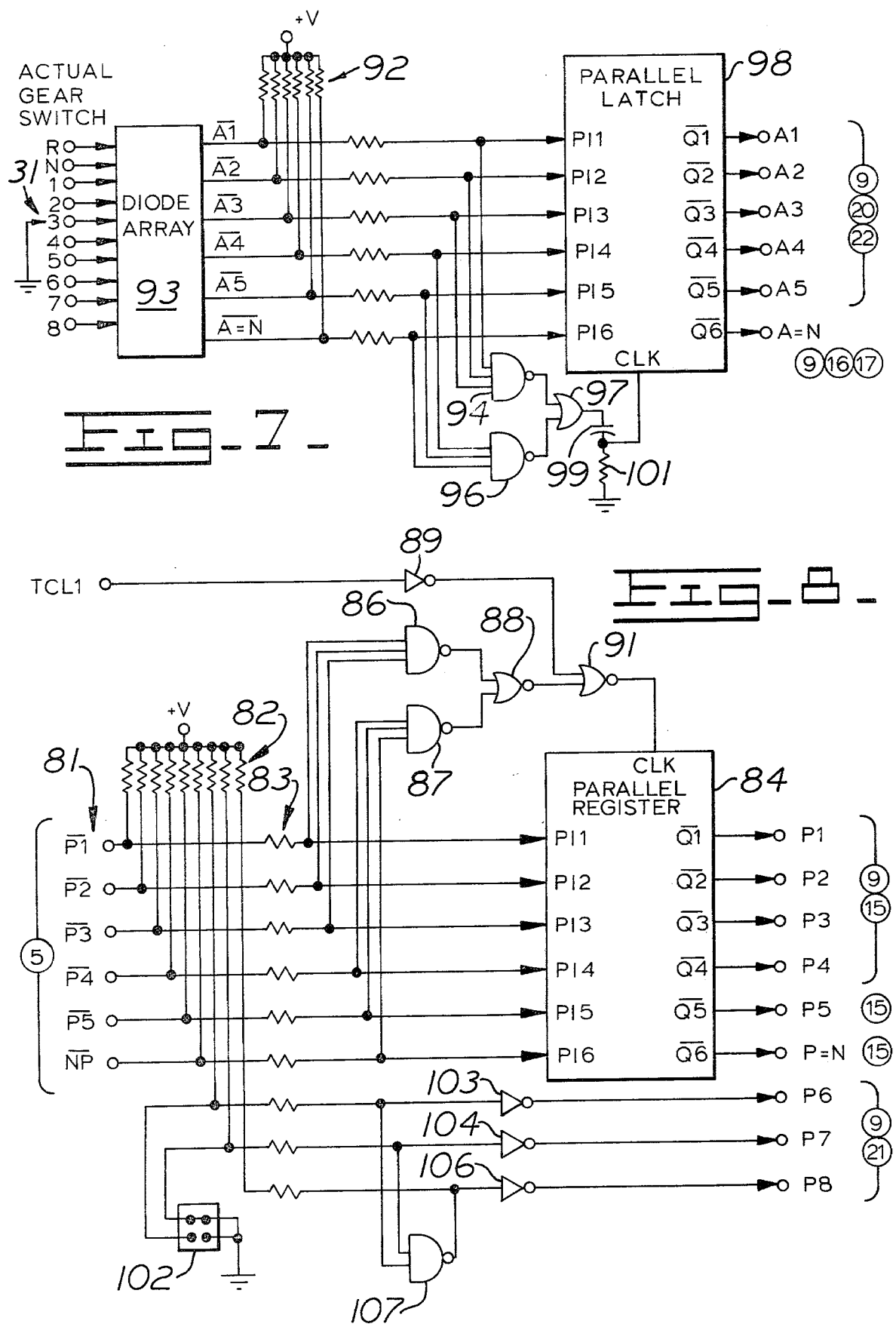

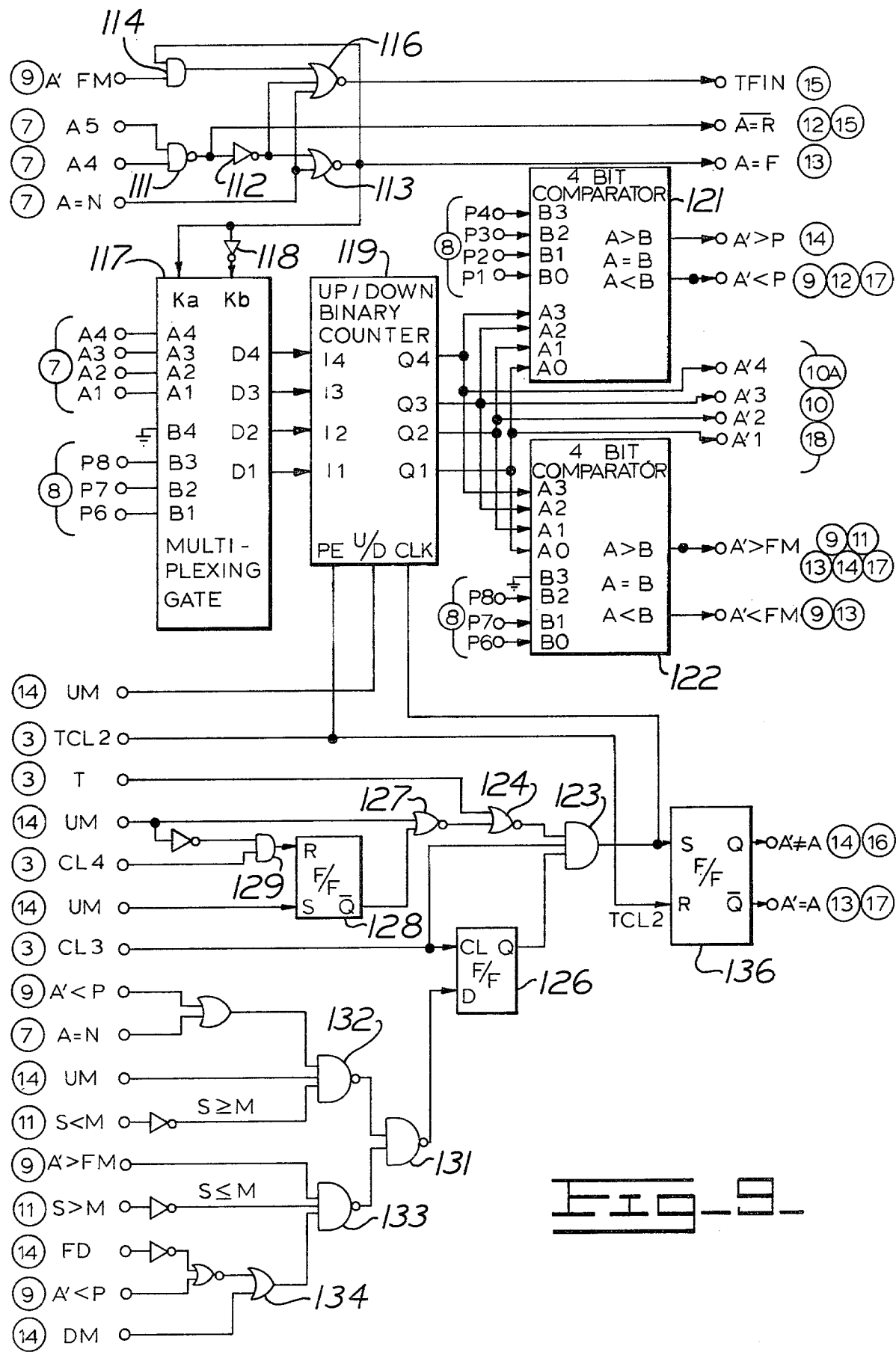

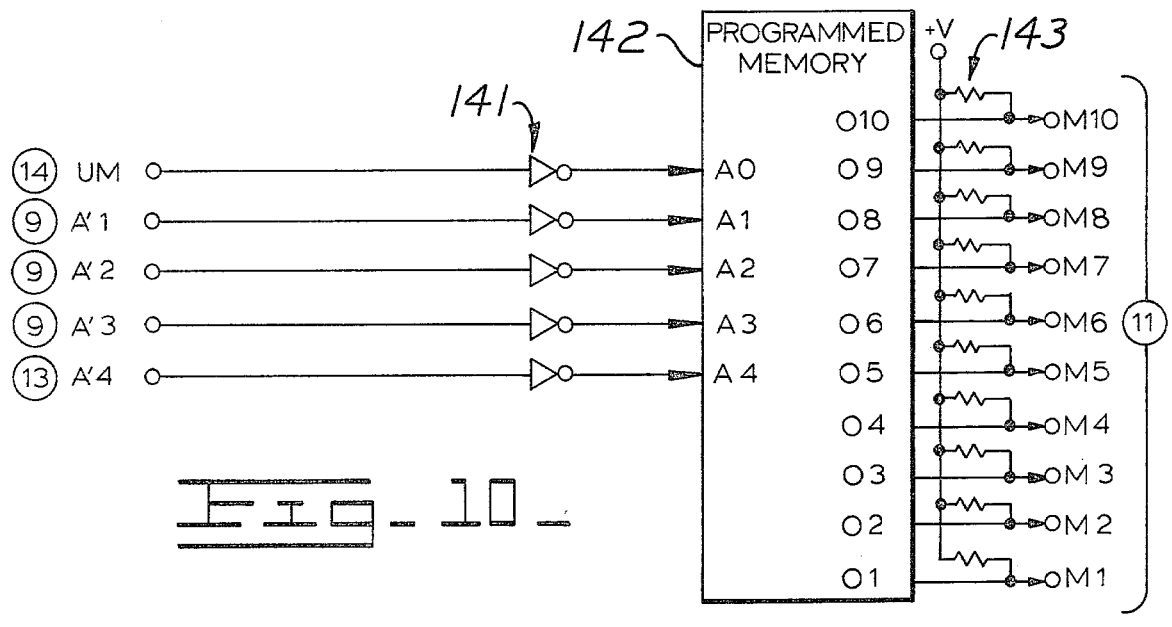
Fig. 10.
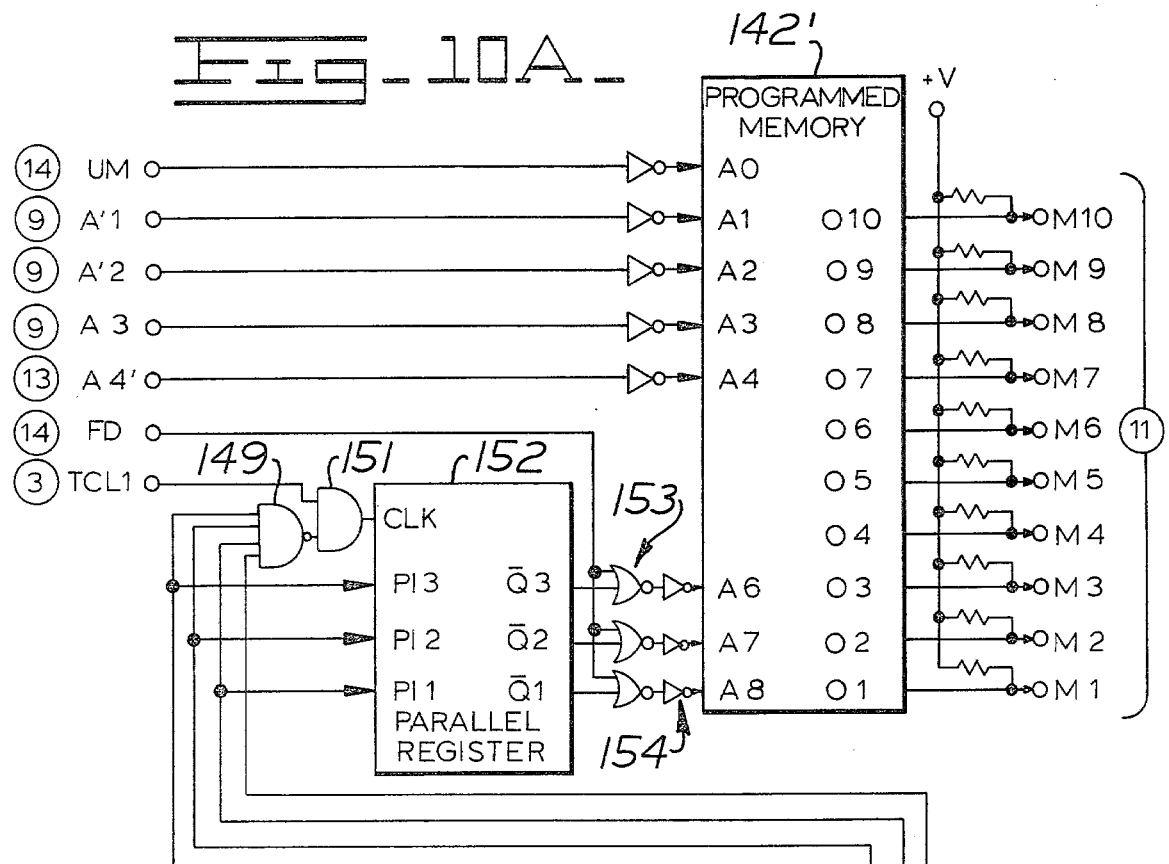
Fig. 10A.
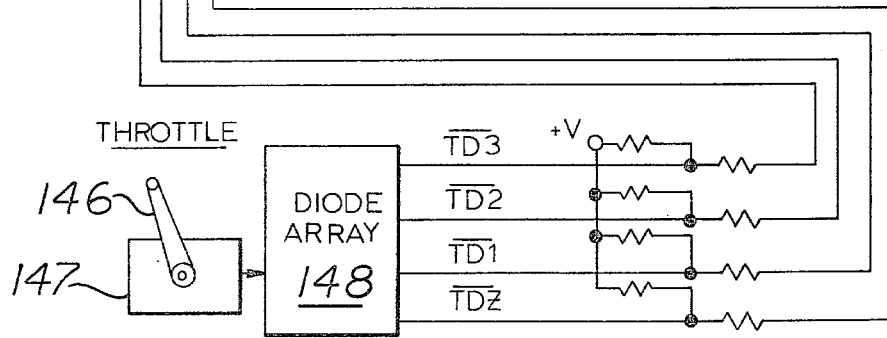

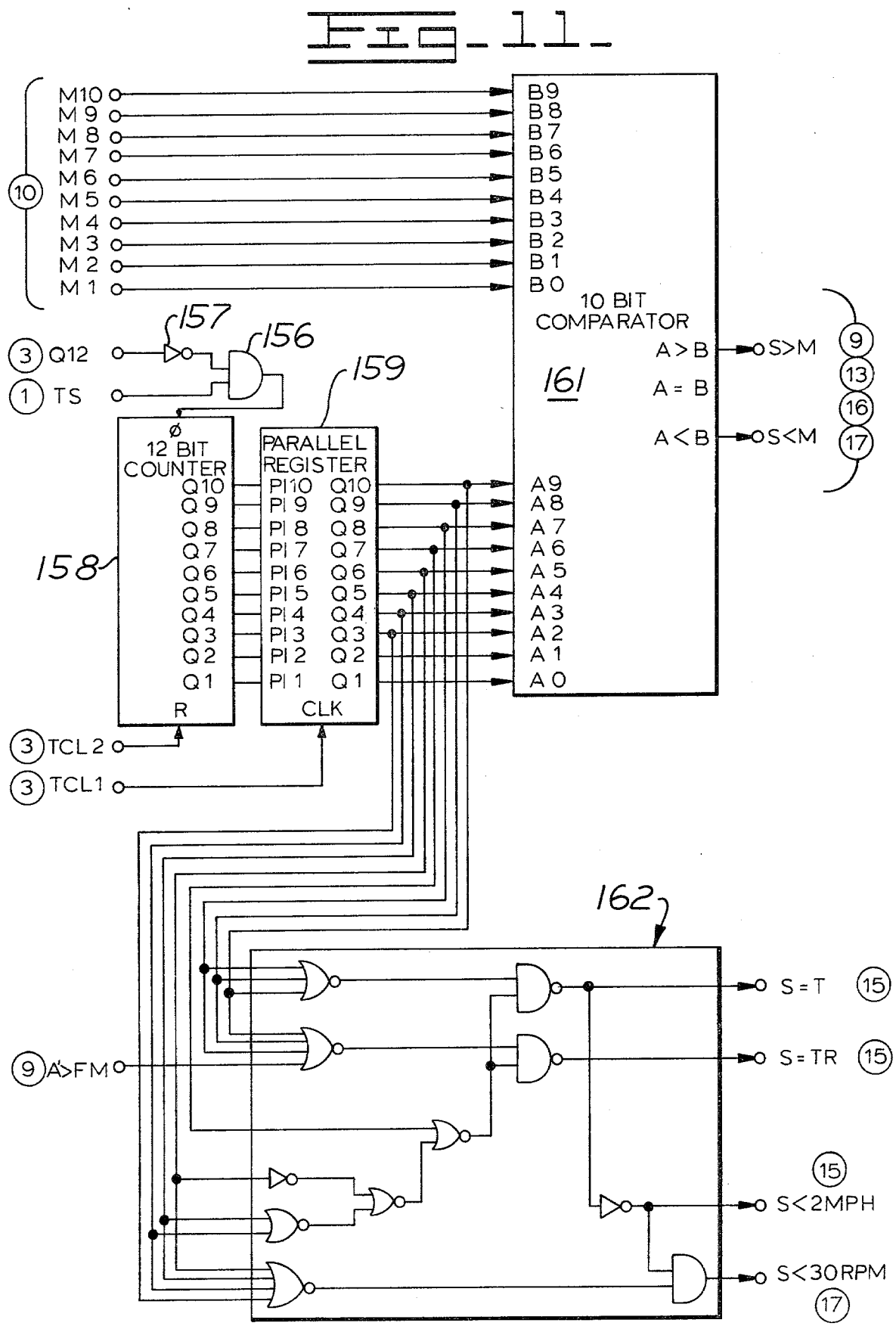

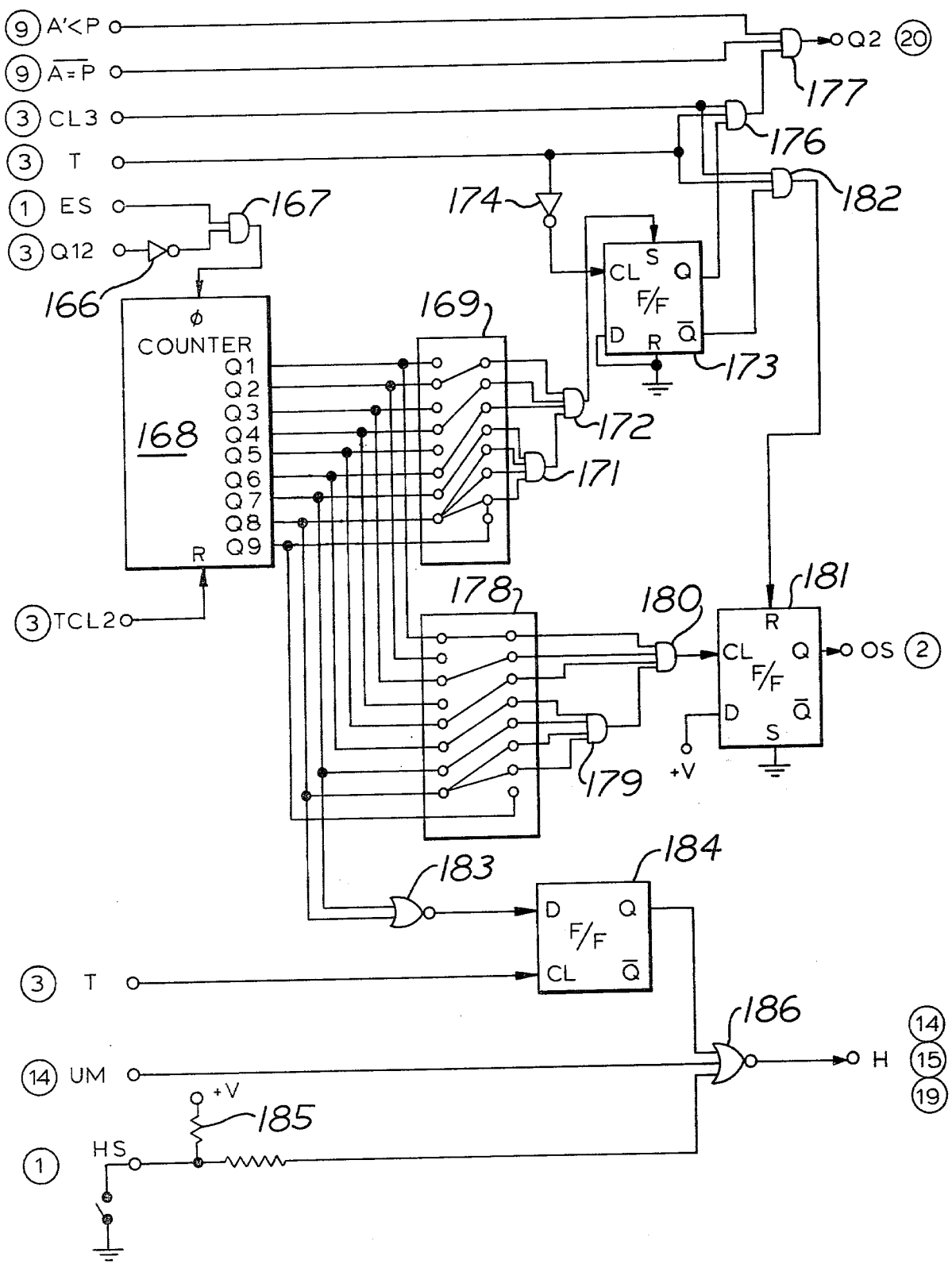
Fig_12_

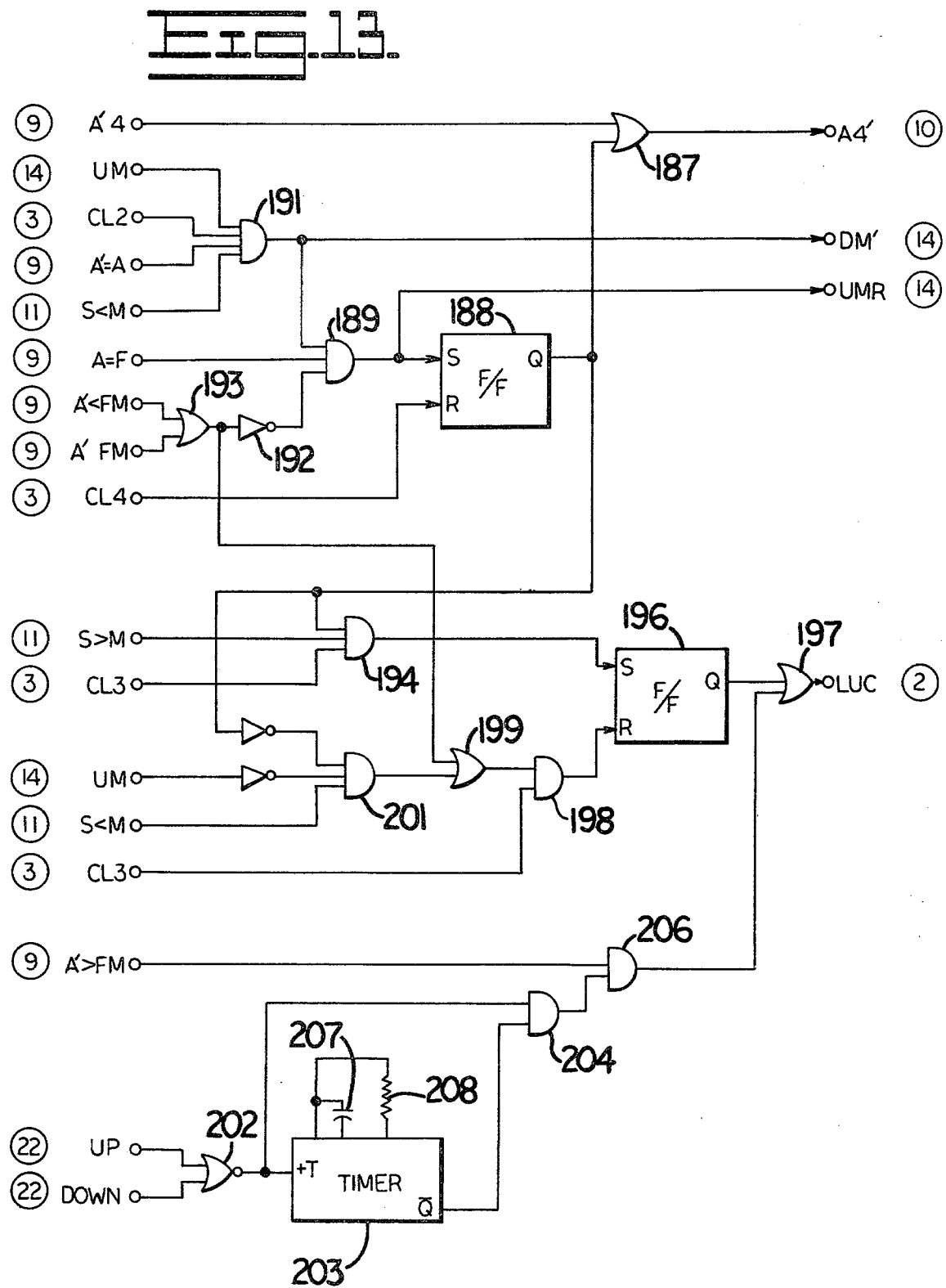

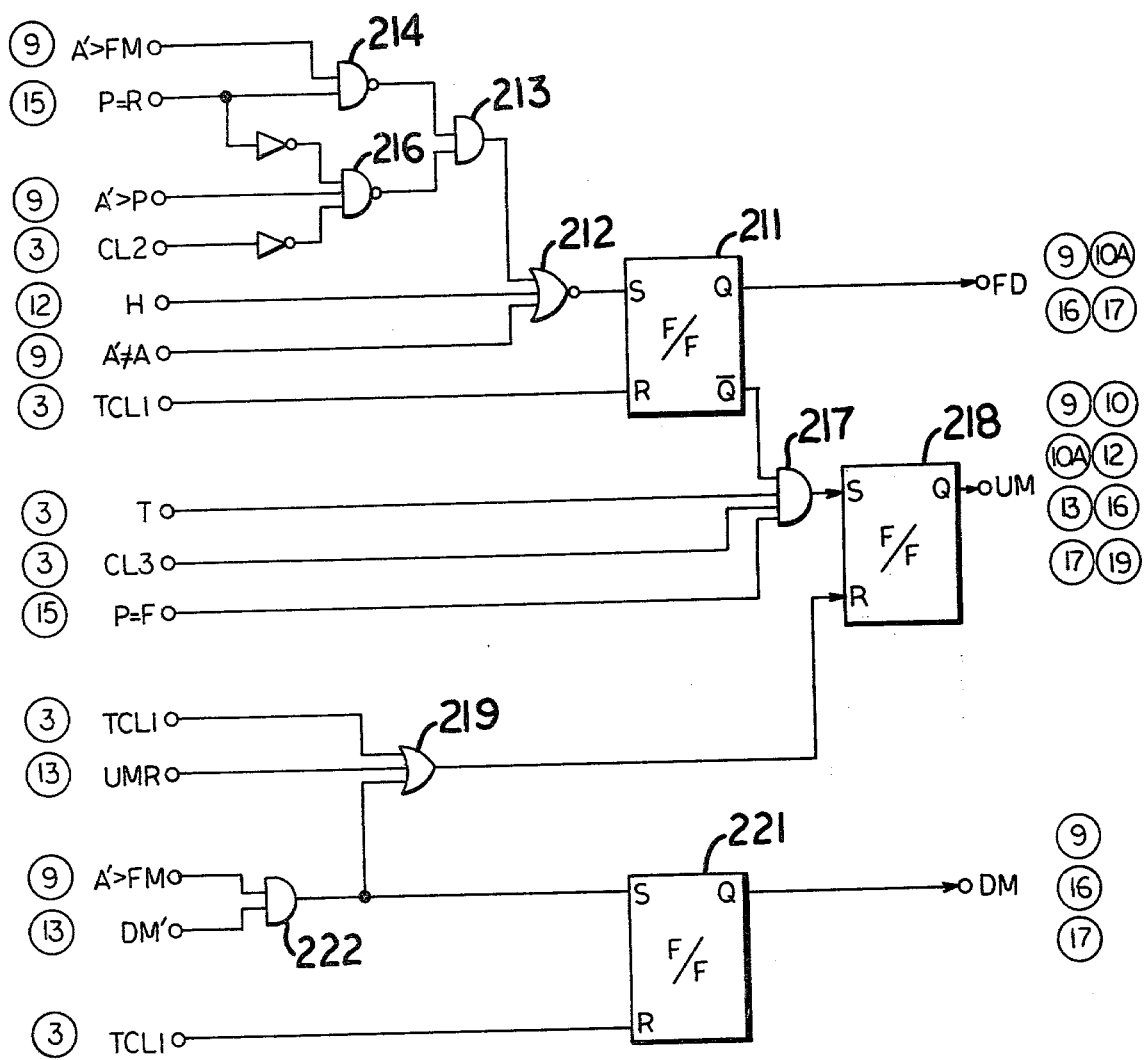

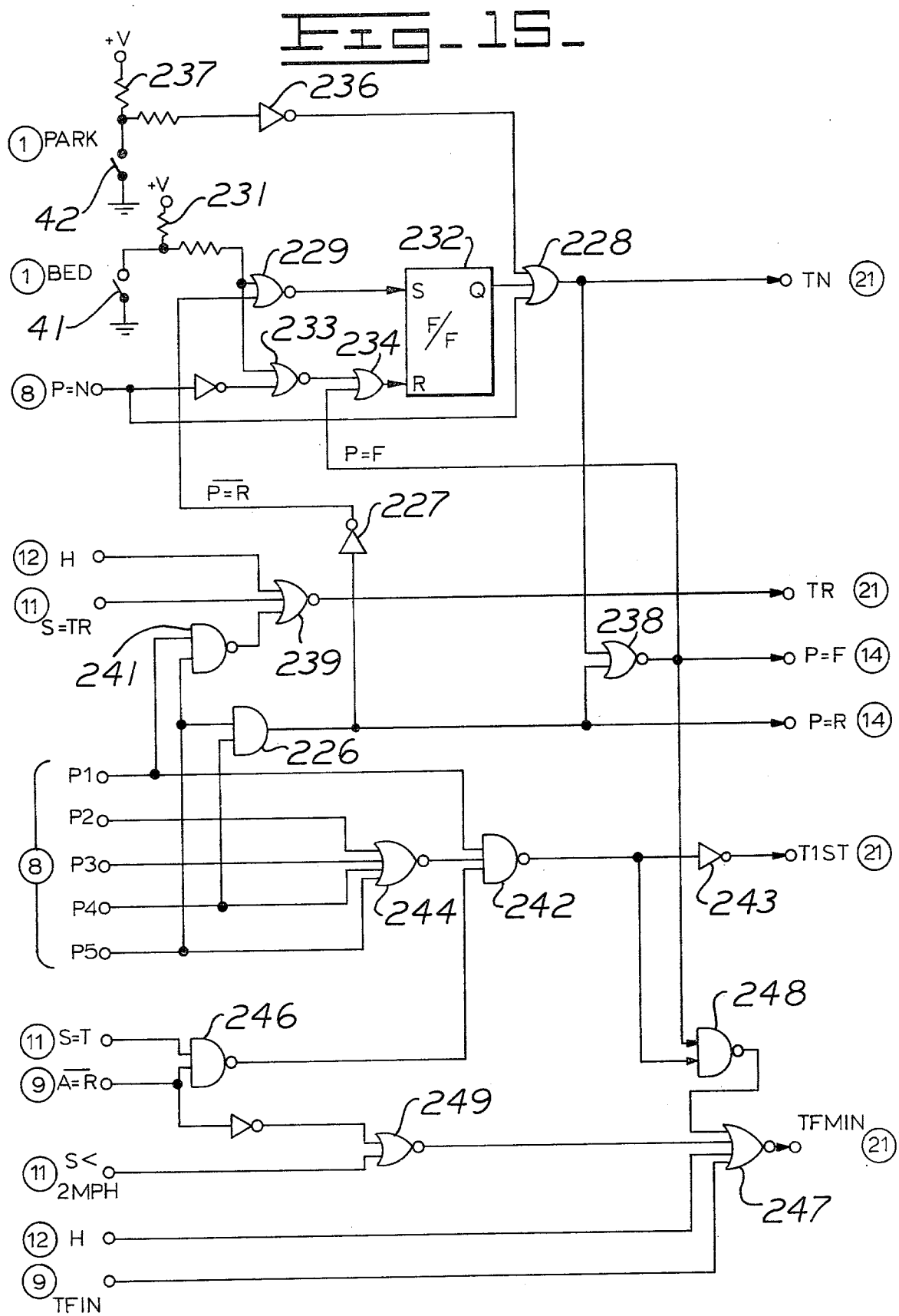

Fig_19A.

Fig_19.

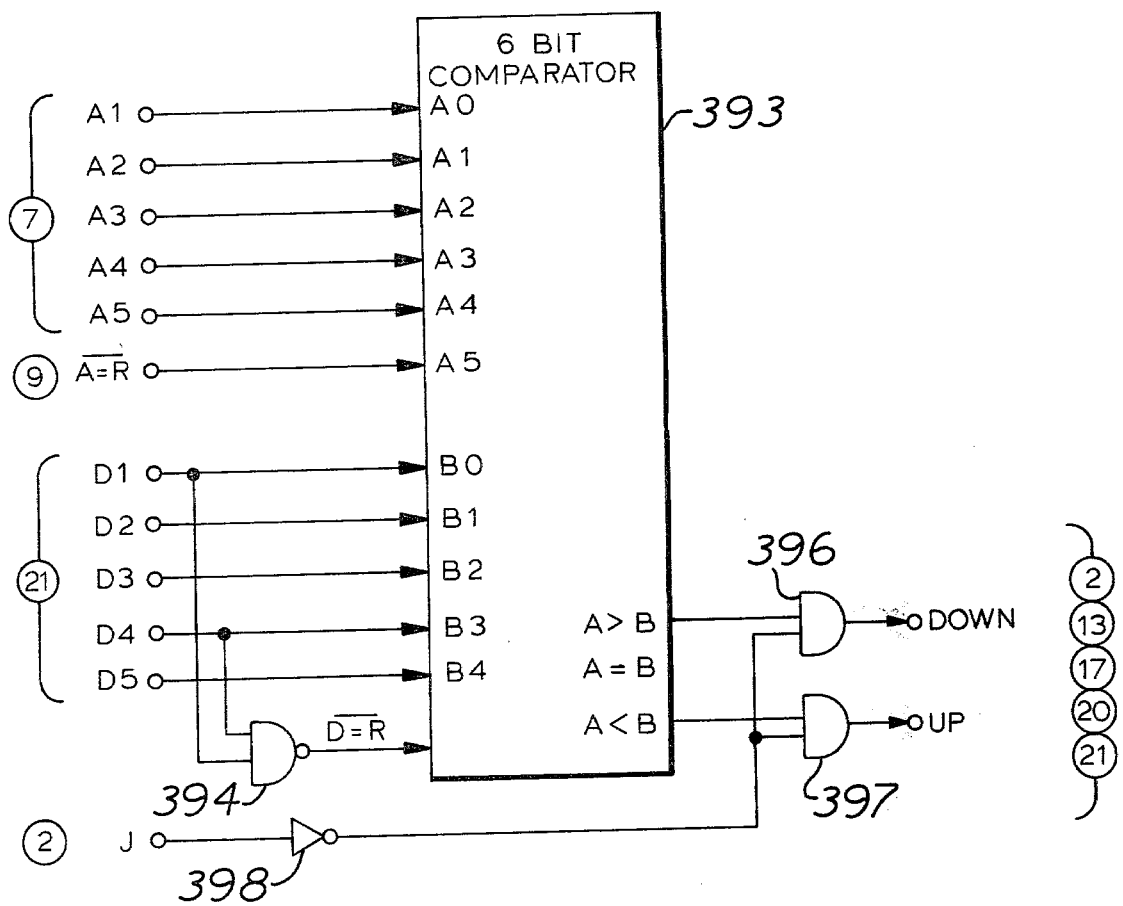
Fig-22-

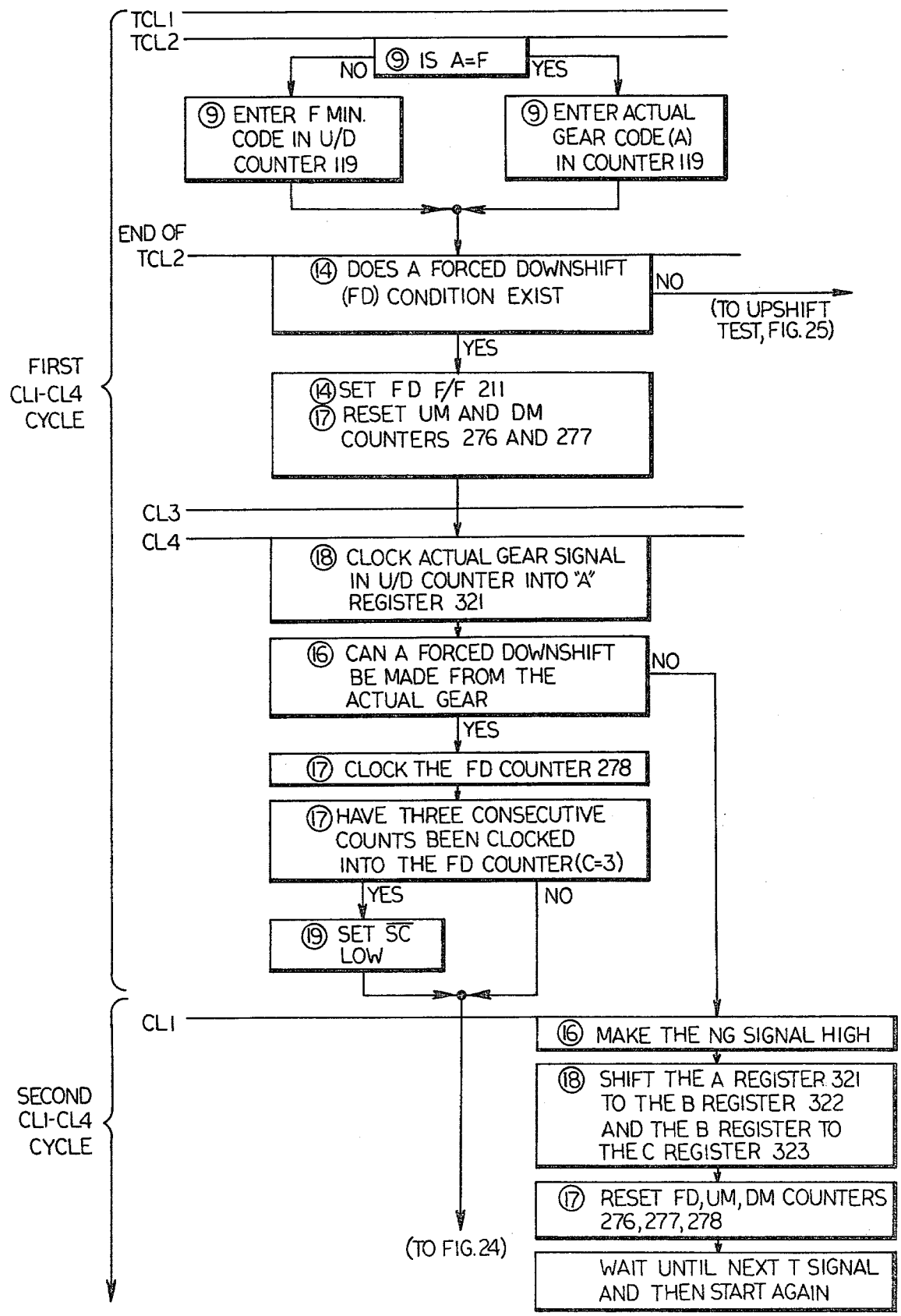

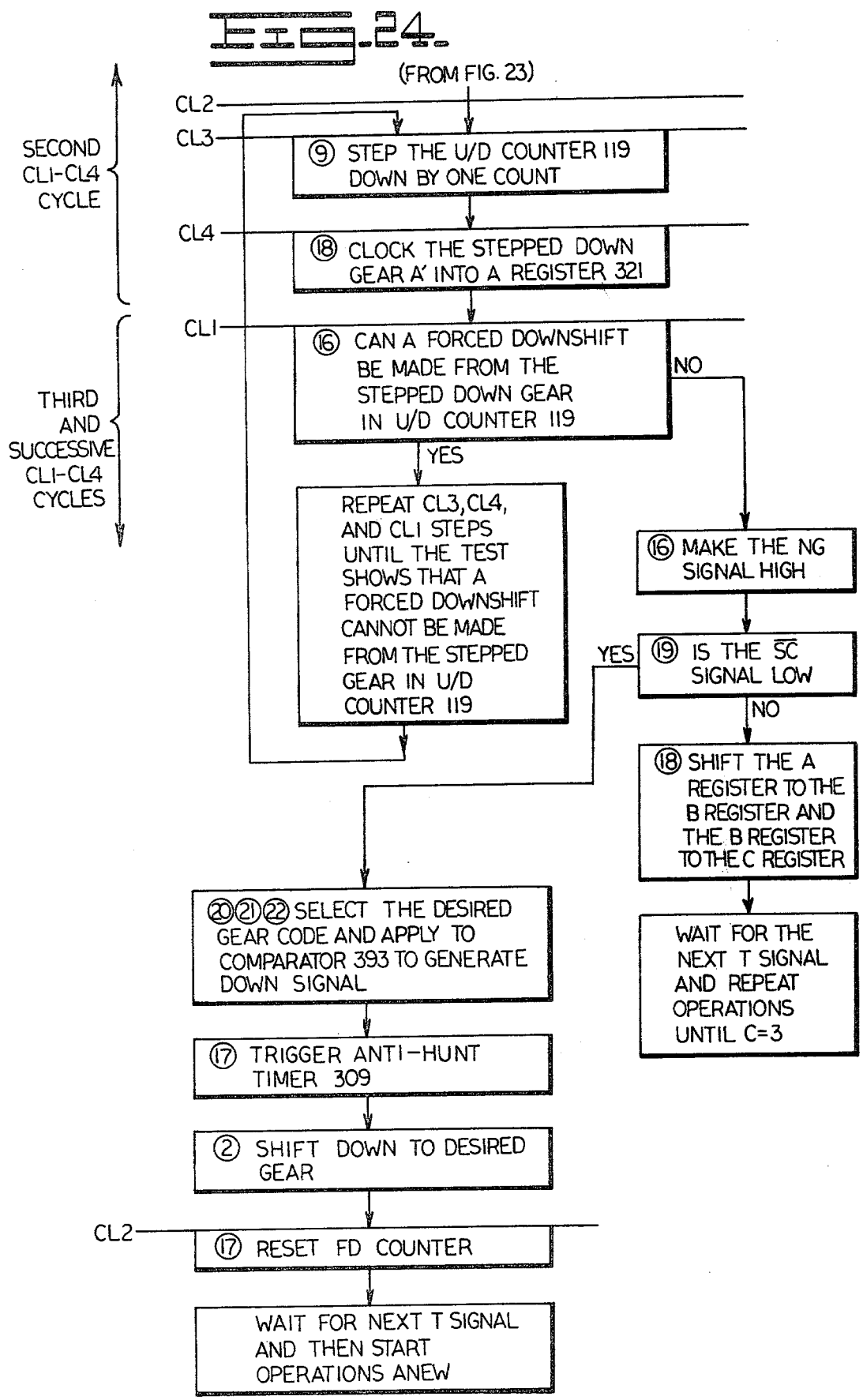

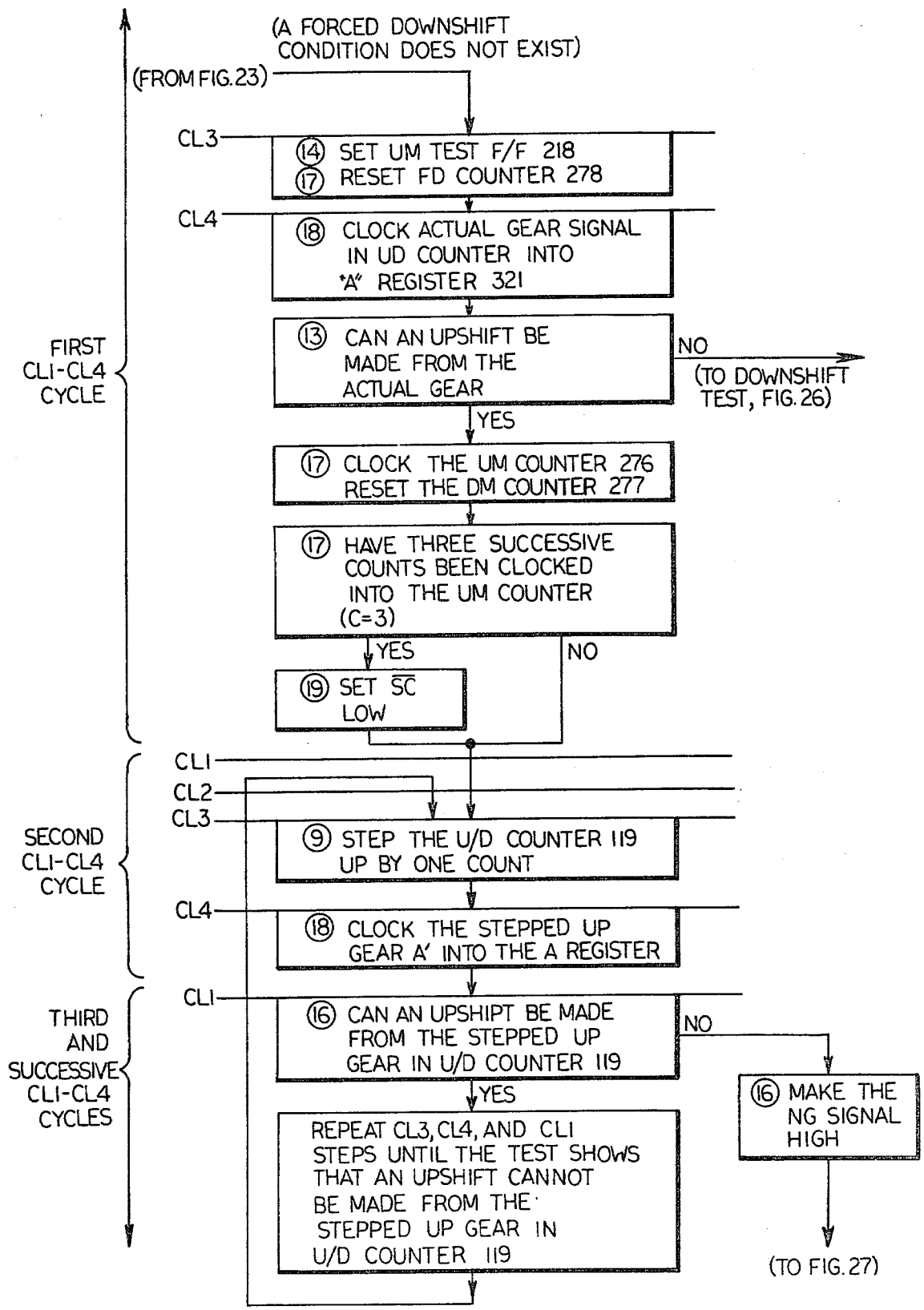

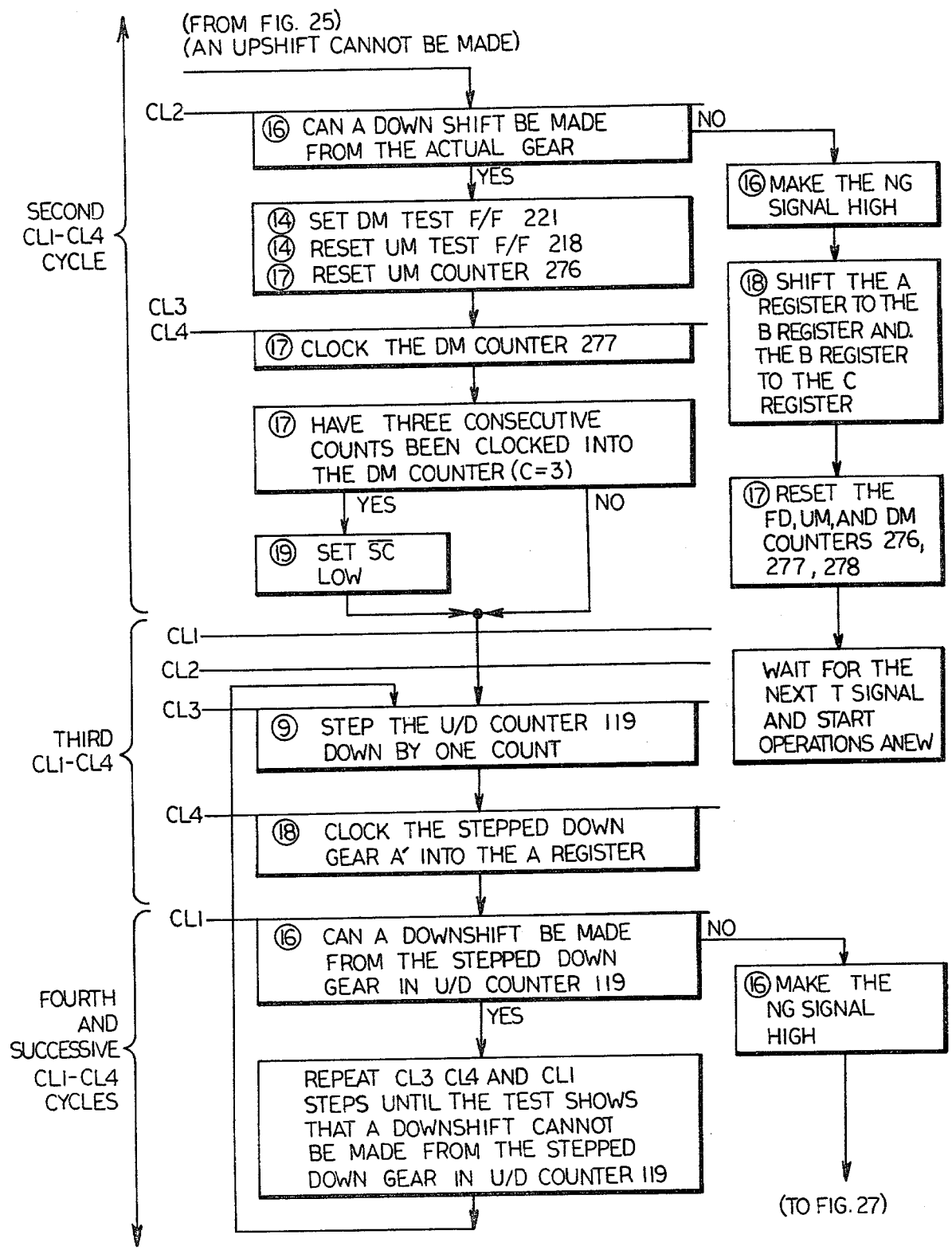

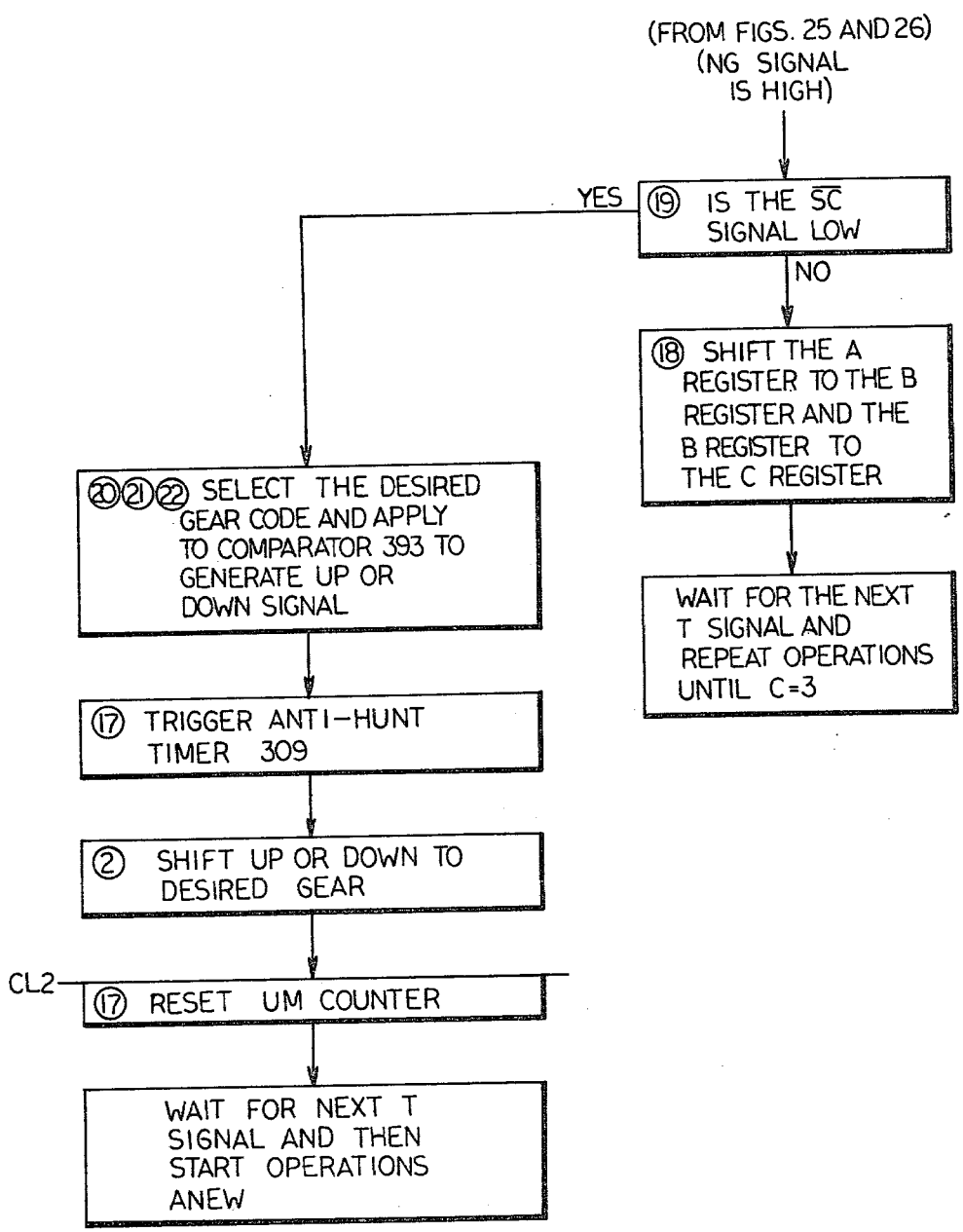

ELECTRONIC TRANSMISSION CONTROL AND METHOD THEREFOR

BACKGROUND OF THE INVENTION

This invention relates to a system for automatically controlling the shifting of a multi-ratio power transmission, such as may be used in vehicles to couple the engine to the wheels or other driving members of the vehicle.

For optimum vehicle performance, the engine should be operated to deliver maximum horsepower under all operating conditions. Particularly with Diesel engines, this requires that the engine be operated within a relatively narrow speed range, since the efficiency of the engine will drop off rapidly when operated outside of such range.

The typical transmission is designed to enable a broad range of vehicle ground speeds to be realized with the engine operating with its narrow speed range wherein the delivered horsepower is at or near maximum.

A common form of transmission, particularly for heavy-duty vehicles such as earthmoving equipment, utilizes a combination of mechanical and torque converter drive. At very low vehicle speeds, such as when the vehicle is operating in reverse or first forward gear, a torque converter is connected into the power path since it has a relatively broad torque range capability. With the torque converter in the power path, the engine can operate within a narrow speed range, and the power delivered through the torque converter will remain reasonably high for a relatively broad range of vehicle speeds. The fluid losses through a torque converter are substantial, but such losses are normally acceptable in these low ranges of vehicle speeds.

At high vehicle speeds the transmission is operated in direct drive to increase the efficiency of power throughput. For direct-drive operation, a large number of drive ratios must be provided, with the step ratios between successive speed ratios being small and preferably uniform.

Any direct-drive vehicle transmission represents a compromise. If too few drive ratios are provided, the range of engine speed for given drive ratio is undesirably broad. If too many drive ratios are provided, the bulk, complexity and cost of the transmission increases, as well as the inertia and friction losses. In addition, the control is complicated in that much more shifting is required as the vehicle speed changes. In general, as many drive ratios are provided as is practicable.

The design of a transmission should preferably be such that the range of engine speed is approximately the same for each of the drive ratios in which the vehicle is operating, both to increase the efficiency of the system and also to make the shift points more uniform. Practical considerations, however, often dictate a certain degree of non-uniformity of drive ratios.

Regardless of how well designed a transmission may be, its design will only determine the maximum efficiency that can be obtained. To achieve the maximum efficiency, up or down shifting from a particular gear, or drive ratio, must be done at definite optimum engine speeds for that particular gear.

Observations in the field show that only highly skilled operators shift gears at the proper engine speeds. Less skilled operators (and distracted skilled operators) shift gears either too early or too late, so that the engine is forced into an inefficient speed. In addition to increasing the operating costs, inefficient operation can cause undue deterioration of the equipment. Also, when auxiliary equipment, such as used on earthmoving equipment, is powered by the engine, operation of the engine at an inefficient speed can adversely affect the functioning of the auxiliary equipment either by increasing the time to complete an operational cycle or by reducing the power to such equipment to a point wherein it will not function satisfactorily.

SUMMARY OF THE INVENTION

The present invention is directed to overcoming one or more of the problems set forth above.

According to the invention an electronic control is provided for existing transmissions, which control will replace a hydromechanical control which is fully operator-dependent.

Also according to the invention the present control will provide for an automatic shifting of the transmission, upwardly or downwardly, into the proper gear ratio whenever the speed of operation in a particular gear is improper for that gear.

Further according to the invention, the range of gears in which automatic shifting will occur is easily varied by the operator by simply moving the normal gear-selector cane to the position indicating the highest gear at which he wishes to operate.

In general, the control has incorporated therein the predetermined optimum upshift and downshift points for each of the different gears of the automatic range. A speed signal is generated which is indicative of the actual speed of the vehicle, and such speed signal is compared to the shift points for the actual gear which the transmission is in, to see if an upshift or a downshift should be made from that gear. If the control determines that a shift should be made, the shift points of other gears are considered to find the optimum gear in which the transmission should be. After finding such optimum gear, the transmission is then shifted thereto.

Still further according to the invention, the actual speed of the vehicle is periodically sampled, and the speed sample is compared to the predetermined speed shift points of the gear that the transmission is in. If the speed sample is greater than the upshift speed point for the present gear, the speed sample is then compared to the upshift speed point for the next higher gear. If the speed sample is below the upshift speed point for such next higher gear, then such next higher gear is the one to which a shift should be made. However, if such speed sample is also above the upshift speed point for such next higher gear, the speed sample is then compared to the upshift speed point for the gear above that, this process is continued until a gear is found having an upshift speed point higher than the speed sample. After such gear is found, a shift thereto is made. In like manner, if the speed sample indicated a downshift should be made, progressively lower gears are sequentially considered to find the first one having a downshift speed point lower than the speed sample, and a shift to such gear is made.

In more particular, the control has a memory programmed with the vehicle speed for each gear in the automatic range at which an upshift should be made therefrom and the vehicle speed at which a downshift should be made therefrom. At repeated intervals, a speed signal is generated which is indicative of the instantaneous speed of the vehicle, and such speed signal is compared with the programmed upshift and downshift speeds for the gear the transmission is in. If the vehicle speed is below the upshift speed point and above the downshift speed point for such gear, then this indicates that the present gear is proper and the control waits for the next speed signal. If the speed signal is greater than the upshift speed point, the speed signal is then compared with the upshift speed points of higher gears to find the highest gear to which a shift should be made, namely, the first one we come to wherein the actual present speed is less than the upshift speed point. An upshift shift is then made to such gear. Contrarily, if the speed signal was less than the downshift speed point for the present gear, the downshift speed points of lower gears are examined to find the first one we come to wherein the actual present speed is greater than the downshift speed point therefor. A downshift is then made to such gear.

Further according to the invention, the operator may select, at any time, the highest gear to be included in the automatic range. The control will then operate to thereby prevent automatic upshifting to beyond that gear. Likewise, the lowest gear of the automatic range may be preselected and the control will prevent automatic downshifting to below that gear.

Further according to the invention, at any time while operating in the automatic range the operator may command a forced downshift by moving the gear-selector cane to a gear position lower than that in which the transmission is. The periodically ascertained vehicle speed is again compared to the downshift speed point of the present gear to see if a downshift can be made, and forced downshifting is delayed until such time as the vehicle speed is below the downshift speed point.

Also according to the invention and to ensure that a shift should be made, the control considers each successive speed signal to determine if a shift from the present gear should be made. An upshift is not made unless a predetermined number of consecutive speed signals each indicates an upshift should be made. Likewise an automatic or forced downshift is not made unless a predetermined number of consecutive speed signals each indicates an automatic or forced downshift, as the case may be, should be made.

Still further according to the invention, wherein a predetermined number of consecutive tests each indicate a shift should be made, the gears which each of the tests indicate a shift should be made to are considered. If the gears differ, the most appropriate one is selected as the one to which the shift is to be made.

Yet further according to the invention, when the transmission is operating in the minimum forward automatic gear, the periodic speed signals are compared with a predetermined speed to cause operation in torque converter drive or in direct drive when the vehicle speed is below or above such predetermined speed, respectively.

Also according to the invention, when operating in the automatic range, the transmission will be automatically and immediately upshifted one gear (but not past the gear selected by the operator as the highest gear of the automatic range) in the event of an engine overspeed condition.

Still further according to the invention, when operating in the automatic range, the control will operate to put the transmission in torque converter drive when a shift of the transmission is being made.

In further accordance with the invention, provision is made so that the operator may override the automatic operation and operate in a manual mode, i.e., in reverse, neutral, first or minimum automatic gear only. If while operating in automatic mode the operator shifts to neutral, an immediate shift to neutral will be made. If while operating in the automatic mode the operator shifts to reverse, first or minimum automatic gear, the transmission will continue in the automatic mode as it downshifts, and will not shift to the demanded gear until the vehicle speed permits.

Further objects, advantages and statements of the invention will be set forth in the course of the following detailed description.

BRIEF DESCRIPTION OF THE DRAWINGS

In the drawings forming a part of this application, and in which like parts are designated by like reference numerals throughout the same, FIG. 1 is a block diagram of a transmission system for a vehicle and the control therefor, FIG. 2 is a circuit diagram of the electrical power circuit of the vehicle and for the transmission control, FIG. 3 is a circuit diagram of the timing portion of the transmission control, FIG. 4 is a time chart of the timing signals of FIG. 3, FIGS. 7 and 8 are circuit diagrams showing the manner in which the actual gear and cane position codes are entered and latched into the transmission control, FIG. 9 is a circuit diagram of the portion of the transmission control wherein the actual or stepped gear is compared to the cane position and minimum automatic gear, FIG. 10 is a circuit diagram of the programmed speed memory of the transmission control, FIG. 10A is a modification of the transmission control showing throttle demand signals also addressed into the memory, FIG. 11 is circuit diagram of the portion of the transmission control wherein actual transmission speed signals are generated and compared with desired shift points, FIG. 12 is a circuit diagram of the portion of the transmission control wherein actual engine speed signals are generated and compared with overspeed values, FIG. 13 is a circuit diagram of the transmission control portion wherein the lock-up clutch signal is generated, FIG. 14 is a circuit diagram of the portion of the transmission control wherein the signals are generated for forced downshift, upshift and downshift testing, FIG. 15 is a circuit diagram of the portion of the transmission control wherein the manual control command signals are generated, FIG. 19A is a chart of the logic results of FIG. 19, FIG. 22 is a circuit diagram of the transmission control portion wherein the signals for controlling the up and down solenoids are generated, FIGS. 23-27 are timing charts illustrating the sequence of operations when operating in automatic shifting mode.

DESCRIPTION OF THE PREFERRED EMBODIMENT

Figures 5, 6:
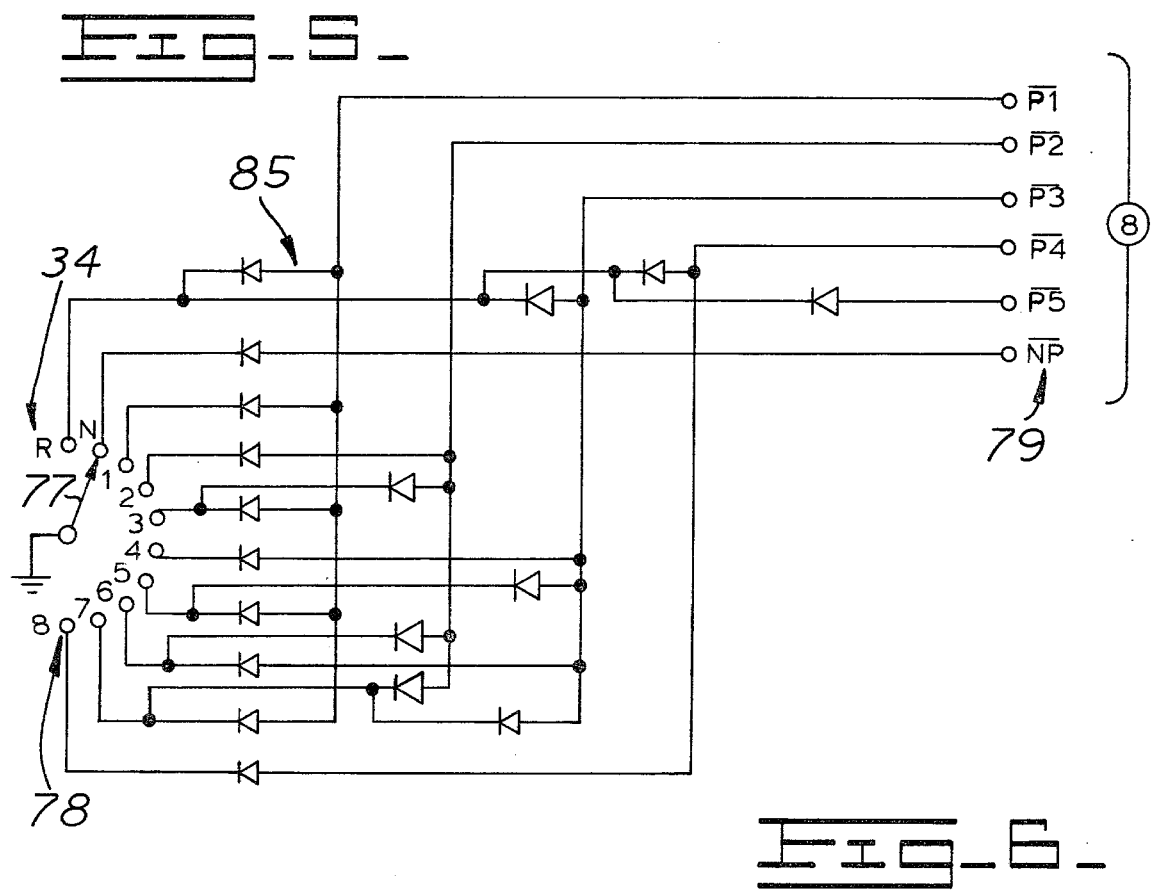
FIG. 5 is a circuit diagram of the cane switch and diode array therefor.
FIG. 6 is a chart showing the coding used in the transmission control.

Referring now to the drawings, FIG. 1 illustrates a typical vehicle system having an engine 11 whose output shaft 12 is applied through a torque converter unit 13 to the input of the speed and range gear unit 14. The output of the gear unit is connected to transmission shaft 16 to drive the wheels 17, or other ground-engaging member of the vehicle. Typically, the torque converter unit 13 and gear unit 14 are actuated by hydraulic fluid under pressure from pump 18. When valve 19 is closed, the engine output 12 will be applied through a conventional torque converter to the gear unit 14. When lock-up clutch solenoid 21 is energized, valve 19 will open to apply fluid pressure to the lock-up clutch in the torque converter unit 13 to provide a direct mechanical drive through the torque converter unit from the engine to the gear unit. Also typically, shift control 22 has an axially movable spool valve therein to direct hydraulic fluid to the various clutches in the gear unit in accordance with the spool position so that the proper gear ratio between the input and output of the gear unit is obtained.

In the particular embodiment shown and described herein, gear unit 14 has one reverse speed, eight forward speeds and a neutral position wherein the transmission shaft 16 is disengaged from the engine. The spool valve of shift control 22 will have a discrete position for each of the ten gear arrangements. A hydraulic actuator 23 is provided for the shift control, actuator 23 having a piston connected to the valve spool. When the up solenoid 24 is energized, valve 26 will be actuated to supply pressure fluid to actuator 23 to move the spool valve of shift control 22 in a direction to cause the gears in gear unit 14 to shift upwardly to a higher gear. Conversely, energization of the down solenoid 27 will cause the gear unit to downshift. Shift control unit 22 has an arm 28 connected to the spool for reciprocal motion therewith, arm 28 being coupled to the movable arm 29 of a ten-position switch 31 so that one and one only of the terminals of switch 31 will be grounded for each of the ten positions of the valve spool and thus for each of the ten gear positions.

An example of a multi-speed transmission with torque converter and direct drive is shown in U.S. Pat. No. 4,004,473.

The transmission control 32 of the present invention is utilized to energize the lock-up clutch solenoid 21 and the up and down solenoids 24 and 27 to control the application of power from engine 11 to transmission shaft 16 and wheels 17 in accordance with the information inputted into the transmission control. The transmission control will also cause the overspeed warning light 33 to be energized in the event of engine overspeed.

Information from seven different sources are fed into the transmission control 32. One of the primary sources of information for the control comes from cane switch 34 which is coupled to the operator-controlled gear selector cane 36 to provide an indication of the particular position of the cane.

The transmission control 32 provides for manual mode and automatic mode operation, depending upon the position of cane 36. If the operator moves the cane to reverse, neutral or first gear, the control will operate in manual mode and will generate signals to put the transmission in those positions. The neutral signal will have absolute priority over the automatic mode signals. The first forward and reverse signals will have priority provided the transmission speed is less than a minimum value (e.g., 2 mph). If the cane is moved into a higher-gear position the control will operate in automatic mode, with shifting occurring automatically, up or down, in a range from the minimum automatic gear to the maximum gear selected by the operator. For example, if the control 32 is set such that the minimum automatic gear is second gear and the operator has moved the cane 36 to sixth gear, the transmission will automatically shift up or down, within this range, in accordance with the speed of transmission shaft 16. With the cane in sixth position, the gears will not shift up to seventh or eighth position nor shift down to below the minimum automatic gear.

Another primary source of information is the gear switch 31 which furnishes the transmission control with the position that the gears are actually in at any given moment.

The third primary source of information comes from the magnetic pick-up 37 which is coupled to transmission shaft 16. Such a pick-up may comprise a toothed or magnetized gear fixed to the transmission shaft for rotation therewith, with a stationary read head positioned adjacent the teeth. The pick-up will then output a pulse as each gear tooth passes the read head, with the number of pulses per unit time providing a direct sensing of the speed of rotation of the shaft.

Four secondary sources of information to the transmission control are provided. First, a magnetic pick-up 38 is coupled to the engine to provide a pulse source whose frequency varies directly with engine speed. Secondly, an operator-controlled hold switch 39 is provided. By operation of this switch the vehicle operator may inhibit shifting of the transmission and hold it in the gear that it is in. Thirdly, a bed switch 41 may be provided on those vehicles which have beds that are raised for dumping, the switch being actuated by a raising of the bed. Such signal is used in the present control to put the transmission in neutral in case the bed is raised when the transmission is in reverse. Fourthly, a park switch 42 is coupled to the parking brake, such switch being actuated when the parking brake is set, the signal being used to put the transmission in neutral.

The information signals fed to the transmission control, as well as the signals generated and used within the control, are identified and set forth in Table I immediately preceding the "Operation" section of this application.

FIG. 2 illustrates the power circuits of the vehicle, wherein battery 43 is connectable through main disconnect switch 44 to supply a voltage $V_B$ to the operational circuits 46 of the vehicle and to the regulated power supply 47 of the transmission control, the latter producing a regulated voltage $+V$ for operation of the transmission control circuits.

Power-up signals J and J' are produced here. When power is first applied and voltage $+V$ is developed, capacitor 48 is initially uncharged so that inverter 49 outputs a high J signal. When capacitor 48 charges sufficiently through resistor 51 so that the voltage at the input of inverter 49 rises above the transfer point, the inverter output will go low and will stay low as long as voltage $+V$ remains. When the output of inverter 49 is first high, capacitor 52 will begin to charge through resistor 53, and when capacitor 52 has charged sufficiently an operative J' signal is produced. The J' signal will end when the output of inverter 49 goes low, i.e., at the same time that the J signal ends. These power-up signals are utilized in the circuits of FIGS. 17, 20–22, as indicated in the circled numbers. Circled numbers are used throughout the drawings to indicate the figures wherein signals are sent or from where they are received.

FIG. 2 also illustrates the driver-amplifiers 54 for the overspeed light 33, and the up, down and lock-up clutch solenoids 24, 27 and 21. Each driver-amplifier 54 is the same and only one is illustrated in detail. When the overspeed signal OS goes high, inverter 56 will output a low and turn off transistor 59 so that current through resistor 61 will not go through transistor 59, but will turn on power transistor 62, allowing the overspeed light 33 to be energized by battery voltage $V_B$. Diode 63 provides for discharge of an inductive load when transistor 62 is turned off in response to loss of the initiating signal to the driver.

FIG. 3 illustrates the generation of the timing signals for the transmission control. Free-running pulse generator 65, oscillating at a frequency of 20,480 Hz, has its output connected to the clock input of divide-by-eight counter 66 and also to the $\phi$ input of 12-bit counter 67.

Counter 66 will separately output four different clock pulses, CL1, CL2, CL3 and CL4 each approximately 4.8 μsec in duration and non-overlapping as shown in the timing chart, FIG. 4. Each of these clock pulses will be generated 256 times in a 0.1-second cycle of operation.

Counter 67 will require 2048 pulses from pulse generator 65 before its Q12 output goes high, i.e., it will take 0.1 seconds for this to occur. The Q12 signal, inverted by inverter 68, is applied to NOR gate 69, together with the normally low Q output of flip-flop 71 to cause the output of gate 69 to go high and reset the divide-by-eight counter 66.

The inverted Q12 signal and the low CL4 signal are also applied to NOR gate 72 causing its output to go high, this high being passed through delay 73 to set flip-flop 71 so that timing signal T goes high. Setting of flip-flop 71 also ends the reset signal to counter 66 so that the counter may resume counting the pulses from pulse generator 65.

The first CL1 pulse is anded with the T signal by AND gate 74 to generate a TCL1 signal. The succeeding CL2 pulse is anded with the T signal by AND gate 76 to generate a TCL2 signal, which resets counter 67 and terminates the Q12 signal therefrom and starts counter 67 again. The T signal is terminated by the CL4 pulse which resets flip-flop 71. Flip-flop 71 will, of course, remain reset until the 0.1-second cycle is over and another Q12 signal is generated by counter 67.

Thus, a full cycle of timing pulses occurs every 0.1 second, with a Q12, T, TCL1 and TCL2 pulse, followed by a series of clock pulses on the CL1–CL4 lines until the cycle ends with a Q12 signal again being generated. The sequence of timing signals is shown in FIG. 4.

FIG. 5 illustrates the cane switch 34 whose movable arm 77 is brought into engagement with one of the illustrated terminals 78 depending upon the particular position of the manually operable cane 36. The output terminals 79 of the cane switch are connected to the corresponding terminals 81 (FIG. 8) of the transmission control which are individually held high by pull-up resistors 82, terminals 81 being also connected through current-limiting resistors 83 to the inputs of parallel register 84. In FIG. 5, the output terminals 79 of the cane switch are connected to switch terminals 78 by diode array 85 so that when movable switch member 77 engages and grounds one of the terminals 78, the $\overline{P1}$-$\overline{P5}$ and $\overline{NP}$ signals at terminals 79 and 81, and at the input to register 84, will be the invert of the code shown in FIG. 6.

As the operator changes the position of cane 36, the movable member 77 will leave one terminal 78 before coming into engagement with the next terminal. While in between terminals, none will be grounded and all terminals 79 and 81 will be high, causing NAND gates 86 and 87 both to output a low to NOR gate 88 so that its output goes high to inhibit clocking of the parallel register 84. When the movable member 77 of cane switch 36 comes to rest, in engagement with one of the switch terminals 78, at least one of the $\overline{P1}$-$\overline{P5}$ and $\overline{NP}$ signals will be low. As a consequence the output of one or both NAND gates 86 and 87 will go high so that NOR gate 88 outputs a low. This low, together with the next TCL1 signal (inverted to low by inverter 89) will cause NOR gate 91 to output a high clock pulse to register 84 so that the inverses of the signals on the inputs will appear and be latched at the $\overline{Q}$ output of the register.

Thus, when the position of cane 36 is changed, the register 84 will not be clocked until the change of position is completed, and when it is clocked, the P1-P5 and P=N signals will appear at the $\overline{Q1}$-$\overline{Q6}$ outputs of the register and will be high or low in accordance with the code of FIG. 6. The P1-P5 and P=N signals will remain latched at the outputs of register 84 until the cane is moved to a new position. The P1-P5 signals thus provide a five-bit binary representation of the cane position for reverse or any forward gear. The P=N signal is a one-bit signal indicating the cane is in neutral.

In a similar manner, FIG. 7, binary coded information as to the actual gear position is entered and latched into the transmission control. Again pull-up resistors 92 will normally hold the five-bit $\overline{A1}$-$\overline{A5}$ signals (for reverse or any forward gear) and the one-bit $\overline{A=N}$ signal (for neutral) high, unless such signals go low by being grounded through diode array 93 (identical to diode array 85) by means of gear switch 31. During the time that the transmission is shifting from one gear to another, signals $\overline{A1}$-$\overline{A5}$ and $\overline{A=N}$ will all be high so that the outputs of NAND gates 94 and 96 will both be low. When the shift is completed and a terminal of switch 31 is grounded, at least one of the signals $\overline{A1}$-$\overline{A5}$ of $\overline{A=N}$ will be low so that one or both NAND gates 94 and 96 will output a high causing OR gate 97 to output a high and apply a clock pulse to parallel register 98 so that the A1-A5 and A=N signals will appear at the $\overline{Q}$ outputs of the register. Capacitor 99 will charge through resistor 101 to terminate the clock pulse. Again, the A1-A5 and A=N signals will be high or low in accordance with a code similar to the code of FIG. 6 and will remain latched in the $\overline{Q}$ outputs of the register until the next gear change is made. The parallel register 98 will also be clocked when power is first applied, since capacitor 99 will be initially uncharged, so that the actual gear position signal will be latched in register 98 at such time.

FIG. 8 also illustrates the manner in which the P6-P8 signals are generated, these signals representing the minimum automatic gear. Terminal board 102 is provided so that either, both or neither of the inputs to inverters 103 and 104 may be hard-wired to ground. In the presently described embodiment, the input of inverter 104 is grounded so that the P7 signal will be high at all times. The inputs to inverters 103 and 106 are held high by pull-up resistors 82 so that signals P6 and P8 are held low at all times. The P6, P7 and P8 signals are thus 010, corresponding to the FIG. 6 code for second forward gear. If desired the input of inverter 103 could have been wired to ground, rather than 104, so that the first gear forward would be the minimum automatic gear. If both inverters 103 and 104 are grounded, the third gear would be the minimum automatic gear. If neither inverter 103 nor 104 is grounded, NAND gate 107 will output a low to inverter 106 so that its output will go high to give a P6-P8 code corresponding to fourth gear. Normally, once the minimum automatic gear has been determined for a particular vehicle it is not thereafter changed. However, if desired, switches could be used in place of hard-wiring so that the operator can select the gear to be used as the minimum automatic gear.

FIG. 9 illustrates the portion of the transmission control wherein gear comparison signals are generated.

At the top of the figure, the A4 and A5 signals are applied to NAND gate 111. If the transmission is actually in reverse, A4 and A5 will both be high (see code in FIG. 6) and the output of gate 111 will be low. If the transmission is in neutral or a forward gear, gate 111 will output a high signal $\overline{A=R}$ indicating the transmission is not in reverse. The $\overline{A=R}$ signal is inverted by inverter 112 and applied to NOR gate 113 along with the A=N signal. If the transmission is neither in reverse nor in neutral, gate 113 will output a high A=F signal signifying the transmission is actually in a forward gear. The A=F signal is applied to AND gate 114 along with the A'<FM signal. This latter signal will be high if the transmission is in a gear lower than the minimum forward gear and low if the transmission is in the minimum automatic gear or a higher gear. Accordingly, NOR gate 116 will output a high signal TF1N if, and only if, the transmission is not in one of the automatic forward gears, i.e., for the present embodiment, in any of the gears 2 through 8.

The A1-A4 signals, representing the binary code of the gear the transmission is actually in, are applied to the A inputs of multiplexing gate 117, while the P6-P8 signals, representing the binary code for the minimum automatic gear, are applied to the B inputs of gate 117. Multiplexing gate 117 operates so that if neither of the Ka or Kb inputs is high, neither the A or B inputs will be gated through to the D outputs. If Ka is high, the A inputs will appear at the D outputs. If Kb is high, the B inputs will appear at the D outputs. In the present case, the A=F signal is applied to the Ka input, the A=F signal being inverted by inverter 118 and applied to the Kb input. Thus, if the transmission is actually in a forward gear, the A1-A4 signals will pass through gate 117 and appear at the inputs of the up/down binary counter 119. If the transmission is in neutral or reverse, the minimum automatic gear signals P6-P8 will be gated through to counter 119.

The TCL2 timing pulse at the beginning of a cycle of operation is applied to the PE input of counter 119 so that the data from multiplexing gate 117 are entered into the up/down counter, such data being then at the Q outputs of the counter. The up/down counter 119 operates so that each time a clock pulse is applied thereto, the Q outputs will increase by a binary 1 if the U/D input is high. If the U/D input is low, a clock pulse will decrease the count in the counter by a binary 1, with the Q outputs decreasing accordingly.

Counter 119 is not clocked until later in a cycle of operation, so at the beginning of the cycle, the A'1-A'4 signals at the Q outputs of counter 119 will be the same as the A1-A4 signals (the actual gear signals) if the transmission is in a forward gear, or the same as the P6-P8 signals if the transmission is in neutral or reverse.

The A'1-A'4 signals are applied to the 4-bit comparator 121 along with the P1-P4 signals which represent the actual cane position. Comparator 121 will output signals A'>P or A'<P depending upon whether the gear code from up/down counter 119 indicates a gear which is higher or lower, respectively, than the cane position. For example, if the operator had moved the cane to sixth position and the transmission was in fourth gear, signals A'>P would be low and A'<P would be high.

Four-bit comparator 122 likewise compares the A'1-A'4 outputs of up/down counter 119 with the minimum forward gear signals P6-P8 to provide signals A'>FM and A'<FM which indicates the relationship of the gear in up/down counter 119 to the minimum forward gear.

The remaining portion of FIG. 9 illustrates the controls for the up/down counter 119.

The $U_M$ signal is applied to the U/D input of counter 119. This signal will be high during a test for upshift so that the count in counter 119 will increase during such test when the counter is clocked. The $U_M$ signal is low during a test for forced downshift or automatic downshift so that a clock pulse will decrease the count in the counter during such tests.

In order to get a clock pulse to counter 119 all inputs to AND gate 123 must be simultaneously high. As is apparent this will occur during the existence of a CL3 clock pulse and only if the output of NOR gate 124 and the Q output of D-type flip-flop 126 are both high at such time.

NOR gate 124 will output a high only if the T signal is low (i.e., the T signal inhibits the up/down counter from being clocked) and the output of NOR gate 127 is low. During an upshift test, when the upshift test signal $U_M$ is high, gate 127 will have a high $U_M$ signal directly inputted thereto so that the output of gate 127 will be low.

The high $U_M$ signal will also set flip-flop 128 so that its $\overline{Q}$ output goes low. When the $U_M$ signal later goes low, the next CL4 pulse will cause AND gate 129 to reset flip-flop 128 so that its $\overline{Q}$ output will again go high to cause gate 127 to output a low during a downshift test.

The Q output of flip-flop 126 will be high when the flip-flop is clocked by the CL3 signal if its D input is high at such time, i.e., if the output of NAND gate 131 is high, a condition it will have if either input thereinto is low.

During an upshift test NAND gate 132 will output a low to gate 131 if all of the inputs to gate 132 are high. For this to happen, either the A=N signal (transmission is in neutral) or the A'<P signal (the gear in up/down counter 119 is less than the cane position) must be high; the upshift test signal $U_M$ high; and the S<M signal must be low. The latter signal will be low if the actual transmission speed is high enough so that an upshift may be made from the gear in up/down counter 119.

During either a forced downshift test or a downshift test NAND gate 133 will output a low to gate 131 if all of the inputs to gate 133 are high. For this to occur (in either of such tests) the A'>FM signal must be high (the gear in counter 119 must be greater than the minimum automatic gear) and the S>M signal must be low (the actual transmission speed is low enough to permit downshifting). Additionally, the output of OR gate 135 must be high. In a downshift test, signal DM will be high so that OR gaate 134 outputs a high. During a forced downshift test, a high forced downshift test signal $F_D$ is required together with a low A'<P signal, the latter being low when the gear in counter 119 is greater than the cane position.

At the start of a cycle of operations, the TCL2 pulse will have reset flip-flop 136 so that its $\overline{Q}$ output is high, generating signal A'=A, such signal indicating that the gear signals A'1-A'4 at the output of the up/down counter 119 are the same as the actual gear signals A1-A4.

When the up/down counter is clocked in response to gate 123 going high, flip-flop 136 is set, so that its Q output generates the A'≠A signal. Such signal indicates that the counter 119 has now been stepped (either up or down) and that the A'1-A'4 signals are no longer representative of the actual gear condition. Once set, the A'≠A signal will remain throughout a cycle, until flip-flop 136 is reset by the next TCL2 pulse.

In FIG. 10 the A'1-A'3 signals from the up-down counter 119, the A4' signal from FIG. 13 (the A4' signal will be high any time the A'4 signal is high) and the $U_M$ signals are applied through inverter-buffers 141 to the addresses of programmed memory matrix 142. The M1-M10 signals at the output terminals of the memory matrix, pulled up in voltage by pull-up resistors 143, will be individually high or low depending on the state of the signals at its address terminals and the binary information programmed therein.

In general, for each different A'1-A4' code at the addresses of the memory matrix, the M1-M10 output signals will be a 10-bit binary representation of a speed programmed into the matrix for the particular gear addressed thereto. If the UM signal is high, as it will be during an upshift test, the M1-M10 speed signals will represent the upshift allowable speed point for the particular gear addressed to the memory. The memory is programmed so that the upshift speed point for any gear is approximately equal to the transmission speed when the vehicle is operating in that gear and the engine is operating at approximately 95% of maximum rated speed. Such figure will vary from gear to gear, depending on design requirements, but should always be less than 100% of maximum rated engine speed. Thus, if the memory matrix is addressed by a particular gear, e.g., fourth gear, in an upshift test, a particular M1-M10 programmed speed signal will appear. If the actual transmission speed is higher than the memory speed, then the transmission should not operate in fourth gear—it should be operated in fifth or perhaps a higher gear.

If the UM signal is low, as it will be during a forced downshift or automatic downshift, the M1-M10 programmed speed signal will represent the downshift speed point of the transmission for that particular gear. Again, the programmed speed will vary from gear to gear, depending on the design requirements of the transmission. In general, the lowest allowable speed for a particular gear will be the speed at which the engine would operate at somewhat below approximately 25% of rated maximum speed if the transmission were operating in the next-lower gear. Thus, if the vehicle is operating in a particular gear and the actual transmission speed is below the programmed lowest allowable speed for that gear, the transmission should be downshifted to a lower gear.

FIG. 10A illustrates a modification of FIG. 10. At times it may be desirable to regulate the shifting of gears in additional response to the throttle position or demand by the operator. In such case, the throttle 146 is provided with a multi-position rotary switch 147 coupled thereto to ground the lines on which the throttle demand signals $\overline{TD1}$-$\overline{TD3}$ and $\overline{TDZ}$ appear by means of diode array 148. At least one of these lines will be grounded at any of the switch positions so that at such time NAND gate 149 will output a high so that gate 151 will go high when the TCL1 pulse is applied thereto to gate the throttle demand code through the parallel register 152 to the $\overline{Q}$ outputs thereof. Preferably the $\overline{TDZ}$ signal will be grounded at zero throttle demand. The $\overline{Q}$ outputs of register 152 will be all low at low idle throttle position and will be all high at full demand throttle position. The throttle positions in between are equally divided to give an increasing binary code at the $\overline{Q}$ outputs as the throttle demand increases from low idle to full demand.

It is further preferable that the transmission output speed at which forced downshifting occurs, independent of engine throttle setting, shall be the same as normal downshifting at full engine throttle setting. Accordingly, when the forced downshift test signal $F_D$ is present, it will be applied to each of the NOR gates 153 so they will each output a low, regardless of the state of the $\overline{Q}$ outputs of register 152. Such lows will be inverted by inverters 154 and applied as highs to the A6-A8 addresses of the memory matrix 142'. As a result, the maximum engine speed will be at rated speed rather than above rated during forced downshifting operations, so that there is no engine overspeed problem.

In FIG. 10A, the memory is addressed at any one time by the A'1-A4' gear signals and by the upshift test signal $U_M$ as before and is also addressed by the throttle demand signals. The memory matrix is programmed so that each combination of gears and throttle demand signals will result in a 10-bit binary signal at the memory matrix outputs representing an upshift or downshift speed point, depending upon whether signal $U_M$ is high or low.

FIG. 11 illustrates the circuits for generating actual transmission speed signals and for comparing the shift point signals with the speed signals M1-M10 from the memory matrix of FIG. 10.

The transmission speed signals TS from the magnetic pick-up 37 (FIG. 1) are applied to one of the inputs of AND gate 156. When the Q12 timing pulse at the beginning of a cycle ends, the inverter 157 will output a high so that the TS signals will pass through gate 156 to the $\phi$ input of 12-bit counter 158. The binary count of the TS signals will appear at the Q outputs of counter 158 and at the inputs of parallel register 159. At the next Q12 signals, 0.1 seconds later, the counting of the TS pulses will cease. The TCL1 pulses will then clock the inputs of register 159 to the Q outputs thereof, where they will remain until the TCL1 signal of the next cycle. The TCL2 pulse resets counter 158 so that it may restart counting the TS pulses.

Thus counter 158 will count the TS signals for a full 0.1 second, with the resultant count being latched at the Q outputs of register 159 for the duration of the succeeding 0.1-second cycle of operations. Since the frequency of the TS signals is proportional to the actual speed of the transmission, the binary magnitude of the outputs of register 159 provides a direct indication of the transmission speed.

The outputs of register 159 are applied to the A inputs of comparator 161, while the M1-M10 signals from the memory matrix are applied to the B inputs thereof. The comparator will output two signals, S>M or S<M, signifying that the actual transmission speed is greater, or less, than the programmed shift point speed for the particular gear addressed into the memory matrix from up/down counter 119.

The Q3-Q10 transmission speed signals from register 159 are applied to the various illustrated gates of logic circuit 162 to produce the S=T, S=TR, S<2 MPH and S<30 RPM signals. The S=T signal is high if the transmission speed is such that the vehicle speed is more than 2 MPH. The S<2 MPH signal is the invert of the S=T signal. The S=TR signal will be operatively low if the vehicle speed is less than 2 MPH and the gear signal in the up/down counter is equal to or less than the minimum automatic gear. The S=TR signal, when low, is used in shifting into reverse.

The S<30 RPM signal will be high if the output of the speed signal register indicates that the transmission speed is less than 30 rpm. This is a malfunction signal since, when the vehicle is operating in any gear in the range, the speed of the transmission shaft will not be below about 250 rpm. Thus, if this signal is generated when the transmission is in the automatic range it will indicate the transmission speed-sensing system has become defective.

FIG. 12 illustrates the engine speed indicating circuits of the transmission control. The Q12 timing signal is inverted by inverter 166 and applied to AND gate 167 so that the engine speed signals ES from the magnetic pick-up 38 (FIG. 1) will be applied to the $\phi$ input of counter 168 during the 0.1-second period of time from the end of the Q12 signal. The counter 168 will be reset at the end of the 0.1-second cycle by the TCL2 signal.

The Q1-9 binary outputs of counter 168 are connected to terminal board 169 which is hard-wired in a manner such that if the count of counter 168 reaches a value corresponding to 105% of rated maximum speed the outputs of gates 171 and 172 will both go high to set flip-flop 173. During the 0.1-second cycle of operation, the timing signal T will be low and the inverter 174 will accordingly be applying a high to the clock input of flip-flop 173. Thus, if at any time during the cycle flip-flop 173 is set, its Q output will go high. AND gates 176 and 177 will then produce the Q2 signal at CL3 time during the next T signal providing the transmission is not in reverse (A=R is high) and the gear code in up-/down counter 119 is less than the cane position (A'<P is high). At TCL3 time when the Q2 overspeed signal is generated, A'=A so that the A'<P signal indicates the actual gear is less than the cane position. The Q2 signal is used to cause an immediate upshift of the transmission in the event the engine speed is 105% of rated, subject to the limitation that the transmission will not be upshifted beyond the maximum gear selected by the operator.

The flip-flop 173 will be reset at the end of the T signal, i.e., after the Q2 pulse and after the counter 168 has been reset by the TCL2 pulse, so that the engine speed may continue to be monitored. As long as the engine speed continues to be at 105% rated maximum or above, the flip-flop 173 will be set by the end of each timing cycle. When the engine speed drops below 105% rated maximum, the flip-flop will not set and its $\overline{Q}$ output will be high at the end of the cycle.

The Q1-9 outputs of register 168 are also applied to terminal board 178 which is hard-wired in such manner that if the engine speed reaches 110% of rated maximum speed, AND gates 179 and 180 will both go high to clock flip-flop 181 so that its Q output will go high to generate the overspeed warning signal OS. This signal is used in FIG. 2 to energize the warning light 33 which is in the operator's compartment of the vehicle. The OS signal will continue to be generated until such time as flip-flop 181 is reset. This will occur at TCL3 time when AND gate 182 outputs a high if the engine speed has reduced to less than 105% maximum rated speed so that flip-flop 173 has not been set.

The Q7 and Q8 outputs of counter 168 are also applied to NOR gate 183. The output of the gate will be high at the end of the 0.1-second sycle of operation if the engine speed is less than 640 rpm, a speed approximately equal to the low idle engine speed. If the engine speed is greater than low idle, gate 183 will output a high to the D input of flip-flop 184. Thus, if the engine speed is above low idle, the T pulse applied to the clock input of flip-flop 184 will cause the Q output to go high and stay high until such time as the flip-flop is reset, i.e., when the D input is low at T time. The Q output of the low-idle flip-flop 184 is applied to NOR gate 186.

Gate 186 is used in the generation of the hold signal H. If the operator wishes to hold the transmission in gear, without a shifting thereof, he can close switch 39 (FIG. 1) to ground the input to gate 186 which is normally held high by pull-up resistor 185. If the other inputs to gate 186 are both low, then a high H signal will be produced at the output of gate 186.

The low-idle flip-flop 184 is used to inhibit the generation of the hold signal in the event the engine speed drops below low-idle. This will allow an automatic downshift of the transmission even though the hold switch is closed, thus preventing the operator from applying high torque to the clutches in the upper gears, or lugging the engine below low idle.

The upshift test signal $U_M$ when high will also inhibit generation of the hold signal H.

FIG. 13 illustrates the circuits for the generation of the lock-up clutch signal LUC. As mentioned previously, when the LUC signal is high, the lock-up clutch solenoid 21 will be energized to take the transmission out of torque converter drive and connect the engine output shaft to the gear unit 14 for direct drive. In short, when the LUC signal is high, the transmission is in direct drive—when the LUC signal is low, the transmission is in torque converter drive.

It is desirable to operate the transmission in torque converter drive when operating in reverse and first forward. In addition, it is desirable to operate in torque converter drive when the transmission is in minimum automatic gear as long as the transmission speed is below a predetermined speed. The transmission should then go into direct drive when in minimum automatic gear if the transmission speed exceeds such predetermined speed. The transmission should then operate in direct drive only at any gear higher than the minimum automatic gear.

It is also desirable to take the transmission out of direct drive and put it into torque converter drive whenever a gear shift is being made, in order to facilitate shifting.

In FIG. 13, the A'4 signal from the up/down counter 119 is applied to OR gate 187 so that the A4' signal will be high any time the A'4 signal is, i.e., when the gear code in counter 119 represents either reverse or eighth forward gear. The Q output of flip-flop 188 is also applied to gate 187 so that the A'4 signal will be high whenever flip-flop 188 is set.

Flip-flop 188 will be set providing all inputs to AND gate 189 are high, i.e., when the outputs of AND gate 191 and inverter 192 are high and the A=F signal is high. If the gear code in the up/down counter 119 is neither less than, nor greater than, the minimum automatic gear, the A'<FM and A'>FM will both be low so that the output of OR gate 193 will be low, signifying that the gear code is the same as the minimum automatic gear. A simultaneous high A=F signal and high output of inverter 192 will then indicate that the transmission is in minimum automatic forward gear.

The UM, CL2, A'=A and S<M signals are combined by AND gate 191 whose output will be high at CL2 time during the first upshift test of a 0.1-second cycle if an upshift cannot be made.

Thus flip-flop 188 will be set by a CL2 clock pulse if the transmission is actually in minimum automatic gear and an upshift cannot be made therefrom. The flip-flop will remain set until the next CL4 pulse resets it.

With the transmission actually in minimum automatic gear the A'4 signal from the up/down counter 119 will be low, since the code for second gear is 0010. The setting of flip-flop 188 will now, however, cause the code to the memory matrix addresses to be 1010, a code distinct from any of the gear codes in FIG. 6. This code will then instruct the memory to output speed signals M1–M10 which is the speed point at which the transmission should change from torque conversion drive to direct drive, or vice versa, when operating in minimum automatic gear.

The output of flip-flop 188 is also combined with the S>M and CL3 signals by AND gate 194. If the transmission is in minimum automatic gear and the transmission speed is greater than the speed point for change from torque converter to direct drive, the CL3 pulse will set flip-flop 196 so that its Q output will go high to generate the lock-up clutch signal LUC at the output of OR gate 197, so that the transmission is put into direct drive.

The LUC signal will remain high until flip-flop 196 is reset. This will occur when AND gate 198 goes high, i.e., at CL3 time, providing the output of OR gate 199 is high at such time.

OR gate 199 will go high if a shift out of minimum automatic gear is made (the output of gate 193 goes high). OR gate 199 will also go high while operating in minimum automatic tear if the transmission speed drops below the predetermined speed for change back into torque converter drive, i.e., S<M goes high. The Q output of flip-flop 188 and the UM signal are both inverted and applied to AND gate 201 to prevent spurious resetting of flip-flop 196.

The LUC signal is also generated when the transmission is above minimum automatic gear as follows. If the transmission is not being shifted, the UP and DOWN signals will both be low and the output of NOR gate 202 will be high. The $\overline{Q}$ output of timer 203 will also be high so that AND gate 204 outputs a high to AND gate 206. As a consequence, if the transmission is in any gear higher than the minimum automatic gear, the A'>FM signal will be high so that the outputs of both gates 206 and 197 will be high to generate the LUC signal so that the transmission is put into direct drive.

If a gear shift is to be made, one of the UP or DOWN signals will go low. The output of gates 202, 204 and 206 all go immediately low to terminate the LUC signal so that the transmission is put into torque converter drive during shifting. At the same time, timer 203 is triggered so that its $\overline{Q}$ output goes low for a time period determined by the timing capacitor 207 and resistor 208. The time period of timer 203 is set so that its now low $\overline{Q}$ output will inhibit generation of the LUC signal for a desired length of time after gear shift has been made so that the transmission will remain in torque converter drive for better speed matching of the engine output and gear unit input before the transmission is put back into direct drive.

FIG. 14 illustrates the test mode selector portion of the transmission control, wherein the test signals FD, UM and DM are generated. The signal FD is used in the control to instruct the control to test for a forced downshift, i.e., to see if the transmission can be downshifted in response to movement of gear-selector cane 36 to a position lower than the gear the transmission is in at the time. The UM and DM signals instruct the control to test and see if the transmission can be upshifted or downshifted, respectively, from the gear that it is in.

The forced downshift test signal FD will be generated when flip-flop 211 is set in response to a high output of NOR gate 212, i.e., when all of its inputs are high. If the operator has closed the hold switch 39 and the hold signal H is present, gate 212 will be inhibited from setting the flip-flop. Also, the A'≠A signal must be low, as it will be at the start of a cycle of operation when the gear signal in the up/down counter 119 is that of the actual gear.

Additionally, AND gate 213 must be outputting a low, which it will do if either of NAND gates 214 or 216 has a low output.

Gate 214 will have a low output if the cane 36 is in reverse position (P=R) and if the transmission is in a gear greater than minimum automatic tear.

Gate 216 will have a low output immediately following the TCL2 pulse which entered the gear information into the up/down counter 119 if the cane is not in reverse (P=R inverted) and the actual gear is greater than the cane position.

Once set, flip-flop 211 will remain set throughout a cycle of operation until the TCL1 signal at the start of the next cycle of operation.

If the forced downshift flip-flop 211 has been set, its $\overline{Q}$ output will go low to inhibit AND gate 217 from setting the upshift test flip-flop 218.

If the forced downshift flip-flop has not been set, its $\overline{Q}$ output will remain high and gate 217 will set flip-flop 218 on the next clock pulse, i.e., the CL3 pulse occurring during the T signal, providing the gear-selector cane is in a forward gear position (P=F). When set, the Q output of flip-flop 218 generates the upshift test signal UM.

The upshift test flip-flop 218 will remain set until OR gate 219 outputs a high signal. This will occur at the beginning of the next cycle of operation when a TCL1 pulse is generated, or when the UMR signal from FIG. 13 is generated, or when the downshift test flip-flop 221 is set.

Flip-flop 221 is set by AND gate 222 which combines the DM' signal from FIG. 13 and the A'>FM signal from FIG. 9. Thus, the downshift test flip-flop will be set if an upshift cannot be made and the transmission is in a gear higher than minimum automatic gear.

Once set, flip-flop 221 will remain set for the remainder of the cycle, until it is reset by the TCL1 pulse at the start of the next cycle.

FIG. 15 illustrates the portion of the transmission control wherein the manual command signals TN, TR, T1ST and and TFMIN are generated, these signals being used to command a shift into neutral, reverse, first forward or minimum automatic forward gear, respectively. In addition, this portion of the control also generates the single-bit P=R and P=F signals to indicate whether the gear selector cane is in reverse or any forward position.

The P1-P5 cane position signals, latched in the output of register 84 (FIG. 8) are brought to the FIG. 15 circuit and the P4 and P5 signals are applied to AND gate 226. As seen from the cane position code of FIG. 6, the only time that signals P4 and P5 can both be high is when the cane is in reverse. Consequently, if the cane is in reverse gate 226 will output a high P=R signal. This signal is used in FIG. 14 as part of the logic to generate the forced downshift test signal FD. The P=R signal is inverted by inverter 227 to generate the $\overline{P=R}$ signal which will be low if, and only if, the cane is in reverse position.

The shift-to-neutral command signal TN is generated in response to three different conditions. First, if the cane has been moved to neutral position, the P=N signal from FIG. 8 will be high. This signal is applied in FIG. 15 directly to OR gate 228 so that its output will generate a high TN signal.

Secondly, for vehicles having beds that may be raised to dump their contents, it is desirable that the transmission be shifted into neutral in the event that the bed is raised when the transmission is in reverse. Otherwise, the raised bed will obstruct the operator's rear view so that it is difficult for him to move the vehicle rearwardly with adequate precision.

When the vehicle bed is raised, the bed switch 41 will close automatically to ground the input to NOR gate 229 which is normally held high by pull-up resistor 231. If the transmission is operating in reverse, the cane will be in reverse and the $\overline{P=R}$ signal will be low. As a consequence gate 229 will output a high to set flip-flop 232. Its now high Q output will pass through gate 228 to generate the Go-to-Neutral command signal TN.

Flip-flop 232 is reset by passing a high through OR gate 234 to the reset input of the flip-flop. If the cane is moved to neutral position while the bed is raised, the inverted P=N signal will cause NOR gate 233 to output a high. If the cane is moved to a forward gear position, The P=F signal will pass through gate 234 to reset the flip-flop.

The Go-to-Neutral signal TN is also generated by a closure of the park switch 42 which will close when the parking brake is set. Closure of switch 42 grounds the input of inverter 236 which is normally held high by pull-up resistor 237 so that the output of inverter 236 will go high and generate the TN signal at the output of gate 228.

The P=F signal is generated by NOR gate 238 which has the P=R and TN signals applied thereto. If the cane is not in reverse, the P=R signal will be low. Similarly, if the cane is not in neutral (and flip-flop 232 and inverter 236 both havr a low output), the TN signal will be low. Accordingly, a high P=F signal will indicate that the cane is in one of the forward gear positions.

The shift-to-reverse command signal TR is generated when all of the inputs to NOR gate 239 are low. This requires first that the hold switch 39 be open so that the hold signal H is low. Secondly, the S=TR signal must be low, i.e., vehicle speed is less than 2 mph and the transmission is not in a gear higher than the minimum automatic gear. Thirdly, the cane must have been moved to reverse position. This latter requirement is sensed by applying the P1 and P5 signals to NAND gate 241. Both signals are high if, and only if, the cane is in reverse, so that gate 241 will output a low to gate 239 if the cane is actually in reverse position. The cane can be moved at any time to the reverse position by the operator, regardless of the forward gear that the transmission may be in. If the transmission were in first forward gear the S=TR signal will delay generation of the TR signal until the vehicle speed has reduced to less than 2 mph, and will then allow the transmission to be shifted from first to reverse. If the transmission had been in a higher gear when the operator shifted the cane into reverse, the system will remain in automatic mode and the S=TR signal will be delayed until the transmission has shifted down into the minimum automatic gear and the vehicle speed has reduced to less than 2 mph. At that time the TR signal will be generated to shift the transmission from minimum automatic gear to reverse.

The shift-to-first command signal T1ST is generated when all of the inputs to NAND gate 242 are high so that the output thereof is low and the output of inverter 243 is high.

When the cane is in first gear position, the P2-P5 signals will all be low so that NOR gate 244 outputs a high to gate 242. The P1 signal will be high if the cane is in first gear position.

The remaining input to gate 242 is from NAND gate 246, whose output will be high if an upshift to first is to be made from reverse ($\overline{A=R}$ is low), or if a downshift to first is to be made ($\overline{A=R}$ is high) in which case the speed must be less than 2 mph (S=T is low) in order for the downshift into first to be allowable.

The remaining manual signal TFMIN is generated in response to movement of the cane by the operator to a position corresponding to the minimum automatic gear or a high gear, and is generated when all of the inputs to NOR gate 247 are low.

NAND gate 248 will have a low output if the cane is in any forward position (P=F) except first gear (gate 242 is high if not in first), i.e., if the cane is in the minimum automatic gear position or higher.

NOR gate 249 will output a low if the transmission is in reverse, regardless of the vehicle speed, or if the vehicle speed is less than 2 mph regardless of the gear it is in.

The H signal will be low if the hold switch is open.

The TFIN signal will be low if the transmission is not in minimum automatic gear or higher, i.e., if the transmission is in reverse, neutral or first.

Figure 16:
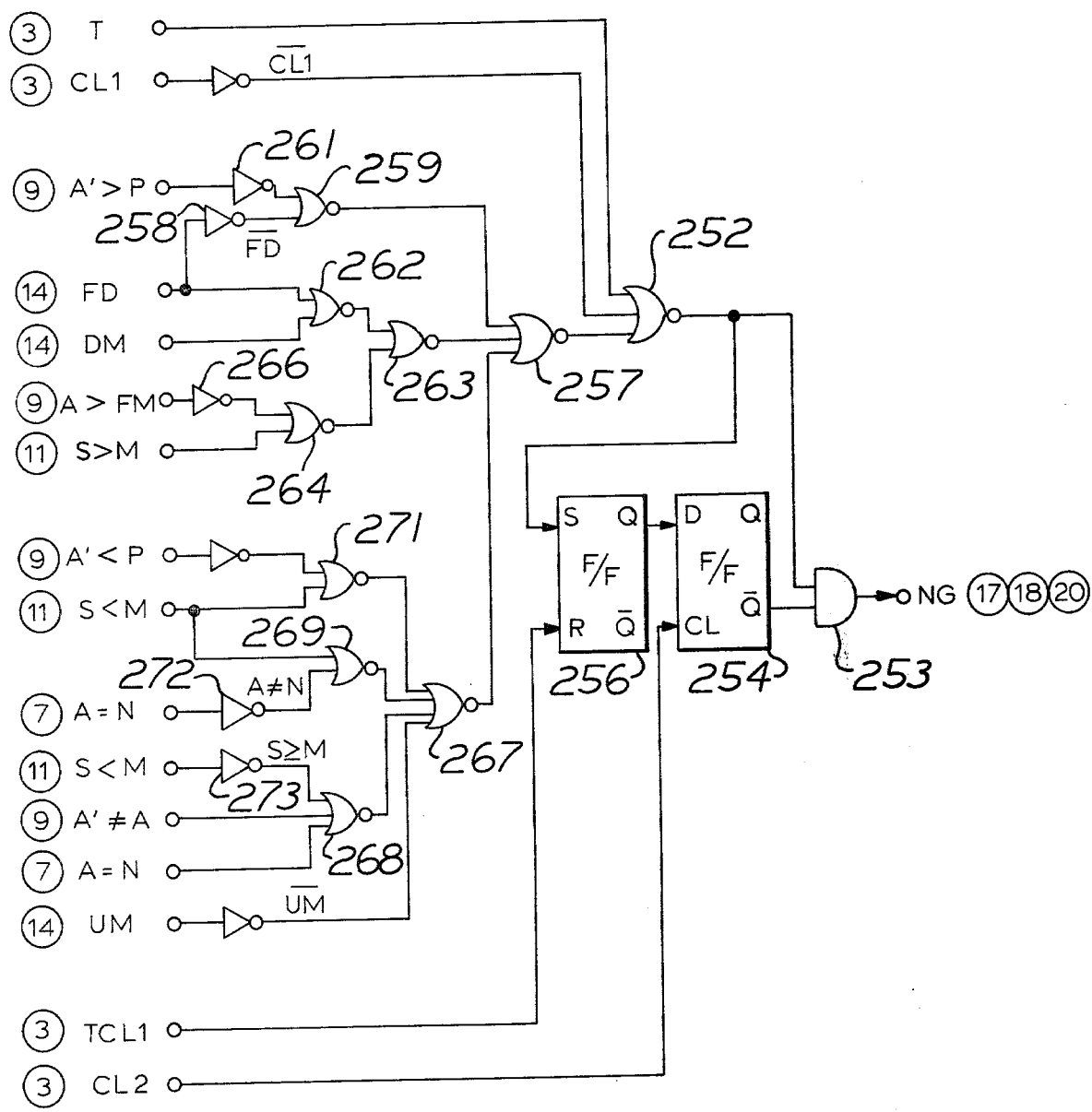
FIG. 16 is a circuit diagram of the transmission control portion wherein the new gear signal is generated.

FIG. 16 illustrates a portion of the shift calculator section of the transmission control wherein the NG signal is generated.

In general shift calculations are carried out in the control as follows. Starting with the actual gear position (the A1–A4 actual gear signals) it is determined whether the gear limits of the automatic range (the preset minimum automatic gear FM and the maximum allowable gear determined by the operator's positioning of the cane) will permit a shift change. The actual gear must be above the minimum gear, $A'>FMIN$, to allow a downshift, and must be below the maximum gear $A'<P$ to allow an upshift. Likewise, the actual gear must be above the cane position, $A'>P$, for a forced downshift condition. In addition, the transmission speed is compared with the programmed shift speed points for the actual gear to see if a shift is permitted. For a forced, or automatic, downshift the transmission speed must be equal to or less than the downshift speed point for the gear ($S>M$ is low). For an automaic upshift, the transmission speed must be equal to or greater than the upshift speed point ($S<M$ is low).

The previously described circuit of FIG. 9 sequentially tests for forced downshift, upshift and downshift to see if both conditions are present for any one of the three modes.

If, and only if, both tests are met in a mode, the circuit of FIG. 9 steps the up/down counter one position. The circuit of FIG. 9 again considers whether both tests for shifting would be satisfied if the transmission were operating in the stepped gear. If so, the up/down counter is stepped again, so that the same tests can be made with reference to the next gear in sequence.

For example, if the cane were in eighth forward position and the transmission was actually in fourth gear, the circuit of FIG. 9 would step the up/down counter from fourth gear to fifth gear if the transmission speed was above the programmed upshift speed point for fourth gear. If the transmission speed was also above the programmed upshift speed point for the stepped (fifth) gear, the FIG. 9 circuit would again step the counter 119 to sixth gear so that that gear can be considered.

At some point, the stepped gear will not meet both conditions for shifting, i.e., the gear in the up/down counter may reach the limits of the automatic range or the programmed shift point for the stepped gear will not call for a further shift to be made. In such case, the circuit of FIG. 9 will not again step the counter 119.

Thus, the circuit of FIG. 9 is used to test the gear in up/down counter 119 (actual or stepped) to see if both conditions for shifting are present.

The circuit of FIG. 16 complements FIG. 9, and is used to generate a signal NG if the gear in up/down counter 119 (actual or stepped) fails to meet either shift condition. Such signal indicates that the new gear calculations are complete and that the gear in up/down counter 119 is at, or has reached, a limit wherein it is the maximum gear to which the transmission may be upshifted or the minimum gear to which it may be downshifted.

In order for the NG signal to be generated, the NOR gate 252 must output a high, which it can during a CL1 pulse at any time during a cycle after the T pulse has ended. A high from gate 252 will be anded by AND gate 253 with the normally high $\overline{Q}$ output of flip-flop 254 to generate the NG signal. The high output from gate 252 will also set flip-flop 256 so that its Q output goes high for the rest of the cycle. On the CL2 pulse immediately following the CL1 pulse which caused gate 252 to output a high, flip-flop 254 will be clocked so that its $\overline{Q}$ output goes low. As a consequence the NG signal will be a single pulse beginning at CL1 time and ending at the succeeding CL2 time.

Flip-flop 256 will go high at CL1 time (and not during T) providing one of the inputs to NOR gate 257 is high.

During a forced downshift test, signal FD will be high, and such signal is inverted to a low by inverter 258 and applied to NOR gate 259. As long as the stepped gear code in up-down counter 119 is equal to or greater than the cane position, sinal $A'<P$ will be low and inverter 261 will output a high to keep the output of gate 259 low. If, however, the up/down counter 119 has been stepped so that the gear code therein is less than the cane position, signal $A'<P$ will go high, the output of inverter 261 will go low so that gate 259 outputs a high to cause generation of the NG signal. In a forced downshift test the NG signal will prevent downshifting to a gear less than that called for by the operator.

If either a forced downshift or automatic downshift test is being carried out, one or the other of the FD or DM signals will be high so that the output of NOR gate 262 is low, to enable NOR gate 263 to output a high providing the output of NOR gate 264 is also low.

NOR gate 264 combines the $A>FM$ signal (inverted by inverter 266) and the $S>M$ signal, and will have an operative low output in two events. First, if the stepped gear in the up/down counter has been stepped to the minimum automatic gear, an NG signal will be generated. Secondly, if the test on the stepped gear indicates that the transmission speed is greater than that required for a downshift to that gear, gate 264 will output a low and the NG signal will be generated.

In an upshift test, when the inverted $\overline{UM}$ signal applies a low to NOR gate 267, the NG signal will be generated if all of the other inputs to gate 267 are low.

Under normal operating conditions during an upshift test, NOR gates 268 and 269 will have a low output so that the generation of an NG signal will depend upon the state of NOR gate 271.

Gate 271 will output a low, to cause generation of an NG signal in two events. First, if the gear signal in the up/down counter is stepped upwardly so that it becomes the same as the maximum allowable gear set by the position of the cane, the $A'<P$ signal goes low and is inverted to a high so that the output of gate 271 will go low. Secondly, if the gear being tested is less than the maximum allowable gear ($A'<P$ is high), gate 271 will output a low in the event the speed of the transmission is not high enough to permit an upshift to that gear ($S<M$ will be high at such time).

As will be noted, when the system is testing for upshift, an NG signal will only be generated in response to the testing of a stepped gear, i.e., it will not be generated in the event an upshift cannot be made from the actual gear. This enables the system to carry out the downshift test if an upshift cannot be made from the actual gear. The NG signal will be generated if a downshift cannot be made from the gear in the up/down counter, whether that gear is the actual gear or a stepped gear. Accordingly, if the successive testing of the actual gear indicates that neither an upshift nor a downshift should be made therefrom, the NG signal will be generated to indicate that the actual gear in the up/down counter is the gear in which the transmission should be.

Gates 268 and 269 logically combine the S<M, A=N (inverted by inverter 272), S<M (inverted by inverter 273), the A≠A and A=N signals to prevent an operator-imposed overspeed. For example, suppose the operator is traveling in fourth gear and desired a quick downshift to third gear but he is not satisfied with the normal system response time. Ordinarily, he could move the cane to put the transmission in neutral and then set the cane to third position, expecting the transmission to shift up to third. However, the present logic prevents this by imposing a condition that the new gear test is only speed-dependent, and independent of the maximum allowable gear when the actual gear is neutral and the vehicle is moving at a speed greater than 2 mph. Thus, even though gate 271 will go low when the up/down counter has been stepped to third gear, gate 269 will have a high output since the S<M signal will be low for third gear and the NG pulse will be inhibited. The up-down counter will be stepped to fourth gear at which time the NG signal will be generated. As a consequence the transmission will be put back into the gear that it started in, assuming the transmission speed did not decrease during this time to a point wherein the transmission could be shifted upwardly into third without a resultant overspeed. To eliminate unnecessary attempted gear calculations, the $F_{MIN}$ minimum automatic gear code is set into the up/down counter 119 when the actual gear is neutral.

Figure 17:
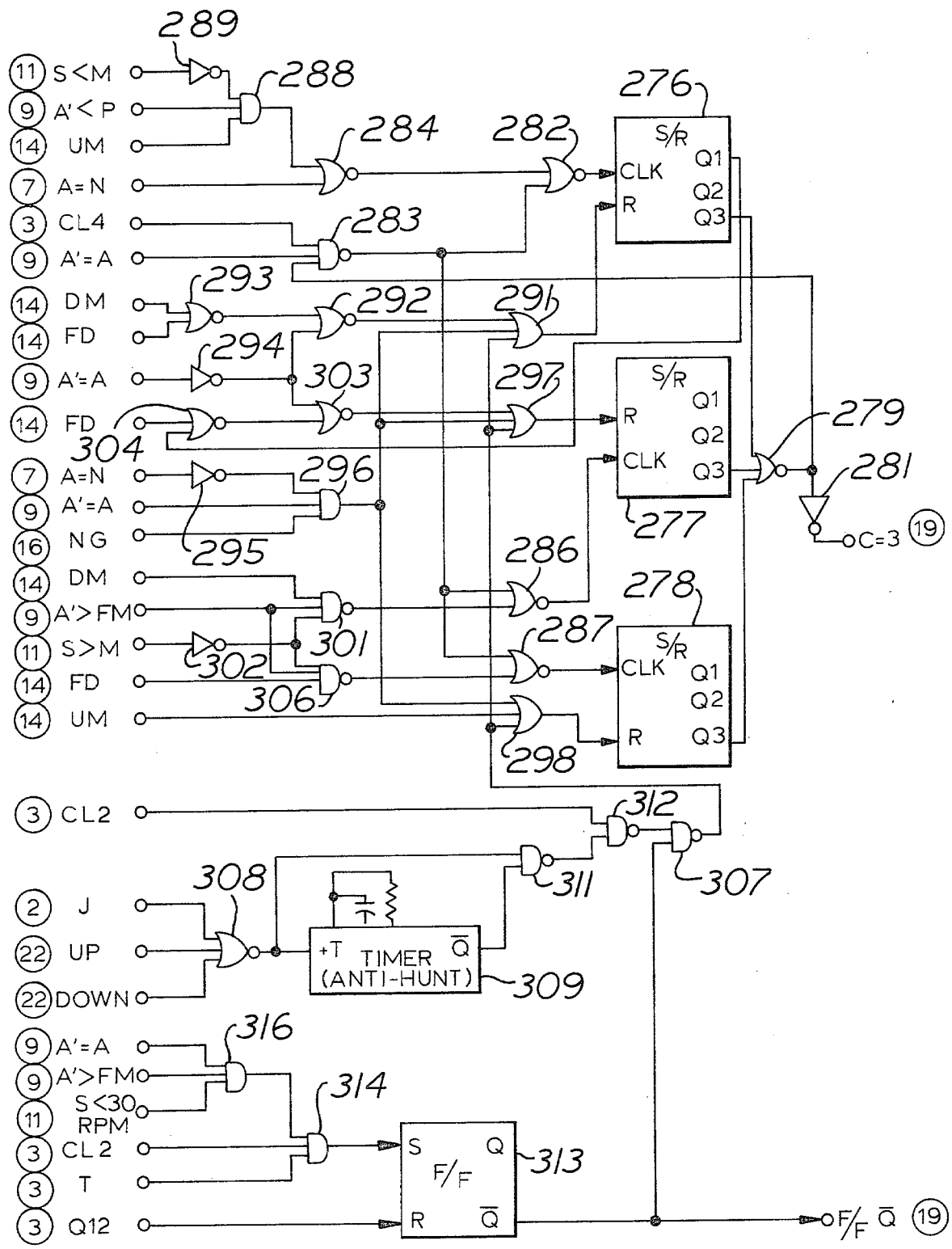
FIG. 17 is a circuit diagram of the portion of the transmission control which counts the number of forced downshift, upshift or downshift tests which have been carried out in a consecutive series of operation cycles.

FIG. 17 shows the portion of the new gear processing portion of the transmission control wherein a determination has been made and that three successive calculations have been made and that they have all been of the same character, i.e., they have been all upshift, all downshift or all forced downshift. If such is the case a C=3 signal is generated.

The circuit of FIG. 17 utilizes three shift registers 276, 277 and 278 for counting the number of upshift, downshift and forced downshift calculations, respectively. In each case a first clock pulse will enter a high at the Q1 output of a register. A second clock pulse will shift the high to the Q2 output and the next, or third clock pulse will shift the high to the Q3 output. I.e., the Q3 output of a register will go high on the third clock pulse thereto. The Q3 outputs of the three registers are applied to NOR gate 279, which normally has a high output. If the Q3 output of any register goes high, gate 279 will go low and inverter 281 will output a high C=3 signal.

The upshift register 276 will be clocked whenever the output of NOR gate 282 goes high, which will occur when both inputs thereto are low.

NAND gate 283 provides a low signal at the output thereof to enable gate 282 to pass a clock pulse therethrough when NOR gate 284 goes low, gate 283 having a low output if all inputs thereto are high. First of all, the timing signal CL4 must be high, i.e., register 276 is clocked only at CL4 time.

Secondly, the A'=A signal must be high, i.e., the up/down counter 119 has not been stepped in a sequence of testing operations. The A'=A signal is used here to limit clocking of register 276 so that it can only be clocked once during a 0.1-second cycle of operation, since once the up/down counter has been stepped in a cycle of operation, the A'=A signal goes low to remove the enabling low from the output of gate 283. A number of progressively higher gears may be tested for upshift in a single cycle of operation. A clocking of the upshift register 276 merely indicates that the data present during the cycle of operation show an upshift should be made without indicating how far up the upshift should be. (The latter is indicated by the NG signal of FIG. 16.)

Thirdly, for gate 283 to have an enabling low output, the C=3 signal must not have been generated. Once it has, the output of gate 279 will go low to maintain a high output from gate 283.

The output of gate 283 is also applied to NOR gates 286 and 287 to enable clocking of the downshift and forced downshift registers 277 and 278 and to limit them to one clocking per cycle of operation in the same manner.

Thus, providing gate 282 is enabled at CL4 time, the upshift register 276 will be clocked if the output of NOR gate 284 is low, which requires that at least one of its inputs be high. If the transmission is in neutral, the A=N signal will be high. However, if the transmission is not in neutral, then AND gate 288 must be high in order for the upshift register to be clocked. This will occur if the transmission speed is equal to or greater than the programmed speed required for upshifting from the actual gear in the up/down counter being tested (the low S<M signal inverted to a high by inverter 289), and the gear being tested is less than the maximum gear allowed by the cane setting (A'<P is high) and a test for upshift is being carried out (UM is high). If any of these conditions is not met, the upshift register 276 cannot be clocked in this cycle of operation.

The upshift register 276 is reset whenever the output of OR gate 291 is high, which will occur if any of the three inputs thereto is high. NOR gates 292, 293 and inverter 294 logically combine the DM, FD and A'=A signals so that register 276 is reset if the up/down counter 119 has not been stepped (A'=A is high) and if conditions call for either a forced downshift or downshift test to be carried out, so that FD or DM will be high.

AND gate 296 and inverter 295 logically combine the A=N, A'=A and NG signals so that register 276 is reset whenever the transmission is not in neutral (the low A=N signal is inverted to a high), the up/down counter 119 has not been stepped, and an NG signal has been generated indicating that the gear being tested has reached the allowable maximum or minimum gear limit or transmission speed limit. Thus, if the NG and A'=A signals show that the transmission should not be shifted from its present gear, register 276 will be immediately reset. The output of gate 296 is also applied to OR gates 297 and 298 so that the downshift and forced downshift registers 277 and 278 will also be reset if gate 296 goes high.

All three registers may also be reset by the anti-hunt and loss-of-speed-signal circuit shown at the bottom of FIG. 17, to be described hereinafter.

The downshift register 277 is clocked when NOR gate 286 is enabled by gate 283, providing the output of NAND gate 301 is low, which requires that the DM and A′>FM signals both be high and that the S>M signal be low so that it is inverted to a high by inverter 302. Thus, register 277 will be clocked if a downshift test is in progress, if the gear being tested is higher than the minimum automatic gear, and if the transmission speed is equal to or less than that required for a downshift into the gear being tested. Conversely, if all three of these conditions are not met, the downshift register will not be clocked.

The downshift register 277 is resettable by a high output from NOR gate 303 which will occur if the up/down counter 119 has not been stepped (A′=A) and if the output of NOR gate 304 is high. The latter will occur if either a forced downshift test is being carried out (FD is high) or if an upshift test is being carried out and the upshift register 276 has been clocked so that its Q1 output is high.

The forced downshift register is clocked when NOR gate 287 is enabled by gate 283 and when the output of NAND gate 306 is low. Register 278 will be clocked if a forced downshift test is being carried out (FD), and if the gear being tested is higher than the minimum automatic gear, and if the transmission speed is equal to or less than that required for a downshift into the gear being tested.

The forced downshift register 278 is resettable by an upshift test signal UM.

In addition to the above, the upshift, downshift and forced downshift registers 276, 277 and 278 will also be reset if the output of NAND gate 307 goes high. Normally, each input thereto is high to hold the output of gate 307 at a low. If either input goes low, all three registers 276–278 will be reset.

Resetting will occur if any of the J, UP or DOWN signals goes high. The J signal is generated in FIG. 2 when power is first applied to the transmission control. The UP or DOWN signals are generated whenever a final decision has been made to shift the transmission upwardly or downwardly as the case may be. If all signals are low, the output of NOR gate 308 is high, so that it and the normally high $\bar{Q}$ output of anti-hunt timer 309 will keep the output of NAND gate 311 low. This in turn keeps the output of NAND gate 312 high.

If a command to upshift or downshift the transmission is made, the output of gate 311 will go low and timer 309 will be triggered so its $\bar{Q}$ output goes low for the length of the timer pulse. As a consequence gate 311 goes high, so that the output of gate 312 will go low on every CL2 pulse, causing gate 307 to output a reset pulse to registers 276–278. The timer 309 has a pulse of approximately 0.75 seconds, longer than the length of time required for an actual shift so that its low $\bar{Q}$ output will continue to allow reset pulses to be generated even though the output of the input gate 308 goes high again at the end of a shift. As a consequence, even if any of the registers 276–278 should be clocked at CL4 time, they will be reset at the next CL2 time until timer 309 times out. Timer 309 thus provides a period of inhibition of counting after a shift is made so that the transmission may stabilize before the speed thereof is again used in a shift calculation. Without such a delay the system could hunt since an upshift could immediately produce a condition calling for a downshift and vice versa.

In the event that a malfunction occurs which results in the loss of the transmission speed signal, the registers 276–278 will also be reset by flip-flop 313. Normally this flip-flop is not set so that its $\bar{Q}$ output remains high at all times during operation. AND gates 314 and 316 combine the A′=A, A′>FM, S<30, CL2 and T signals, all of which must be high in order to set flip-flop 313. As is apparent, flip-flop 313 can only be set if the transmission is operating in a gear higher than minimum automatic gear. If while so operating, the signal S<30 rpm should go high, this will indicate that the speed signal from the transmission has been lost (see prior description of FIG. 11) and flip-flop 313 will be set on the TCL2 signal which immediately follows the TCL1 signal that clocked the speed signals through parallel register 159 of FIG. 11. Flip-flop 313 will remain set until the next Q12 timing pulse. If the speed signal, S<30 rpm, is still present at the next TCL1 time, flip-flop 313 will be immediately set by the TCL2 pulse after resetting by the Q12 pulse.

Flip-flop 313 thus prevents a C=3 signal from being generated in the event of a loss of transmission speed signal. Otherwise, the control would consider that the transmission speed was in fact low, when it is not, and would attempt to downshift the transmission to meet such condition.

In general summary, the circuit of FIG. 17 will determine, in sequence, whether the conditions are such that a forced downshift test, an upshift test, of downshift test should be carried out in a 0.1-second cycle of operation. If, for example, an upshift test is carried out, the upshift register 276 will be clocked once. If on the succeeding cycle of operation conditions again call for an upshift test to be carried out, register 276 will be clocked again. If the next cycle of operation again calls for an upshift test, the upshift register will be clocked a third time to generate the C=3 signal. However, if prior to that time a forced downshift or downshift test is called for, the upshift register will be reset to zero. The same, of course, is true for the other two registers 277 and 278. Thus, a C=3 signal can only occur if three consecutive 0.1-second cycles call for the same type shift test. The C=3 signal is required on FIG. 19 for the generation of a signal to command an automatic shift of the transmission.

Figure 18:
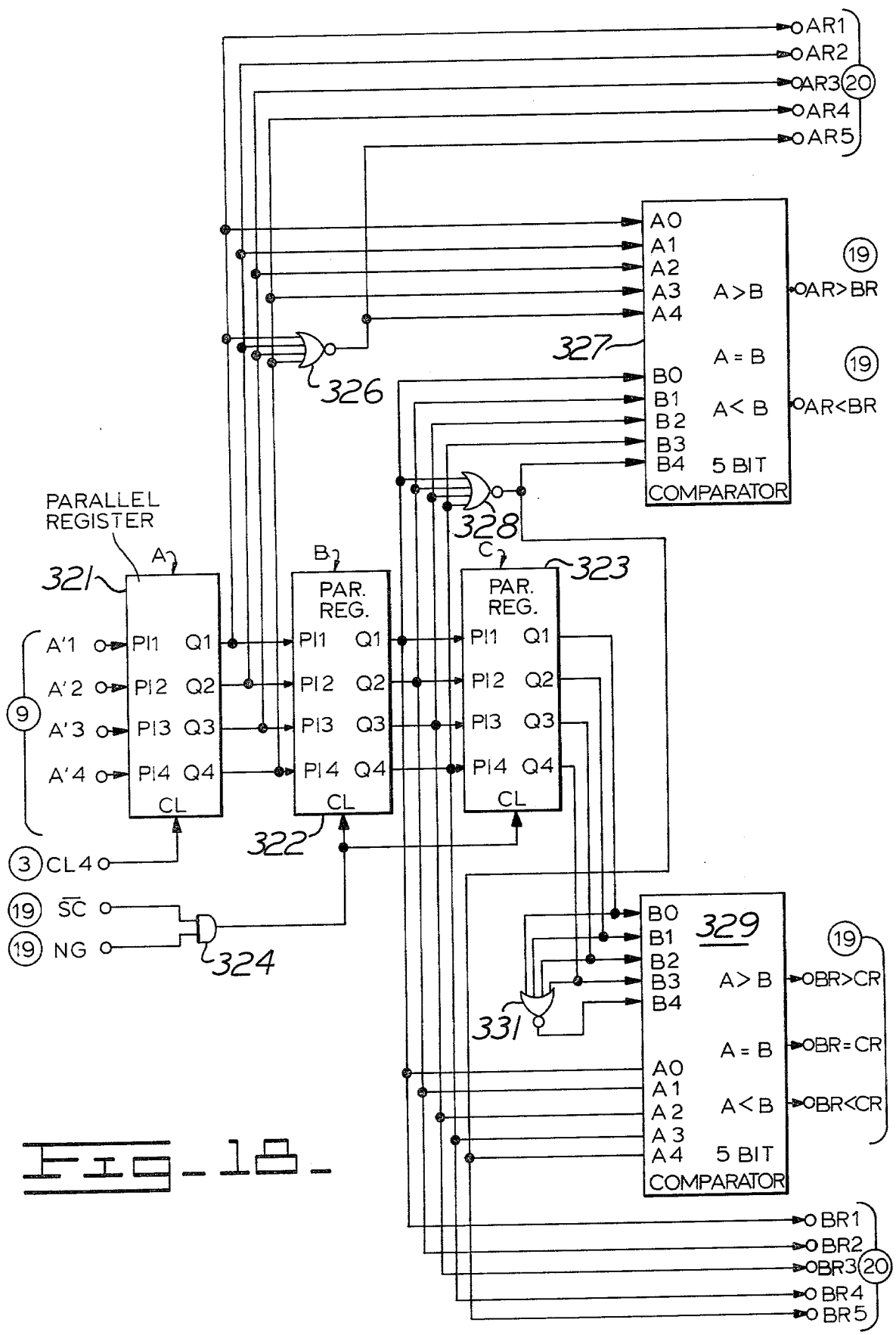
FIG. 18 is a circuit diagram of the transmission control portion wherein new gear test calculations are stored and compared.

FIG. 18 illustrates the portion of the new gear processor section of the transmission control wherein the gear that is calculated on each cycle of operation is stored.

Three parallel registers 321, 322 and 323 are provided, with the outputs of the "A" register 321 being connected to the inputs of the "B" register 322 and with the outputs of the B register 322 being connected to the inputs of the "C" register. The A register 321 has its inputs connected to the outputs of the up/down counter 119 (FIG. 9), with the stepped gear code of the up/down counter being clocked to the outputs of the A register by a CL4 timing pulse. During a cycle of operation of the system, the up/down counter will be stepped as tests are made for forced downshift, upshift or downshift until the test being made indicates that no further gear can be considered. The final gear tested during the cycle is thus stored in the A register. When the NG signal is generated, indicating that testing is through for the cycle, the output of the A register is clocked to the output of the B register by the output of AND gate 324 which has the NG and normally high $\overline{SC}$ signals applied thereto.

In the next cycle of operation, the A register will again reflect the tests carried out during such cycle. At the end of the test, the NG signal will clock the results of the prior test in the B register to the output of the C register and clock the A register test results into the B register.

In the next cycle of operation, the A register will again show the current gear testing. However, if this is the third test of the same character, i.e., forced downshift, upshift or downshift, the $\overline{SC}$ signal will go low so that the NG signal will not clock the B and C registers. Accordingly, at such time the A register will have therein the gear which the tests of the present cycle show the transmission should be shifted to, the B register will have the results of the test of the previous cycle and the C register will have the results of the test of the cycle prior to that. The gears in these three registers may, or may not, be the same, depending primarily on the particular transmission speed existing for each of the tests.

The outputs of the A register 321 are applied individually and collectively by NOR gate 326 to the 5-bit comparator 327, along with the outputs of the B register 322 and NOR gate 328. Comparator 327 compares the contents of the A and B registers to see if the gear calculated during the present cycle of operation is higher or lower than the gear calculated in the previous cycle.

The B register outputs are also applied to 5-bit comparator 329, together with the outputs of the C register 323 and the NOR gate 331, so that it may be determined whether the gear calculated in the previous cycle is greater than, equal to or lower than the gear calculated in the cycle of operation prior to that.

Figure 19:
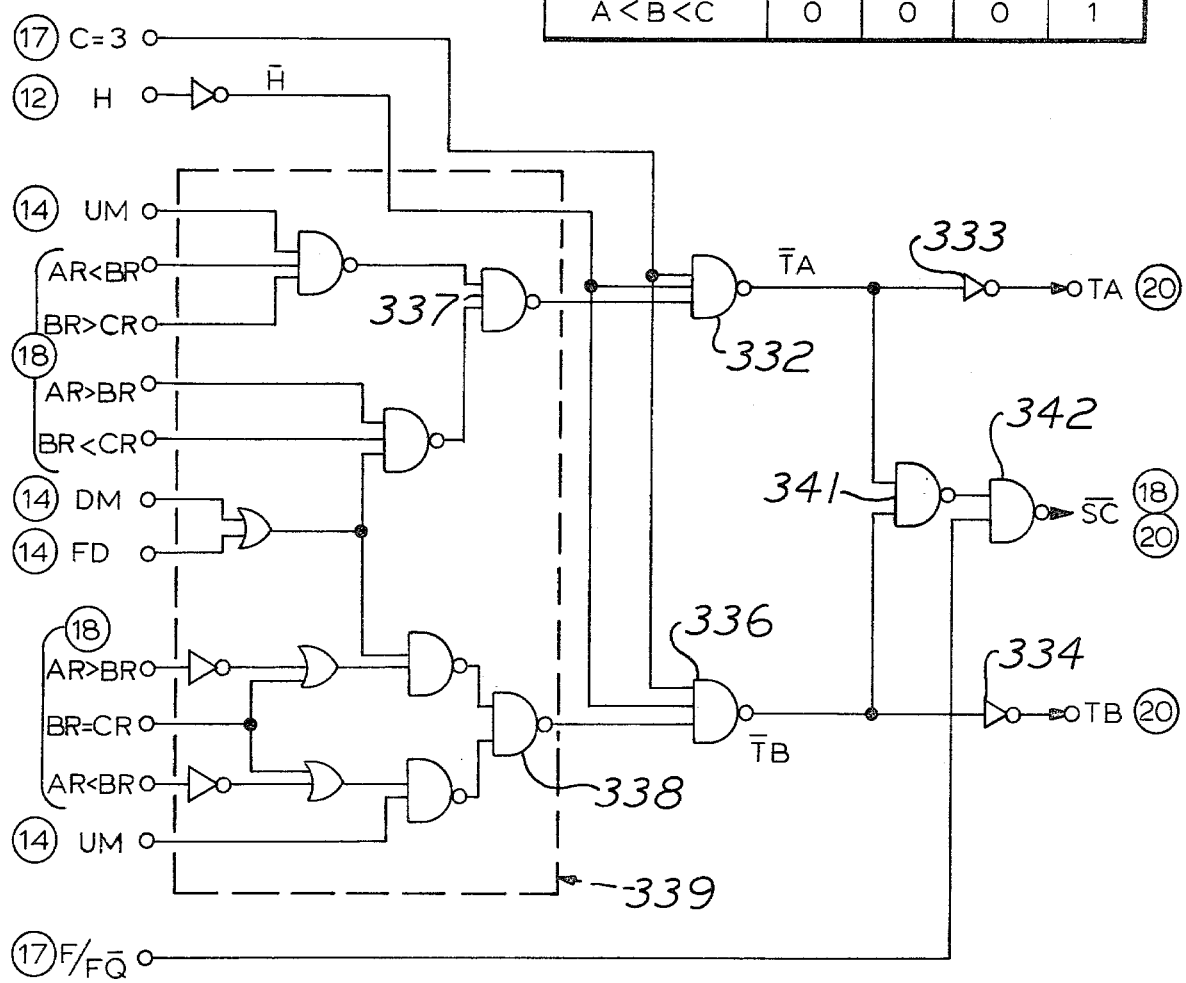
FIG. 19 is a circuit diagram of the transmission control logic which generates the command signal to select the new gear test calculation to be used in the generation of the desired gear signal.

The signals generated as a result of the comparison of the A, B and C registers are used in FIG. 19 to determine which gear the transmission is to be shifted to, or whether new data should be obtained before a shift is made.

In general, a shift to the gear in the A register is to be made if the TA signal is high, whereas a shift to the gear in the B register is to be made if the TB signal is high. If both the TA and TB signals are low, no shift is to be made.

Normally, the output of NAND gate 332 is high, this high being inverted by inverter 333 to produce a normally low TA signal. Likewise, inverter 334 inverts the normally high output of NAND gate 336 so that the TB signal is normally low.

The C=3 signal is applied to both of gates 332 and 336. As described above, the C=3 signal is normally low but will go high when three successive tests of the same character have been carried out. Thus, when the C=3 signal is generated (and providing the operator has not closed the hold switch), a TA or TB signal will be generated depending on the states of the outputs of NAND gates 337 and 338 of logic circuit 339.

Logic circuit 339 logically combines the comparison signals of the A and B register comparator 327 and of the B and C register comparator 329 along with the upshift test signal UM and the forced downshift and downshift signals FD and DM so that the TA and TB signals are generated as set forth in the table, FIG. 19A.

The logic circuit 339 is designed so that if any time two adjacent registers are equal, one of the two registers is selected.

In an upshift case, if A<B<C, than a "no shift" is specified, i.e., TA and TB are both low, because each new sample is approaching the present gear position, and it is best to wait for a new sample. Likewise, in a forced downshift or downshift case, if A>B>C, TA and TB are held low since each new gear sample is approaching the present gear position.

In an upshift case, if A>B>C, this indicates that the vehicle is accelerating and register B is selected since this is an intermediate or conservative selection. Similarly, if in the downshift case, if A<B<C, the vehicle is decelerating and B is a conservative selection.

In the upshift case where A<B>C, register A is a conservative selection because register B is higher than both A and C. Also, register A is the latest sample which should make it a better sample choice. Similarly, if in the downshift case where A>B<C, register A is selected.

In the upshift case where A>B<C, register B is selected because it is less than either A or C and is a conservative selection. Similarly, in the downshift case where A<B>C, register B is selected because it is higher than either A or C and is a conservative selection.

The normally high outputs of gates 332 and 336 are applied to NAND gate 341 so that gate 341 normally outputs a low to NAND gate 342 to maintain a high $\overline{SC}$ signal at its output. The other input of NAND gate 342 comes from the $\overline{Q}$ output of flip-flop 313 (FIG. 17) and is normally high unless there is a loss of the transmission speed signal.

If either a TA or TB signal is generated, the output of gate 341 will go high so that gate 342 will output a low $\overline{SC}$ signal to inhibit clocking of the B and C registers (FIG. 18). (The low $\overline{SC}$ signal, indicating "shift calculated", is also used in FIG. 20 in the generation of the signal for the gear to which the transmission is to be shifted.)

If the hold switch is on, the inverted H signal will prevent either of the TA and TB signals from being generated and will prevent the $\overline{SC}$ signal from going operatively low. Accordingly, even though the control may indicate that a shift should be made, shifting will be inhibited. The B and C registers will continue to be clocked by NG signals so that when the hold switch is turned off by the operator, an updated gear selection is available from the registers.

Figure 20:
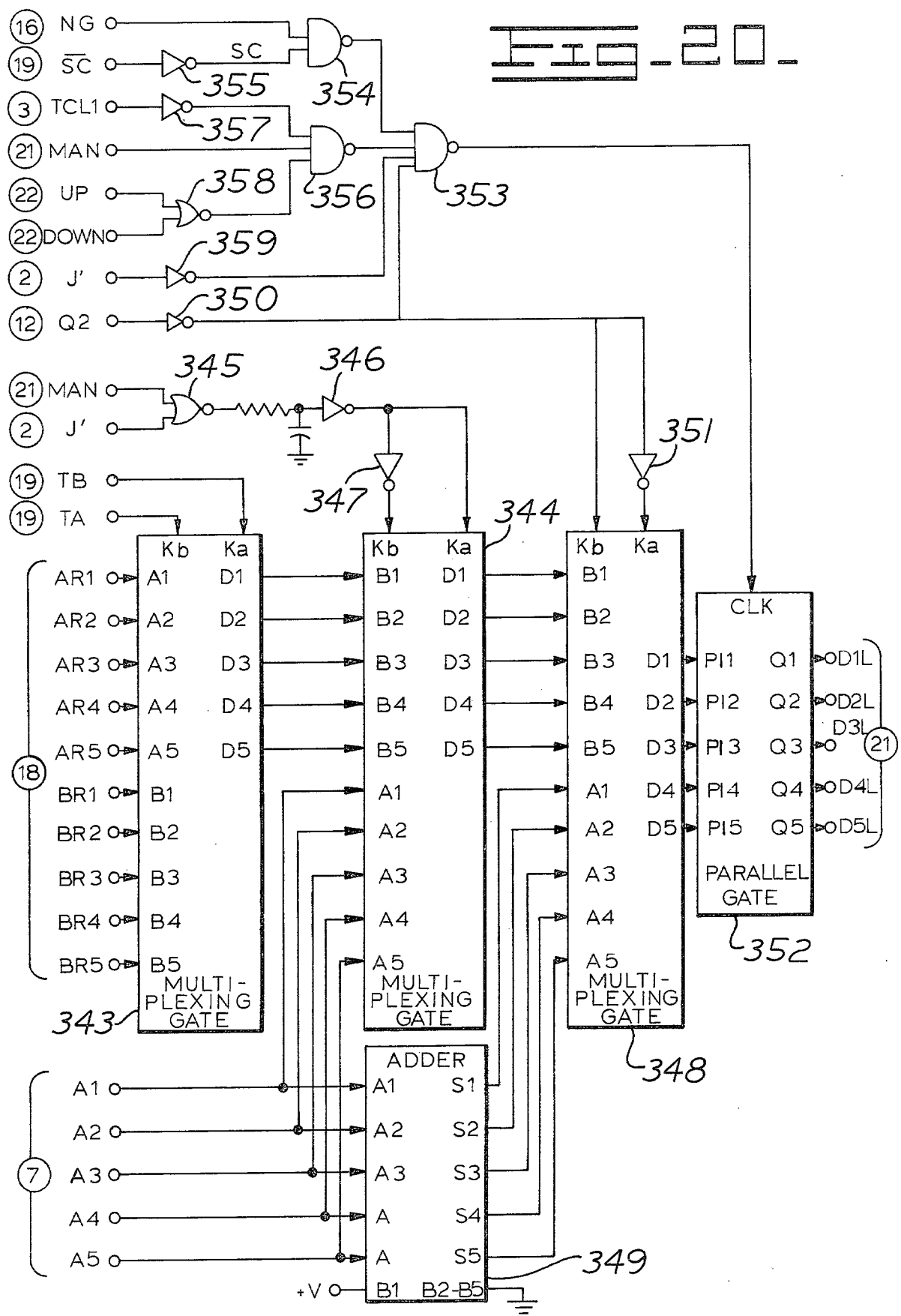
FIG. 20 is a circuit diagram of the portion of the transmission control which generates the desired gear signal.

FIG. 20 illustrates a portion of the new gear processor section of the transmission control.

The AR1-AR5 outputs of the A register and the BR1-BR5 outputs of the B register are applied to the A and B inputs of multiplexing gate 343, respectively. If the TA signal is high, the A register gear sample will pass through to the D outputs of the multiplexing gate. Likewise, if the TB signal is high, to select the B register, the B register gear sample will be at the outputs of the gate.

The outputs of the multiplexing gate 343 are applied to the B inputs of multiplexing gate 344, while the A1-A5 signals representing the gear the transmission is actually in are applied to the A inputs of gate 344.

If the system is in normal automatic operation, the manual signal MAN and the power-up signal J' will both be low so that the output of NOR gate 345 will be high. This high is inverted to a low by inverter 346 and inverted back again to a high by inverter 347 to maintain the Kb control input of multiplexing gate 344 high so that the A or B register code at the inputs of gate 344 will be passed through to the D outputs of the gate.

If the system is being operated in the manual mode, the Ka input of gate 344 will be high so that the actual gear signals A1-A5 will appear at the outputs of gate 344.

Likewise, if there should be a loss of power to the control, the J' signal generated when power is resumed will cause the actual gear signals to appear at the outputs of gate 344.

The outputs of gate 344 are in turn applied to the B inputs of multiplexing gate 348. The A inputs of multiplexing gate 348 are connected to the outputs of binary adder 349. Adder 349 functions to add one bit to the code at its A1–A5 inputs. Thus, if the transmission is in any forward gear, the output of adder 349 represents one gear higher than the actual gear.

Multiplexing gate 348 is controlled by the overspeed signal Q2 which is generated in the event the engine speed reaches 105% of maximum rated speed. Normally Q2 is low, and inverter 350 maintains the Kb control input of gate 348 high so that the outputs of gate 344 will pass through to the outputs of gate 348. However, if the overspeed signal Q2 goes high, inverter 351 will apply a high to the Ka input so that the next higher gear signal from adder 349 will immediately appear at the outputs of multiplexing gate 348.

The outputs of multiplexing gate 348 are applied to the inputs of parallel register 352 and will be latched at the outputs thereof when the register is clocked.

Clocking of register 352 is controlled by NAND gate 353, and clocking will occur if any of the four inputs to gate 353 goes high.

NAND gate 354 and inverter 355 will cause register 352 to be clocked when the new gear calculation for a third successive test are complete (NG is high and $\overline{SC}$ is low). Such clocking of register 352 will thus latch the selected A or B register sample in parallel register 352.

NAND gate 356, inverter 357 and NOR gate 358 logically combine the TCL1 timing pulse, the manual signal MAN and the shift signals UP and DOWN so that register 352 will be clocked at TCL1 if operating in the manual mode, providing an up or down shift is not occurring at the time. This will clock the actual gear signals A1–A5 through to the outputs of register 352.

The power-up signal J', inverted by inverter 359 will clock the register 352 so that the actual gear signals A1–A5 will be latched in the register.

The engine overspeed signal Q2 will clock register 352 so that the actual gear plus one signal from adder 349 will be latched in the outputs of register 352.

Figure 21:
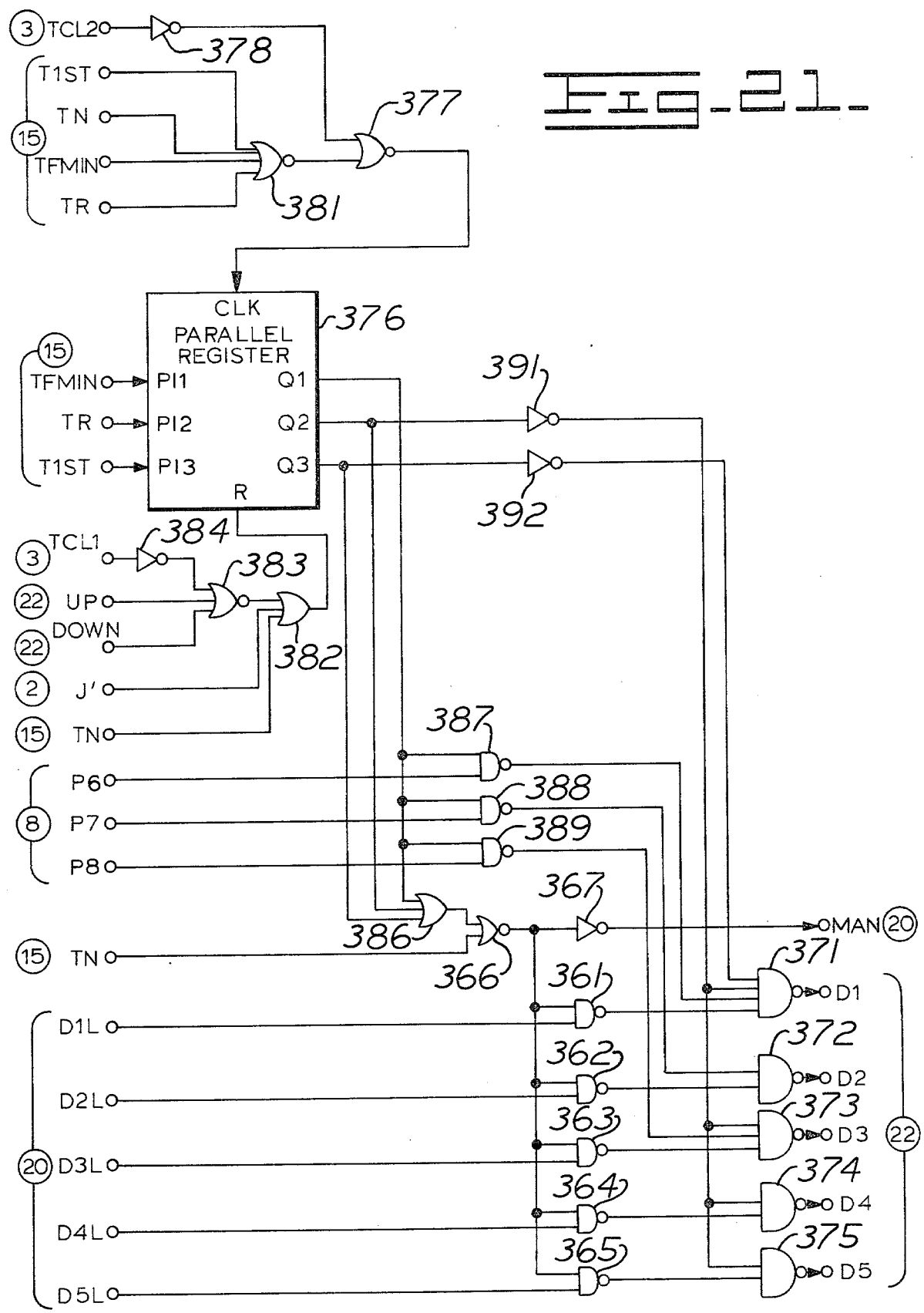
FIG. 21 is a circuit diagram of the portion of the transmission control wherein the desired gear signal of FIG. 20 is overridden by manual signals.

In FIG. 21, the outputs of register 352 are applied individually to NAND gates 361–365. The other inputs of these gates are connected together and to the output of NOR gate 366 which is normally high if the transmission control is not operating in the manual mode. (Inverter 367 inverts such high to a low, so that the manual mode signal MAN is low when not in the manual mode.)

The outputs of NAND gates 361–365 are applied to NAND gates 371–375, respectively. Again, the other inputs of gates 371–375 are all high if the system is not operating in manual mode.

As a consequence, when the system is not operating in manual mode, gates 361–365 and 371–375 function as inverters so that the latched signals D1L–D5L at the output of parallel register 352 will appear as signals D1–D5 at the outputs of gates 371–375. The D1–D5 signals represent the desired gear to which the transmission is to be shifted.

The remaining portion of FIG. 21 illustrates the manner in which the code from register 352 is overriden in the event the system is operating in a manual mode.

As previously described in connection with FIG. 15, if the system is operating in the manual mode, one of the go-to-neutral (TN), go-to-reverse (TR), go-to-first (T1ST) or go-to-minimum-automatic-gear (TFMIN) command signals will be generated.

In FIG. 21, the TFMIN, TR and T1ST signals are applied to parallel register 376 and clocked therethrough when the output of NOR gate 377 goes high. Inverter 378, NOR gate 377 and NOR gate 381 combine the manual command signals and the TCL2 timing signal so that register 376 is clocked at TCL2 time if any one of the manual command signals is present.

Register 376 is reset whenever the output of OR gate 382 goes high. NOR gate 383 and inverter 384 combine the TCL1, UP and DOWN signals so that register 376 will be reset by every TCL1 signal, providing the transmission is not being shifted at such time. Register 376 will also be reset by the power-up signal J', or by the go-to-neutral command signal TN.

If one of the TFMIN, TR or T1ST signals is clocked into register 376, a high will be applied to OR gate 386 so that such high will pass through to NOR gate 366 so that its output will go low. Likewise, if a high TN signal is present, its application to gate 366 will cause its output to go low.

As a consequence, the presence of any manual command signal will cause gate 366 to output a low. Since such low is applied to each of the gates 361–365, all of these gates will have a high output, regardless of the state of the D1L–D5L signals. Also, with gate 366 outputting a low, the manual mode signal MAN will go high.

If the TFMIN signal is present at the Q1 output of register 376 a high will be applied to each of the NAND gates 387, 388, 389. The P6–P8 minimum automatic gear code signals are also applied to these gates. Thus, if second gear has been selected as such gear, P7 will be high, while P6 and P8 will be low. As a consequence, gate 388 will have a low output, while gates 387 and 389 will have a high output. Since the low output of gate 388 is applied to gate 372, signal D2 will be high. Signals D1 and D3–D5 will all be low, corresponding to the code for second gear.

If a high TR signal is present at the Q2 output of register 376, inverter 391 will output a low to gates 371, 373, 374 and 375 so that the D1, D3, D4 and D5 signals are all high. The D2 signal will be low, so that the D1–D5 code is that for reverse gear.

If a high T1ST signal is present at the Q3 output of register 376, inverter 392 will apply a low output to gate 371 so that the D1 signal will be high. All of the inputs to the remaining gates 372–375 will be high so that signals D2–D5 will be low. Accordingly, the desired gear code D1–D5 will be the code for first gear.

If a high TN signal is present, the low output of gate 366 will cause all of the gates 361–365 to have a high output. All of the other inputs to gates 371–375 will be high so that all of the D1–D5 signals will be low, as is true for the neutral gear code.

The desired gear code signals D1–D5 are applied in FIG. 22 to the B0–B4 inputs of the six-bit comparator 393. The D1 and D5 signals are combined by NAND gate 394 and applied to the B5 input. The output of gate 394 will be low when D1 and D5 are high, i.e., when the desired gear is reverse. The actual gear signals A1–A5, together with the $\overline{A=R}$ signal which is low when the actual gear is in reverse are applied to the A inputs of comparator 393. The $\overline{A=R}$ signal is used so that the code for neutral, FIG. 6, applied to comparator 393 will be lower than any of the forward gears and so that the code for reverse will be lower than that for neutral.

If the actual gear is greater than the desired gear that the D signals show the transmission should be shifted to, the A>B output of comparator 393 will go high and the output of AND gate 396 will go high (the other input thereto being normally high) to generate the DOWN signal. This signal is then used in FIG. 2 to cause the actual downshifting of the transmission from the gear it is in to the gear that the transmission control has calculated to be the correct gear for operation.

Similarly, if the actual gear is less than the desired gear, AND gate 397 will go high to generate the UP signal.

If the desired gear code is the same as the code for the gear the transmission is in, then of course neither the UP nor DOWN solenoid is energized since no shift is necessary.

The J signal, high on power-up, is inverted by inverter 398 and applied to gates 396 and 397 to inhibit shifting during power-up, while enabling the gates to respond to the comparator outputs after the power-up delay.

TABLE I

| Signal | Signals Used in Transmission Control | FIG. where signal generated |
|---|---|---|
| | Operator-controlled Gear-selector Cane | |
| P1-P5 | Binary coded signals indicating cane position | 8 |
| P = N | Cane is in neutral position | 8 |
| $\overline{P1}$-$\overline{P5}$ | Inverted binary signals from cane switch | 5 |
| $\overline{NP}$ | Inverted signal from cane switch when cane is neutral | 5 |
| P = F | Cane is in any forward position | 15 |
| P = R | Cane is in reverse position | 15 |
| | Gear Position Signals | |
| A1-A5 | Binary coded signals indicating gear that transmission is actually in | 7 |
| A = N | Transmission is in neutral | 7 |
| $\overline{A1}$-$\overline{A5}$ | Inverted binary signals from gear switch | 7 |
| $\overline{A = N}$ | Inverted signal from gear switch when transmission is in neutral | 7 |
| A = F | Transmission is in any forward gear | 9 |
| $\overline{A = R}$ | Transmission is not in reverse, i.e., it is in neutral or a forward gear | 9 |
| TFIN | Transmission is in any forward automatic gear | 9 |
| A'1-A'4 | Gear code in up/down counter, actual or stepped | 9 |
| A4' | A binary "1" to memory matrix when gear code in up/down counter is for eight-gear (A'4 = 1), or for minimum automatic gear if an upshift cannot be made therefrom | 13 |
| P6-P8 | Preset binary coded signal for minimum automatic gear | 8 |
| AR1-AR5 | Binary coded signal for gear stored in A register | 18 |
| BR1-BR5 | Binary coded signal for gear stored in B register | 18 |
| D1-D5 | Binary coded signal for desired gear to which the transmission is to be shifted | 21 |
| D1L-D5L | Intermediate latched signals used in generation of D1-D5 | 20 |
| | Gear Signal Comparisons | |
| A' = A | Gear in up/down counter is actual gear | 9 |
| A' ≠ A | Gear in up/down counter has been stepped from actual gear | 9 |

TABLE I-continued

| Signal | Signals Used in Transmission Control | FIG. where signal generated |
|---|---|---|
| A' > FM | Gear in up/down counter is higher than minimum automatic gear | 9 |
| A' < FM | Gear in up/down counter is lower than minimum automatic gear | 9 |
| A' > P | Gear in up/down counter is higher than cane position | 9 |
| A' < P | Gear in up/down counter is lower than cane position | 9 |
| AR > BR, | Comparisons of gear stored in A register | 18 |
| AR = BR, | to gear stored in B register | 18 |
| AR < BR | | 18 |
| BR > CR, | Comparisons of gear stored in B register | 18 |
| BR = CR, | to gear stored in C register | 18 |
| BR < CR | | 18 |
| | Speed Signals | |
| ES | Pulsed signal having a frequency proportional to engine speed | 1 |
| Q2 | 105% of rated maximum engine speed | 12 |
| TS | Pulsed signal having a frequency proportional to transmission speed | 1 |
| M1-M10 | Binary-coded, programmed signals from memory matrix representing maximum or minimum transmission speeds for shifting from any given gear addressed to matrix | 10 |
| | Speed Comparisons | |
| S M, | Compares the magnitude of the actual | 11 |
| S M | transmission speed with the programmed speed of the memory for a given gear | 11 |
| S = T | Transmission speed corresponds to a vehicle speed greater than 2 mph | 11 |
| S 2MPH | Vehicle speed is less than 2 mph | 11 |
| S 30RPM | Transmission speed is less than 30 rpm | 11 |
| S = TR | Vehicle speed is less than 2 mph and gear in up/down counter is equal to or less than minimum automatic gear | 11 |
| | Other Input Signals to Control | |
| HS | Manually operable hold switch used by vehicle operator to inhibit shifting | 12 |
| H | Hold signal when hold switch is closed | 12 |
| Bed | Vehicle bed is raised | 15 |
| Park | Vehicle parking brake is applied | 15 |
| TDZ-TD3 | Binary coded throttle demand signals (if used) | 10A |
| | Timing Signals | |
| CL1-CL4 | Non-overlapping sequential signals, each occurring 256 times in 0.1 second | 3 |
| Q12 | Generated every 0.1 second | 3 |
| T | Generated in response to Q12 signal | 3 |
| TCL1 | The first CL1 pulse in a 0.1-second cycle | 3 |
| TCL2 | The first CL2 pulse in a 0.1-second cycle | 3 |
| | Secondary Signals | |
| C = 3 | Three consecutive 0.1-second cycles of a forced downshift, upshift or downshift mode of operation have occurred | 17 |
| DM | Test for downshift | 14 |
| DM' | An upshift from the actual gear cannot be made | 13 |
| FD | Test for forced downshift | 14 |
| F/$\overline{FQ}$ | Indicates malfunction of transmission speed-sensing system | 17 |
| J, J' | Power-up signals | 2 |
| MAN | Operation is in manual mode | 21 |
| NG | Testing for a new gear has been carried to operator-imposed or transmission speed limits | 16 |
| $\overline{SC}$ | Operative when C = 3 signal has been generated | 19 |
| UM | Test for upshift | 14 |
| UMR | Used to reset upshift test signal | 13 |
| | Internal Command Signals | |
| TA | Use A register for desired gear | 19 |

TABLE I-continued
Signals Used in Transmission Control

| Signal | | FIG. where signal generated |
|---|---|---|
| TB | Use B register for desired gear | 19 |
| T1ST | Shift transmission to first gear | 15 |
| TFMIN | Shift transmission to minimum automatic gear | 15 |
| TN | Shift transmission to neutral | 15 |
| TR | Shift transmission to reverse | 15 |
| External Command Signals | | |
| LUC | Energize lock-up clutch to shift transmission from torque converter drive to direct drive | 13 |
| OS | Energize overspeed warning light | 12 |
| UP | Energize upshift solenoid | 22 |
| DOWN | Energize downshift solenoid | 22 |

Operation

Although the details of the various circuits have been fully described above, it is believed that a generalized summary of operation will be useful in understanding the invention.

During operation, the P signals (representing the operator-controlled cane) and the A signals (representing the actual gear that the transmission is in) will be latched into the transmission control as soon as movement of the cane to a particular position is completed or as soon as a shift of gears has been completed, as the case may be. Such signals will remain latched in the control until such time as the operator moves the cane to another position or an actual shifting of gears is made.

The P signals from the cane switch are used to determine whether the control should operate in manual (reverse, neutral, first or minimum automatic gear) mode or in the automatic mode (FIGS. 15 and 21). Also, when operating in the automatic mode, the P signals are used to set the maximum gear of the automatic range in accordance with the position of the cane (FIG. 9).

The A signals from the gear switch are used as primary information in four different portions of the control. When operating in the manual mode, the actual gear signals are applied to the multiplexing gate 344 and are clocked through to the outputs of latch 352 (FIG. 20). The actual gear signals are also applied to the comparator 393 (FIG. 22) wherein the desired manual mode gear signals are compared therewith to determine if the transmission is to be upshifted or downshifted to the desired manual gear.

When operating in the automatic mode, the actual gear signals are fed into the up/down counter 119 (FIG. 9) to serve as a starting point for the determination of whether a shift should be made, and, if so, how far. The actual gear signals are also applied to the binary adder 349 (FIG. 20) so that the actual gear +1 is applied to multiplexing gate 348 in the event that an engine overspeed condition calls for an immediate upshift. As in the manual mode, the actual gear signals are applied to the comparator 393 (FIG. 22) wherein the desired gear found by the shift calculation is compared therewith to order an up or downshift from the actual gear to the calculated desired gear.

Whether the control is operating in the manual or automatic mode, the timing signals (FIGS. 3 and 4) are being continuously generated. The Q12 pulse which ends a 0.1-second cycle of operation stops the counting of the transmission speed pulses (FIG. 11) and the counting of the engine speed pulses. Additionally the Q12 pulse generates the T signal to start a new 0.1-second cycle of operation.

The TCL1 pulse is used primarily to reset the various components at the beginning of the cycle. For example, it resets the flip-flops 211, 218 and 221 on FIG. 14 that generate the test signals FD, UM and DM which are used in testing for forced downshift, upshift or downshift. Also, the TCL1 pulse resets the flip-flops 253 (FIG. 16) used in the previous cycle to generate the NG signal.

The TCL1 signal also latches the transmission speed counted in the previous cycle so that such speed count can be used in the present 0.1-second cycle.

The TCL2 pulse is used to reset the transmission and engine speed counters and to terminate the Q12 timing pulse so that the present transmission and engine speed can again be determined for use in the subsequent cycle.

The TCL2 pulse also causes the actual gear to be entered into the up/down counter 119 (FIG. 9) so that such counter is reset to the actual gear, and resets the A'=A flip-flop 136, so that a new determination may be made as to whether an automatic shift from the actual gear should be made.

The sequence of operation for the automatic portion of the control during a 0.1-second cycle of operations is set forth in FIGS. 23-27. The numbers in circles identify the figure numbers wherein the described operation is carried out.

Beginning with FIG. 23, once the actual gear signal has been entered into the up/down counter, the control immediately check to see if the operator is calling for a forced downshift. If he is, the system will stay in a forced downshift mode for the remainder of the cycle. At the first CL4 pulse, the system will see if the transmission speed is low enough to allow any downshift from the present gear. If not, an NG signal will be generated on the next CL1 pulse and the system will wait for the next T pulse to see if the new speed sample will allow a forced downshift from the present gear.

However, if at the first CL4 pulse it is determined that a downshift can be made, then the up/down counter is stepped down so that the gear code therein represents the next-lower gear. Again, a test is made to see if a downshift could be made from the next-lower gear. If it is determined that conditions are such that a downshift can be made from this next gear, the up/down counter is again down-stepped so that the A' code therein is that for two gears lower than what the transmission is actually in. Such testing and stepping is continued. Any time that the test shows that a downshift cannot be made from the gear being considered, the NG signal is generated and calculations are stopped for the remainder of the 0.1-second cycle. The same process is carried out in the succeeding 0.1-second cycles of operation to see how far down in each cycle the transmission should be shifted.

Once three successive cycles of operation have shown that the transmission can be downshifted (and how far), the C=3 signal will be generated, and the appropriate A or B register is used to generate the desired gear signals to which the transmission is to be shifted.

At such time, i.e., after the C=3 signal, the transmission is shifted from the gear it is in to the gear which the control allows it to go to.

If the system finds at the outset that the operator is not calling for a forced downshift, the system will go immediately to an upshift test mode (FIG. 25). In like manner, the system checks to see if an upshift can be made. If it can (i.e., if the actual gear is below the cane position and the transmission speed is high enough to allow an upshift from the actual gear) then the up/down counter is stepped up on gear position. This gear is tested to see if an upshift can be made therefrom. Again, testing and stepping continue until the gear being considered is such that an upshift cannot be made therefrom, and the NG signal is generated. The cycle of operation is repeated twice to get a C=3 signal so that an upshift can then be made to the gear that the system indicates is the proper gear.

If an upshift cannot be made from the present gear, the logic branches out to FIG. 26 to see if a downshift should be made (and, if so, how far). Again, three downshift samples are required, one from each of three successive cycles of operation, before a downshift is made.

If in a cycle of operation the system determines that a forced downshift is not being demanded and that the transmission should neither be shifted up or down, the NG signal will be generated, the up/down counter will not be stepped, the FD, Um and DM counters will be reset, the actual gear code will be in the A register and the transmission will be left in its present gear.

The Q2 overspeed signal provides a partial override of the automatic shifting operation to reduce engine overspeed. A problem exists when vehicles descend a grade which is so steep that normal automatic upshifting cannot occur fast enough to prevent engine overspeed. If an initial upshift is made as the vehicle starts to descend the grade, the anti-hunt timer 309 (FIG. 17) will delay further recalculations for approximately 0.75 seconds and another 0.3 seconds after that would be required for three new upshift calculations before a further upshift would occur. During this time lag the engine speed could reach an undesirably high level. This is avoided in the present invention by the continuous monitoring of the engine speed. If the engine speed increases to 105% of maximum rated speed, such speed will be sensed in a 0.1-second cycle of operations and the Q2 signal will be generated at the beginning of the next cycle, at TCL2 time. This signal will immediately change the desired gear code applied to the comparator 393 (FIG. 22) to the actual gear plus one code so that an upshift is made immediately, without waiting for the anti-hunt timer to time out or for a C=3 calculation signal. An upshift will not be made beyond the maximum gear set by the cane position, since an A'<P signal is needed for the generation of the Q2 overspeed signal.

If the engine speed increases to 110% of maximum rated speed, as a result of descending a grade in the wrong maximum gear or as a result of incorrect brake application, the 110% overspeed signal OS is used in the present invention to warn the operator to take corrective action. If desired, such signal could be used to provide a suitable automatic corrective action.

If the transmission speed signal is lost while operating in a forward gear higher than the minimum automatic gear, the control would downshift the transmission to the minimum gear after three cycles of new gear calculations, an event which could cause severe engine overspeed. This condition is prevented by the S<30 RPM signal which sets flip-flop 313 (FIG. 17) and inhibits generation of the shift calculated signal $\overline{SC}$ (FIG. 19). As a consequence the transmission will remain in the gear it was in when the transmission speed signal was lost until the operator puts the cane into a position to shift the transmission into neutral or reverse. Once in neutral or reverse the transmission can be put into reverse or up to the minimum automatic gear so that the vehicle can move under its own power to the maintenance area. The transmission will not upshift from the minimum automatic gear since the transmission control will regard the transmission as having insufficient speed to warrant an upshift.

The manual signals override the automatic shifting portion of the control in that the TN, TR, T1ST and TFMIN signals will generate desired gear signals corresponding to neutral, reverse, first or second regardless of the automatic mode signals. During the time the control is operating in manual mode, the MAN signal will actuate the multiplexing gate 344 and clock the parallel register 352 (FIG. 20) so that the actual gear signals A1–A5 will be latched at the output of register 352. Thus, when the operator goes to the automatic range of operation, the transmission will remain in the manual gear it was in until automatic mode signals TA or TB have been generated to select the code in the A or B register and the NC and $\overline{SC}$ signals have been generated to change the outputs of register 352 to the new desired gear.

Although the minimum automatic gear is in the range of gears from which automatic upshifts can be or into which automatic downshifts can be made, operation in such gear may be considered as a manual mode operation when the operator places the gear-selecting cane in the gear position which is such gear. Thus, if second gear is the one preselected as the minimum automatic gear (as shown in the present drawings), operation of the vehicle will be confined to second gear if the cane is in second gear position. The automatic shift logic is such that an automatic downshift cannot be made from minimum automatic gear since the A'>FM signal is required for a downshift (FIG. 14). Likewise, an automatic upshift cannot be made unless the actual gear is less than the cane position, A'<P (FIG. 16). Accordingly if the cane is in minimum automatic gear, such gear is equal to, rather than less than, the cane position and an automatic upshift cannot be made therefrom. Upshifting can only occur if the operator then moves the cane to a higher position. Even though the operator may position the cane to confine operation to the minimum automatic gear, the control will still function to change automatically from torque converter drive to direct drive, and vice versa, depending on the transmission speed (FIG. 13).

The operator-controlled hold switch is used, when closed, to inhibit the generation of the TR and TFMIN signals (FIG. 15). This allows the operator to shift the cane from a forward position to reverse, and to delay an actual shift into reverse until such time as the operator opens the hold switch. Likewise, if the transmission is in reverse, the operator may close the hold switch to hold the transmission in reverse while he shifts the cane to the minimum automatic gear (or higher). Shifting from reverse into such forward gear will be delayed until such time as the hold switch is opened.

If the transmission is operating in the automatic range, the operator may close the hold switch to keep the transmission in the gear it is in. The H signal resulting from the closure of such switch will inhibit the shift calculated signal $\overline{SC}$ from going operatively low (FIG. 19). As a consequence, register 352 will not be clocked and the latched output signals will remain those for the gear that the transmission was in when the hold switch was closed (FIG. 20). With the $\overline{SC}$ signal being inhibited from going low, the B and C register (FIG. 18) will continue to be shifted on each NG signal so that the registers are continuously updated as to the gear that the transmission should be shifted to. When the hold switch is opened the transmission will shift to such gear. As mentioned previously, the hold signal H will disappear, even though the hold switch is closed, in the event the engine speed drops to approximately low idle (FIG. 12), so that the operator cannot hold the transmission in a high gear if conditions are such as to cause the engine to lag.

When power is first applied to the transmission control, the power-up signal J will inhibit generation of the UP or DOWN signals (FIG. 22). The power-up signal J' is used in FIG. 20 to actuate multiplexing gate 337 and to clock register 352 so that the actual gear appears at the outputs of register 352. As a consequence, the transmission will not be shifted during power-up, nor will it be shifted following the J and J' power-up signals until such time as a manual mode signal for shifting or an automatic mode shift has been calculated.

The same situation will occur if the vehicle is in operation and a momentary loss of power occurs. During the time that power is lost the shift signals UP or DOWN cannot be generated. When power is restored, generation of the UP and DOWN signals is inhibited by the J pulse and the transmission is maintained in the gear it was in until such time after the J and J' power-up signals go low that a manual or automatic shift signal is given.

The embodiments of the invention in which an exclusive property or privilege is claimed are defined as follows:

1. The method of shifting a transmission having a plurality of gears progressively increasing in ratio from a minimum gear to a maximum gear, said method comprising:
    (a) predetermining the upshift transmission speed point and the downshift transmission speed point for each of said gears,
    (b) obtaining a sample of the instantaneous actual transmission speed,
    (c) comparing said speed sample with at least one of the shift points of the actual gear in which said transmission is operating,
    (d) determining if said speed sample is either above the upshift speed point or below the downshift speed point of said actual gear,
    (e) if a determination is made in step (d) that said speed sample is above the upshift speed point of said actual gear, the further steps of:
        (1) comparing said speed sample with the upshift speed points of gears progressively higher than said actual gear,
        (2) finding the first of said progressively higher gears having an upshift speed point greater than said speed sample,
        (3) shifting said transmission from said actual gear to the gear found in step (e)(2),
    (f) if a determination is made in step (d) that said speed sample is less than the downshift speed point of said actual gear, the further steps of:
        (1) comparing said speed sample with the downshift speed points of gears progressively lower than said actual gear,
        (2) finding the first of said progressively lower gears having a downshift speed point lower than said speed sample,
        (3) shifting said transmission from said actual gear to the gear found in step (f)(2).

2. The method of shifting a transmission having a plurality of gears progressively increasing in ratio from a minimum gear to a maximum gear, said method comprising:
    (a) predetermining the upshift transmission speed point and the downshift transmission speed point for each of said gears,
    (b) periodically obtaining samples of the instantaneous actual speed of said transmission,
    (c) comparing the actual gear the transmission is in which said minimum and maximum gears,
    (d) comparing one of said speed samples with at least one of the shift points of the actual gear in which said transmission is operating,
    (e) determining if either of the following two conditions exists:
        (1) the actual gear is lower than the maximum gear and said speed sample is above the upshift speed joint for the actual gear,
        (2) the actual gear is above the minimum gear and said speed sample is below the downshift speed point for the actual gear,
    and if so, carry out one of the steps (f) or (g),
    (f) if a determination is made in step (e) that the condition (e)(1) exists, the further steps of:
        (1) simultaneously comparing said speed sample with the upshift speed points of gears progressively higher than said actual gear, and comparing said progressively higher gears with said maximum gear,
        (2) finding the first of said progressively higher gears which is either the same as the maximum gear or which has an upshift speed point greater than said speed sample,
        (3) shifting said transmission from said actual gear to the gear found in step (f)(2),
    (g) if a determination is made in step (e) that the condition (e)(2) exists, the further steps of:
        (1) simultaneously comparing said speed sample with the downshift speed points of gears progressively lower than said actual gear, and comparing said progressively lower gears with said minimum gear,
        (2) finding the first of said progressively lower gears which is either the same as said minimum gear or which has a downshift speed point lower than said speed sample,
        (3) shifting said transmission from said actual gear to the gear found in step (g)(2).

3. The method as set forth in claim 2, wherein step (f) further includes, subsequent to step (f)(2), repeating steps (c), (d), (e), (f)(1) and (f)(2) with subsequent speed sample signals and carrying out step (f)(3) with respect to the gear found in one of the (f)(2) steps, when, and only when, the condition (e)(1) exists with respect to each of a predetermined number of consecutive speed samples, and wherein step (g) further includes, subsequent to step (g)(2), repeating steps (c), (d), (e), (f)(1) and (f)(2) with subsequent speed samples and carrying out step (f)(3) with respect to the desired gear found in one of the (f)(2) steps, when, and only when, the condition (e)(2) exists with respect to each of a predetermined number of consecutive speed samples.

4. The method of upshifting a transmission having an automatic range comprising a plurality of gears progressively increasing in ratio from a minimum gear to a maximum gear, said method comprising:
 (a) predetermining the upshift transmission speed points for each of the gears in said range and generating separate signals for said speed points,
 (b) generating separate signals indicative of the actual gear that said transmission is in and gears progressively higher than said actual gear,
 (c) generating a signal indicative of said maximum gear,
 (d) generating a speed signal indicative of the actual speed of said transmission,
 (e) comparing said maximum gear signal separately with said signals for said actual gear and said progressively higher gears,
 (f) comparing said transmission speed signal separately with the upshift speed point for said actual gear and said progressively higher gears,
 (g) determining from said comparison of steps (e) and (f), the highest gear wherein both of the following conditions exist:
  (1) such highest gear is below said maximum gear,
  (2) the upshift speed point for such highest gear is below the actual transmission,
 (h) determining the gear next higher than the gear determined in step (g),
 (i) shifting said transmission from said actual gear to said gear determined in step (h).

5. The method of upshifting a transmission having an automatic range comprising a plurality of gears progressively increasing in ratio from a mimimum gear to a maximum gear, said method comprising:
 (a) generating a gear signal indicative of the actual gear that said transmission is in,
 (b) generating a gear signal indicative of said maximum gear,
 (c) generating a speed signal indicative of the actual transmission speed,
 (d) generating an upshift speed point signal indicative of the transmission speed at which an upshift can be made from said actual gear,
 (e) comparing said gear signals of steps (a) and (b) and determining if the condition exists that said actual gear is below said maximum gear,
 (f) comparing said transmission speed and said speed point signals of steps (c) and (d) and determining if the condition exists that the actual transmission speed is above the upshift speed point for said actual gear,
 (g) carrying out the following steps if the conditions of steps (e) and (f) both exist,
 (h) generating a gear signal indicative of the next-higher gear than said actual gear,
 (i) generating an upshift speed point signal indicative of the transmission speed at which an upshift can be made from said next-higher gear,
 (j) comparing said gear signals of steps (b) and (h) and determining if the condition exists that said next-higher gear is below said maximum gear,
 (k) comparing said transmission speed and speed point signals of steps (c) and (i) and determining if the condition exists that the actual transmission speed is above the upshift speed point for said next-higher gear,
 (l) repeating steps (h) through (k), if necessary, with a progressively higher gear each time, and determining which gear higher than said actual gear is the first gear wherein at least one of the conditions of steps (j) and (k) is not met,
 (m) shifting said transmission from said actual gear directly to said first gear determined in step (l).

6. The method of downshifting a transmission having an automatic range comprising a plurality of gears progressively increasing in ratio from a minimum gear to a maximum gear, said method comprising:
 (a) predetermining the downshift transmission speed points for each of the gears in said range and generating separate signals for said speed points,
 (b) generating separate signals indicative of the actual gear that said transmission is in and gears progressively lower than said actual gear,
 (c) generating a signal indicative of said minimum gear,
 (d) generating a speed signal indicative of the actual speed of said transmission,
 (e) comparing said minimum gear signal separately with said signals for said actual gear and said progressively lower gears,
 (f) comparing said transmission speed signal separately with the downshift speed point signals for said actual gear and said progressively lower gears,
 (g) determining from said comparison of steps (e) and (f), the lowest gear wherein both of the following conditions exist:
  (1) such lowest gear is above said minimum gear,
  (2) the downshift speed point for such lowest gear is above the actual transmission speed,
 (h) determining the gear next lower than the gear determined in step (g),
 (i) shifting said transmission from said actual gear to said gear determined in step (h).

7. The method of downshifting a transmission having an automatic range comprising a plurality of gears progressively increasing in ratio from a minimum gear to a maximum gear, said method comprising:
 (a) generating a gear signal indicative of the actual gear that said transmission is in,
 (b) generating a gear signal indicative of said minimum gear,
 (c) generating a speed signal indicative of the actual transmission speed,
 (d) generating a downshift speed point signal indicative of the transmission speed at which a downshift can be made from said actual gear,
 (e) comparing said gear signals of steps (a) and (b) and determining if the condition exists that said actual gear is above said minimum gear,
 (f) comparing said transmission speed and said speed point signals of steps (c) and (d) and determining if the condition exists that the actual transmission speed is below the downshift speed point for said actual gear,
 (g) carrying out the following steps if the condition of steps (e) and (f) both exist, (h) generating a gear signal indicative of the next-lower gear than said actual gear,
(i) generating a downshift speed point signal indicative of the transmission speed at which a downshift can be made from said next-lower gear,
(j) comparing said gear signals of steps (b) and (h) and determining if the condition exists that said next-lower gear is above said minimum gear,
(k) comparing said transmission speed and speed point signals of steps (c) and (i) and determining if the condition exists that the actual transmission speed is below the downshift speed point for said next-lower gear,
(l) repeating steps (h) through (k), if necessary, with a progressively lower gear each time, and determining which gear lower than said actual gear is the first gear wherein at least one of the conditions of steps (j) and (k) is not met,
(m) shifting said transmission from said actual gear directly to said first gear determined in step (l).

8. The method of shifting a transmission having an automatic range comprising a plurality of gears progressively increasing from a minimum gear to a maximum gear, said transmission having a gear-selector cane for selecting a maximum operating gear, said method comprising:
 (a) initially selecting a maximum operating gear in said range and operating said transmission in said automatic range in a gear above said minimum gear and no higher than said initially selected maximum operating gear,
 (b) subsequently selecting a maximum operating gear in said range which is lower than the actual gear said transmission is operating in,
 (c) predetermining the downshift speed points for each gear of said automatic range to the next lower gear of said range, and generating separate signals indicative of each of said speed points,
 (d) generating signals each representative of said subsequently selected maximum operating gear, and said actual gear,
 (e) periodically sampling the instantaneous actual speed of said transmission and generating speed sample signals indicative of the speed of each sample,
 (f) comparing said actual gear signal with said subsequently selected maximum operating gear signals,
 (g) comparing one of said speed sample signals with the downshift speed point signal for said actual gear,
 (h) determining from the comparison of steps (f) and (g) whether the following conditions exist:
  (1) the gear signals are indicative that said actual gear is higher than said subsequently selected maximum operating gear, and
  (2) the speed signals are indicative that the actual transmission speed is lower than the downshift speed point for the actual gear,
 (i) if in step (h) it is determined that the two conditions are not met, repeat steps (e), (f), (g) and (h) with subsequent speed sample signals until both conditions of step (h) are met,
 (j) generating, after both conditions of the first or subsequent step (h) have been met, gear signals indicative of gears progressively lower than said actual gear,
 (k) comparing said gear signals of said progressively lower gears with said subsequently selected maximum operating gear signal,
 (l) comparing the speed sample signal used in the step (h) wherein all three conditions of step (h) were first met with the downshift speed point signals for said progressively lower gears,
 (m) determining from the comparison of steps (k) and (l) which is the first of said progressively lower gears wherein either one of the following two conditions exists:
  (1) the gear signals are indicative that said lower gear is the same as said subsequently selected maximum operating gear,
  (2) the speed signals are indicative that the actual transmission speed is above the downshift speed point of said lower gear,
 (n) shifting said transmission from said actual gear to said first of said progressively lower gears wherein one of the conditions of step (m) exists,
 (o) repeating steps (d)–(n) as often as necessary until said transmission is shifted to the gear selected in step (b).

9. The method of shifting a transmission having an automatic range comprising a plurality of gears progressively increasing from a minimum gear to a maximum gear, said transmission having a gear-selector cane for selecting a maximum operating gear, said method comprising:
 (a) initially selecting a maximum operating gear in said range and operating said transmission in said automatic range in a gear above said minimum gear and no higher than said initially selected maximum operating gear,
 (b) subsequently selecting a maximum operating gear lower than the actual gear said transmission is operating in,
 (c) predetermining the downshift speed points for each gear of said automatic range to the next lower gear of said range, and generating separate signals indicative of each of said speed points,
 (d) generating signals representative of said minimum gear, said subsequently selected maximum operating gear, and said actual gear,
 (e) periodically sampling the instantaneous actual speed of said transmission and generating speed sample signals indicative of the speed of each sample,
 (f) comparing said actual gear signal with said subsequently selected maximum and minimum gear signals,
 (g) comparing one of said speed sample signals with the downshift speed point signal for said actual gear,
 (h) determining from the comparison of steps (f) and (g) whether the following conditions exist:
  (1) the gear signals are indicative that said actual gear is higher than said subsequently selected maximum operating gear, and
  (2) the gear signals are indicative that said actual gear is higher than said minimum gear, and
  (3) the speed signals are indicative that the actual transmission speed is lower than the downshift speed point for the actual gear,
 (i) if in step (h) it is determined that not all three of the conditions are met, repeat steps (e), (f), (g) and (h) with subsequent speed sample signals until all three conditions of step (h) are met, (j) generating, after all three conditions of the first or subsequent step (h) have been met, gear signals indicative of gears progressively lower than said actual gear, (k) comparing said gear signals of said progressively lower gears with said subsequently selected maximum and minimum gear signals, (l) comparing the speed sample signal used in the step (h) wherein all three conditions of step (h) were first met with the downshift speed point signals for said progressively lower gears, (m) determining from the comparison of steps (k) and (l) which is the first of said progressively lower gears wherein any one of the following conditions exists:
  (1) the gear signals are indicative that said lower gear is the same as said subsequently selected maximum operating gear,
  (2) the gear signals are indicative that said lower gear is the same as said minimum gear,
  (3) the speed signals are indicative that the actual transmission speed is above the downshift speed point of said lower gear, (n) shifting said transmission from said actual gear to said first of said progressively lower gears wherein one of the conditions of step (m) exists, (o) repeating steps (d)–(n) as often as necessary until said transmission is shifted to the gear selected in step (b).

10. In a method of controlling the shifting of a transmission having a plurality of gears in an automatic range progressively increasing in ratio from a minimum gear to a maximum gear, said transmission having a gear-selector cane associated therewith for selecting the maximum operating gear in said range, the steps of:

(a) periodically sampling the instantaneous actual speed of said transmission and determining the transmission speed each time such speed is sampled, (b) each time the transmission speed is sampled, and with respect to the minimum gear, the selected maximum operating gear and the actual gear the transmission is in at such time:
  (1) determining whether the actual gear is higher than said maximum operating gear selected by said cane, and,
    (a) if so, determining whether the transmission speed is below the predetermined downshift speed point for the actual gear, and,
      (1) if so, determining the lowest gear to which said transmission may be shifted,
      (2) if not, repeat steps (d)–(g) at the next time said transmission speed is sampled,
    (b) if not,
  (2) determining whether the actual gear is below said selected maximum operating gear and the transmission speed is above the predetermined upshift speed point for the actual gear, and,
    (a) if so, determining the highest gear to which said transmission may be shifted,
    (b) if not,
  (3) determining whether the actual gear is above said minimum gear and the transmission speed is below the predetermined downshift speed point for the actual gear, and,
    (a) if so, determining the lowest gear to which said transmission may be shifted,
    (b) if not, repeat step (b) at the next time said transmission speed is sampled.

11. The method as set forth in claim 10 wherein step (b)(1)(a)(1) comprises:
  (a) determining with respect to said selected maximum operating gear and the gear next lower than said actual gear, and with respect to the same transmission speed sample, whether said next lower gear is higher than said maximum operating gear and whether the transmission speed is below the predetermined downshift speed point for said next lower gear, and
    (1) if both conditions are determined to exist with respect to the lower gear being considered, repeating such step with respect to progressively lower gears until a determination is made that at least one of such conditions is not met with respect to the gear being considered,
    (2) determining that the gear being considered is the lowest gear to which said transmission may be shifted when a determination is made that at least one of such conditions is not met with respect to such gear being considered.

12. The method as set forth in claim 10 and further including:
  (c) determining when step (b)(1)(a)(1) has been performed with respect to a predetermined number of consecutive transmission speed samples,
  (d) shifting said transmission from said actual gear to the lowest gear determined in a selected one of said (b)(1)(a)(1) steps when the determination in step (h) has been made.

13. The method as set forth in claim 10 and further including:
  (c) determining when step (b)(2)(a) has been performed with respect to at least three consecutive transmission speed samples,
  (d) shifting said transmission from said actual gear to the highest gear determined in a selected one of said (b)(2)(a) steps when the determination in step (h) has been made.

14. The method as set forth in claim 10 wherein step (b)(2)(a) comprises:
  (1) determining with respect to said selected maximum operating gear and the gear next higher than said actual gear, and with respect to the same transmission speed sample, whether said next higher gear is lower than said maximum operating gear and whether the transmission speed is above the predetermined upshift speed point for said next higher gear, and
    (a) if both conditions are determined to exist with respect to the higher gear being considered, repeating such step with respect to progressively higher gears until a determination is made that at least one of such conditions is not met with respect to the gear being considered,
    (b) determining that the gear being considered is the highest gear to which said transmission may be shifted when a determination is made that at least one of such conditions is not met with respect to such gear being considered.

15. The method as set forth in claim 10 and further including:
  (c) determining when step (b)(2)(a) has been performed with respect to a predetermined number of consecutive transmission speed samples,
  (d) shifting said transmission from said actual gear to the highest gear determined in a selected one of said (b)(2)(a) steps when the determination in step (h) has been made.

16. The method as set forth in claim 10 and further including:
   (c) determining when step (b)(1)(a)(1) has been performed with respect to at least three consecutive transmission speed samples,
   (d) shifting said transmission from said actual gear to the lowest gear determined in a selected one of said (b)(1)(a)(1) steps when the determination in step (h) has been made.

17. The method as set forth in claim 16, and further including:
   (e) operating said transmission in direct mechanical drive when said transmission is in a gear higher than said minimum gear,
   (f) operating said transmission in torque converter drive while carrying out the shifting step (d) and for a predetermining period of time following completion of said shifting step and thereafter returning said transmission to operating in direct mechanical drive.

18. The method as set forth in claim 10 wherein step (b)(3)(a) comprises:
   (1) determining with respect to said minimum gear and the gear next lower than said actual gear, and with respect to the same transmission speed sample, whether said next lower gear is higher than said minimum gear and whether the transmission speed is below the predetermined downshift speed point for said next lower gear, and
   (b) if both conditions are determined to exist with respect to the lower gear being considered, repeating such step with respect to progressively lower gears until a determination is made that at least one of such conditions is not met with respect to the gear being considered,
   (c) determining that the gear being considered is the lowest gear to which said transmission may be shifted when a determination is made that at least one of such conditions is not met with respect to such gear being considered.

19. The method as set forth in claim 10 and further including:
   (c) determining when step (b)(3)(a) has been performed with respect to a predetermined number of consecutive transmission speed samples,
   (d) shifting said transmission from said actual gear to the lowest gear determined in a selected one of said (b)(3)(a) steps when the determination in step (h) has been made.

20. The method as set forth in claim 10 and further including:
   (c) determining when step (b)(3)(a) has been performed with respect to at least three consecutive transmission speed samples,
   (d) shifting said transmission from said actual gear to the lowest gear determined in a selected one of said (b)(3)(a) steps when the determination in step (h) has been made.

21. The method as set forth in claim 20, and further including:
   (e) operating said transmission in direct mechanical drive when said transmission is in a gear higher than said minimum gear,
   (f) operating said transmission in torque converter drive while carrying out the shifting step (d) and for a predetermining period of time following completion of said shifting step and thereafter returning said transmission to operation in direct mechanical drive.

22. In a method of controlling the shifting of a transmission having a plurality of gears in an automatic range progressively increasing in ratio from a minimum gear to a maximum gear, said transmission having a gear-selector cane associated therewith for selecting the maximum operating gear in said range, the steps of:
   (a) predetermining the upshift and downshift transmission speed points for each of said gears and providing for the generation of separate signals indicative of each of said speed points,
   (b) generating separate signals indicative of said minimum gear, said maximum operating gear and the actual gear which said transmission is in,
   (c) periodically sampling the instantaneous actual speed of said transmission and generating a speed signal indicative of the transmission speed each time such speed is sampled,
   (d) comparing said actual gear signal and said minimum gear signal each time the transmission speed is sampled,
   (e) comparing said actual gear signal and said maximum operating gear signal each time the transmission speed is sampled,
   (f) comparing said transmission speed signal with at least one of the speed point signals for said actual gear each time the transmission speed is sampled,
   (g) each time the transmission speed is sampled, and from said comparisons of said gear signals and speed signals existing at such time:
      (1) determining whether the actual gear is higher than said maximum operating gear selected by said cane, and,
         (a) if so, determining whether the transmission speed is below the downshift speed point for the actual gear, and,
            (1) if so, determining the lowest gear to which said transmission may be shifted,
            (2) if not, repeat steps (d)–(g) at the next time said transmission speed is sampled,
         (b) if not,
      (2) determining whether the actual gear is below said selected maximum operating gear and the transmission speed is above the upshift speed point for the actual gear, and,
         (a) if so, determining the highest gear to which said transmission may be shifted,
         (b) if not,
      (3) determining whether the actual gear is above said minimum gear and the transmission speed is below the downshift speed point for the actual gear, and,
         (a) if so, determining the lowest gear to which said transmission may be shifted,
         (b) if not, repeat steps (d)–(g) at the next time said transmission speed is sampled.

23. The method as set forth in claim 22 wherein step (g)(1)(a)(1) comprises:
   (a) generating a gear signal indicative of the gear next lower than said actual gear,
   (b) comparing said next-lower gear signal and said maximum operating gear,
   (c) comparing the same transmission speed signal used in step (g)(1) with the downshift speed point signal for said next-lower gear,
   (d) determining from said comparison whether said next-lower gear is greater than said maximum operating gear and whether the transmission speed is below the downshift speed point for said next-lower gear, and
(1) if both conditions are determined to exist with respect to said lower gear, repeating steps (g)(1)(a)(1)(a)–(d) with progressively lower gears until a determination is made that one of such conditions does not exist with respect to the gear being considered,
(2) determining that the lower gear being considered is the lowest gear to which the transmission may be shifted when a determination is made with respect to such gear that one of such conditions does not exist.

24. The method as set forth in claim 22 and further including:
(h) determining when step (a)(1)(a)(1) has been performed with respect to a predetermined number of consecutive transmission speed samples,
(i) shifting said transmission from said actual gear to the lowest gear determined in a selected one of said (g)(1)(a)(1) steps when the determination in step (h) has been made.

25. The method as set forth in claim 22 wherein step (g)(2)(a) comprises:
(1) generating a gear signal indicative of the gear next-higher than said actual gear,
(2) comparing said next-higher gear signal and said maximum operating gear,
(3) comparing the same transmission speed signal used in step (g)(2) with the upshift speed point signal for said next-higher gear,
(4) determining from said comparison whether said next-higher gear is lower than said maximum operating gear and whether the transmission speed is above the downshift speed point for said next-lower gear, and
(a) if both conditions are determined to exist with respect to said lower gear, repeating steps (g)(2)(a)(1)–(4) with progressively higher gears until a determination is made that one of such conditions does not exist with respect to the gear being considered,
(b) determining that the higher gear being considered is the highest gear to which the transmission may be shifted when a determination is made with respect to such gear that one of such conditions does not exist.

26. The method as set forth in claim 22 and further including:
(h) determining when step (g)(2)(a) has been performed with respect to a predetermined number of consecutive transmission speed samples,
(i) shifting said transmission from said actual gear to the highest gear determined in a selected one of said (g)(2)(a) steps when the determination in step (h) has been made.

27. The method as set forth in claim 26 and further including:
(j) periodically sampling the instantaneous actual engine speed,
(k) generating an overspeed signal in the event any sample of such actual engine speed exceeds a predetermined value,
(l) immediately upshifting the transmission one gear in response to the generation of said overspeed signal.

28. The method as set forth in claim 27 and further including:
(m) inhibiting upshifting of said transmission in response to said overspeed signal when said transmission is operating in said maximum operating gear.

29. The method as set forth in claim 22 wherein step (g)(3)(a) comprises:
(a) generating a gear signal indicative of the gear next-lower than said actual gear,
(b) comparing said next-lower gear signal and said minimum gear,
(c) comparing the same transmission speed signal used in step (g)(3) with the downshift speed point signal for said next-lower gear,
(d) determining from said comparison whether said next-lower gear is above said minimum gear and whether the transmission speed is below the downshift speed point for said next-lower gear, and
(1) if both conditions are determined to exist with respect to said lower gear, repeating steps (g)(3)(a)(1)–(4) with progressively lower gears until a determination is made that one of such conditions does not exist with respect to the gear being considered,
(2) determining that the lower gear being considered is the lowest gear to which the transmission may be shifted when a determination is made with respect to such gear that one of such conditions does not exist.

30. The method as set forth in claim 22 and further including:
(h) determining when step (g)(3)(a) has been performed with respect to a predetermined number of consecutive transmission speed samples,
(i) shifting said transmission from said actual gear to the lowest gear determined in a selected one of said (g)(3)(a) steps when the determination in step (h) has been made.

31. The method as set forth in claim 22 and wherein a determination has been made in step (g) of a gear to which the transmission should be shifted, the further steps of:
(h) comparing said actual gear signal with the signal fo the determined gear found in step (g),
(i) generating a shift signal for as long as the actual and determined gear signals are dissimilar,
(j) shifting said transmission in response to said shift signal from the existing actual gear towards said determined gear,
(k) generating new actual gear signals indicative of new positions of said transmission as said transmission is shifted,
(l) comparing said new actual gear signals with said determined gear signal,
(m) discontinuing said shifting when the gear signal comparison of the preceding step is indicative that the new transmission position is the same as said determined gear.

32. The method as set forth in claim 22 and further including:
operating said transmission in direct mechanical drive only when said transmission is in a gear higher than said minimum gear,
predetermining a transmission speed reference point for changing from torque converter drive to direct mechanical drive when operating in said minimum gear and providing for the generation of a speed reference signal for such transmission speed point, comparing said actual transmission speed sample signals with said speed reference signal when said transmission is operating in said minimum gear, operating said transmission in torque converter drive when the comparison of the preceding step is indicative that the actual transmission speed is less than said speed reference and operating said transmission in direct mechanical drive when said comparison is indicative that said actual transmission speed is greater than said speed reference.

33. The method of shifting a transmission having a plurality of gears in an automatic range progressively increasing in ratio from a minimum gear to a maximum gear, said transmission having a gear-selector cane associated therewith for selecting a maximum operting gear in said range, said method comprising:

(a) predetermining the upshift and downshift transmission speed points for each of said gears and providing for the generation of separate signals indicative of each of said speed points, (b) generating separate signals indicative of said minimum gear and said maximum operating gear, (c) generating a signal indicative of the actual gear that said transmission is in, (d) periodically sampling the instantaneous actual speed of said transmission and generating a speed sample signal indicative of each speed sample, (e) comparing said actual gear signal with said minimum and maximum operating gear signals, (f) comparing one of said speed sample signals with at least one of the shift speed point signals for said actual gear, (g) determining from the comparisons of steps (e) and (f) if either of the following two conditions exist:
  (1) the gear signals are indicative that the actual gear is lower than the maximum operating gear and the speed signals are indicative that the transmission speed is above the upshift speed point for the actual gear,
  (2) the gear signals are indicative that the actual gear is higher than the minimum gear and the speed signals are indicative that the transmission speed is below the downshift speed point for the actual gear, and, if so, carry out one of the steps (h) or (i), (h) if a determination is made in step (g) that the condition (g)(1) exists, the further steps of:
  (1) generating gear signals indicative of gears progressively higher than said actual gear and comparing said gear signals with the maximum gear signal, and comparing the same said speed sample signal with the upshift speed point signals for such progressively higher gears,
  (2) finding the first of said progressively higher gears wherein either a gear signal comparison is indicative that said higher gear is the same as said maximum operating gear, or a speed signal comparison is indicative that the upshift speed point of said higher gear is higher than said transmission speed, said higher gear found being the desired gear to which said transmission should be shifted,
  (3) shifting said transmission from said actual gear to said desired gear found in step (h)(2), (i) if a determination is made in step (g) that the condition (g)(2) exists, the further steps of:
  (1) generating gear signals indicative of gears progressively lower than said actual gear and comparing said signals with the minimum gear signal, and comparing the same speed sample signal with the downshift speed point signals for said progressively lower gears,
  (2) finding the first of said progressively lower gears wherein either a gear signal comparison is indicative that said lower gear is the same as said minimum gear, or a speed signal comparison is indicative that the downshift speed point of said lower gear is lower than said transmission speed, said lower gear found being the desired gear to which said transmission should be shifted,
  (3) shifting said transmission from said actual gear to said desired gear found in step (i)(2).

34. The method as set forth in claim 33, wherein step (h) further includes, subsequent to step (h)(2), repeating steps (e), (f), (g), (h)(1) and (h)(2) with each of a number of subsequent speed sample signals, and carrying out step (h)(3) with respect to the desired gear found in a selected one of the (h)(2) steps, when, and only when, the condition (g)(1) exists with respect to each of a predetermined number of consecutive speed samples, and wherein step (i) further includes, subsequent to step (i)(2), repeating steps (e), (f), (g), (i)(1) and (i)(2) with each of a number of subsequent speed samples and carrying out step (i)(3) with respect to the desired gear found in a selected one of the (i)(2) steps, when, and only when, the condition (g)(2) exists with respect to each of a predetermined number of consecutive speed samples.

35. The method as set forth in claim 34 and further including:

periodically sampling the instantaneous actual engine speed, generating an overspeed signal in the event any sample of such actual engine speed exceeds a predetermined value, overriding the carrying out of step (h) and immediately upshifting the transmission one gear in response to the generation of said overspeed signal.

36. The method as set forth in claim 35 and further including:

inhibiting upshifting of said transmission in response to said overspeed signal when said transmission is operating in said maximum gear.

37. The method as set forth in claim 34, wherein step (h) includes inhibiting the carrying out of step (h)(3) if the desired gear found in the (h)(2) steps with respect to each of said predetermined number of consecutive speed samples is progressively decreasing, and wherein step (i) includes inhibiting the carrying out of step (i)(3) if the desired gear found in the (i)(2) steps with respect to each of said predetermined number of consecutive speed samples is progressively increasing.

38. The method as set forth in claim 34, wherein in step (h) the predetermined number of consecutive speed samples is three and wherein step (h) further includes selecting the desired gear for use in step (h)(3) from those found in the (h)(2) steps as follows: selecting as the desired gear that found in the (h)(2) step carried out with respect to the second of the three consecutive speed samples, unless such desired gear is higher than that found in the (h)(2) steps carried out with respect to both the first and third of said three consecutive speed samples, in which event selecting the desired gear found in the (h)(2) step carried out with respect to said third speed sample, and wherein in step (i) the predetermined number of consecutive speed samples is three and wherein step (i) further includes selecting the desired gear for use in step (i)(3) from those found in the (i)(2) steps as follows: selecting as the desired gear that found in the (i)(2) step carried out with respect to the second of the three consecutive speed samples, unless such desired gear is lower than that found in the (i)(2) steps carried out with respect to both the first and third of said three consecutive speed samples, in which event selecting the desired gear found in the (h)(2) step carried out with respect to said third speed sample.

39. The method as set forth in claim 38, wherein step (h) further includes inhibiting the carrying out of step (h)(3) if the desired gear found in each of the (h)(2) steps carried out with respect to said three consecutive speed samples is progressively decreasing, and wherein step (i) further includes inhibiting the carrying out of step (i)(3) if the desired gear found in each of the (i)(2) steps carried out with respect to said three consecutive speed samples is progressively increasing.

40. The method as set forth in claim 33, wherein step (g) further includes initially determining from the comparison of step (e) whether:

(g)(3) the gear signals are indicative that the actual gear is higher than the maximum operating gear, and (i) if not, proceeding with the determination of the conditions (g)(1) and (g)(2) of step (g), (ii) if so, omitting the determination of the conditions (g)(1) and (g)(2) of step (g) and, instead, determining from the comparison of step (f) whether:

(g)(4) the speed signals are indicative that the transmission speed is lower than the downshift speed point for the actual gear, and (i) if not, repeat steps (e), (f) and (g) with subsequent speed sample signals until such time as step (g)(4) is indicative that the transmission speed is lower than the downshift speed point for the actual gear, (ii) if so, carry out the following step (j), (j)(1) generating gear signals indicative of gears progressively lower than said actual gear and comparing said signals with the maximum operating gear signal and comparing the last-used speed sample signal with the downshift speed point signals for such progressively lower gears, (j)(2) finding the first of said progressively lower gears wherein either a gear signal comparison is indicative that said lower gear is the same as said maximum operating gear, or a speed signal comparison is indicative that the downshift speed point of said lower gear is lower than said transmission speed, said lower gear being the desired gear to which said transmission should be shifted, (j)(3) shifting said transmission from said actual gear to said desired gear found in step (j)(2).

41. The method as set forth in claim 40, wherein step (j) further includes, subsequent to step (j)(2) and prior to step (j)(3), repeating steps (e), (f), (g), (j)(1) and (j)(2) with subsequent speed sample signals and carrying out step (j)(3) with respect to the desired gear found in a selected one of the (j)(2) steps, when, and only when, the conditions (g)(3) and (g)(4) exist with respect to each of a predetermined number of consecutive speed samples.

42. The method as set forth in claim 33, and wherein a desired gear has been found in one of steps (h) or (i) and wherein the shifting portion of such step comprises:

comparing said actual gear signal with the signal for said desired gear found, generating a shift signal for as long as the actual and desired gear signals are dissimilar, shifting said transmission in response to said shift signal from the existing actual gear towards said desired gear, generating new actual gear signals indicative of new positions of said transmission as said transmission is shifted, comparing said new actual gear signals with said desired gear signal, discontinuing said shifting when the gear signal comparison of the preceding step is indicative that the new transmission position is the same as said desired gear.

43. The method as set forth in claim 33 and further including:

repeating the steps of claim 33, after the transmission has been shifted, with subsequent speed sample signals and with the gear to which said transmission has been shifted being the actual gear for the repeated steps.

44. The method as set forth in claim 43 and further including the step of delaying for a predetermined period of time following a shift of said transmission before said steps of claim 33 are repeated.

45. The method as set forth in claim 33 and further including:

generating a hold signal, inhibiting the step of shifting from said actual gear to a desired gear found in carrying out the steps of claim 33 for as long as said hold signal is present, repeating the steps of claim 33, save for a shifting step, with respect to each of subsequent speed sample signals generated during the time that said hole signal is present, removing the shifting inhibition when said hold signal ceases.

46. The method as set forth in claim 45, and further including:

periodically sampling the instantaneous engine speed, generating an underspeed signal in the event a sample of said engine speed is indicative that said engine speed is below a predetermined value, preventing said hold signal from further inhibiting shifting in the event said underspeed signal is generated.

47. The method as set forth in claim 33, and further including:

operating said transmission in direct mechanical drive when said transmission is in a gear higher than said minimum gear, operating said transmission in torque converter drive while carrying out the shifting step (h)(3) or (i)(3) and for a predetermining period of time following completion of said shifting step and thereafter returning said transmission to operation in direct mechanical drive.

48. The method as set forth in claim 33 and further including:
operating said transmission in direct mechanical drive only when said transmission is in a gear higher than said minimum gear,
predetermining a transmission speed reference point for changing from torque converter drive to direct mechanical drive when operating in said minimum gear and providing for the generation of a speed reference signal for such transmission speed point,
comparing said actual transmission speed sample signals with said speed reference signal when said transmission is operating in said minimum gear,
operating said transmission in torque converter drive when the comparison of the preceding step is indicative that the actual transmission speed is less than said speed reference and operating said transmission in direct mechanical drive when said comparison is indicative that said actual transmission speed is greater than said speed reference.

49. The method as set forth in claim 48, and further including:
operating said transmission in torque converter drive while carrying out a step of shifting from an actual gear to a desired gear and for a predetermining period of time following completion of such shifting step and thereafter returning said transmission to operation in direct mechanical drive.

50. The method as set forth in claim 33 and further including:
periodically sampling the instantaneous actual engine speed,
generating an overspeed signal in the event any sample of such actual engine speed exceeds a predetermined value,
immediately upshifting the transmission one gear in response to the generation of said overspeed signal.

51. The method as set forth in claim 50 and further including:
inhibiting upshifting of said transmission in response to said overspeed signal when said transmission is operating in said maximum gear.

52. A control for a system including an engine and a transmission coupled to the output of said engine, said transmission having a plurality of gears in an automatic range which progressively increase in ratio from a preselected minimum automatic gear, said transmission having associated therewith an operator-controllable gear-selecting cane for selecting any of the gears of said transmission in said range, said control comprising:
means for generating a plurality of speed point signals, each indicative of the predetermined upshift or downshift transmission speed point for each of said gears of said automatic range,
means for generating separate signals indicative of said minimum gear, said maximum operating gear and the actual gear which said transmission is in,
means for periodically sampling the instantaneous speed of said transmission and for generating an actual speed signal indicative of the transmission speed each time such speed is sampled,
first comparator means for comparing said actual gear signal and said minimum gear signal each time the transmission speed is sampled,
second comparator means for comparing said actual gear signal and said maximum operating gear signal each time the transmission speed is sampled,
third comparator means for comparing said speed signal with at least one of the speed point signals for said actual gear each time the transmission is sampled,
gear-calculating means operable each time the transmission speed is sampled, and responsive to said first, second and third comparator means, said gear-calculating means including:
a first portion for determining whether the actual speed is above the upshift speed point for said actual gear when said actual gear is below said selected maximum operating gear, and, if so, for calculating the highest gear to which the transmission may be shifted, such highest gear being one immediately above a gear which is both lower than said maximum operating gear and has an upshift speed point lower than said actual speed, said highest gear being either said maximum operating gear or having an upshift speed point greater than said actual speed,
a second portion for determining whether the actual speed is below the downshift speed point for said actual gear when said actual gear is above said minimum gear, and, if so, for calculating the lowest gear to which the transmission may be shifted, such lowest gear being one immediately below a gear which is above said minimum gear and has a downshift speed point higher than said actual speed, said lowest gear being either said minimum gear or having a downshift speed point lower than said actual speed.

53. A control as set forth in claim 52, and wherein all of said means for generating signals indicative of gears and signals indicative of actual speed and speed points each include means for generating such signals in binary coded form.

54. A control as set forth in claim 52, wherein said means for generating speed point signals includes:
means for generating signals for each of said gears of said automatic range,
an addressable and programmable memory matrix, said matrix being programmed with predetermined upshift and downshift speed points for each of said gears and operable to produce signals corresponding to said speed points for a particular gear when a gear-indicative signal corresponding to such gear is addressed to said matrix.

55. Apparatus as set forth in claim 52, and further including:
means responsive to a calculation by said gear calculating means for shifting said transmission to the gear calculated thereby.

56. A control as set forth in claim 55 and further including:
means for generating a malfunction signal in response to a loss of actual speed signals,
means responsive to the generation of said malfunction signal for inhibiting shifting of said transmission from said actual gear to the gear calculated by said gear calculating means.

57. A control as set forth in claim 55, wherein said system includes a torque converter interposed between said engine output and said transmission, and means responsive to a lock-up clutch signal for actuating said torque converter to connect said transmission to said engine for direct mechanical drive when said signal is present and for actuating said torque converter to connect said transmission to said engine for torque converter drive when said signal is not present, said control further comprising:
means responsive to the operation of said transmission in any gear above said minimum gear for generating said lock-up clutch signal,
a timer means for generating a signal of predetermined duration in response to the initiation of a shift of said transmission,
means responsive to the presence of said timer signal for inhibiting the generation of said lock-up clutch signal during the duration of said timer signal.

58. A control as set forth in claim 55, and wherein said system includes a torque converter interposed between said engine output and said transmission, and means responsive to a lock-up clutch signal for actuating said torque converter to connect said transmission to said engine for direct mechanical drive when said signal is present and for actuating said torque converter to connect said transmission to said engine for torque converter drive when said signal is not present, said control further comprising:
means responsive to the operation of said transmission in any gear above said minimum gear for generating said lock-up clutch signal,
means for generating a speed reference signal when said transmission is operating in said minimum gear of said automatic range and for comparing said reference signal with said actual speed signals,
means for generating said lock-up clutch signal when said transmission is operating in said minimum gear and a comparison of said reference signal and said actual speed signals is indicative that the actual speed is greater than said reference speed and for inhibiting the generation of said lock-up clutch signal when said transmission is operating in said minimum gear and a comparison of said reference signal and said actual speed signals is indicative that the actual speed is less than said reference speed.

59. A control as set forth in claim 55, and wherein said system includes a torque converter interposed between said engine output and said transmission, and means responsive to a lock-up clutch signal for actuating said torque converter to connect said transmission to said engine for direct mechanical drive when said signal is present and for actuating said torque converter to connect said transmission to said engine for torque converter drive when said signal is not present, said control further comprising:
means responsive to the operation of said transmission in any gear above said minimum gear for generating said lock-up clutch signal,
a timer means for generating a signal of predetermined duration in response to the initiation of a shift of said transmission,
means responsive to the presence of said timer signal for inhibiting the generation of said lock-up clutch signal during the duration of said timer signal,
means for generating a speed reference signal when said transmission is operating in said minimum gear of said automatic range and for comparing said reference signal with said actual speed signals,
means for generating said lock-up clutch signal when said transmission is operating in said minimum gear and a comparison of said reference signal and said actual speed signals is indicative that the actual speed is greater than said reference speed and for inhibiting the generation of said lock-up clutch signal when said transmission is operating in said minimum gear and a comparison of said reference signal and said actual speed signals is indicative that the actual speed is less than said reference speed.

60. A control as set forth in claim 55 and further including:
a hold switch,
means for generating a hold signal when said hold switch is operated,
means responsive to the presence of said hold signal for inhibiting the shifting of said transmission from said actual gear to a calculated gear for as long as said hold signal is present.

61. A control as set forth in claim 60, and further including:
means for periodically determining the actual speed of said engine and for producing an underspeed signal when the speed of said engine is less than a predetermined limit,
means responsive to the production of said underspeed signal for terminating said hold signal to remove the inhibition of shifting when said underspeed signal is produced.

62. Apparatus aa set forth in claim 52, and further including:
means for counting the number of times that said portions of said gear-calculating means have made gear calculations and for generating a control signal when one of said portions has made a gear calculation with respect to each of a predetermined number of consecutive samplings of said transmission speed,
means responsive to said control signal for shifting said transmission to the gear calculated by said one portion of said gear-calculating means with respect to a selected one of said consecutive samplings of said transmission speed.

63. A control as set forth in claim 62 and further including:
means for periodically determining the speed of said engine and for generating an overspeed signal in the event the speed of said engine exceeds a predetermined limit,
means for continuously generating an actual-plus-one gear signal indicative of one gear higher than said actual gear,
means responsive to the generation of said overspeed signal for immediately upshifting said transmission to the gear indicated by said actual-plus-one gear signal.

64. A control as set forth in claim 62 and further including:
means responsive to the initiation of a shift of said transmission for generating an anti-hunt signal of predetermined duration,
means responsive to the presence of said anti-hunt signal for inhibiting the generation of said control signal by said counting means during the duration of said anti-hunt signal.

65. Apparatus as set forth in claim 52 wherein said gear-calculating means further includes:
a third portion for determining whether the actual speed is below the downshift speed point for said actual gear when said actual gear is above said selected maximum operating gear, and, if so, for calculating the lowest gear to which the transmission may be shifted, said lowest gear being one immediately below a gear which is above said maximum operating gear and has a downshift speed point higher than said actual speed, said lowest gear being either said maximum operating gear or having a downshift speed point lower than said actual speed.

66. Apparatus as set forth in claim 65 and further including:
means responsive to a calculation by said gear calculating means for shifting said transmission to the gear calculated thereby.

67. Apparatus as set forth in claim 65, and further including:
means for counting the number of times that said portions of said gear-calculating means have made gear calculations and for generating a control signal when one of said portions has made a gear calculation with respect to each of a predetermined number of consecutive samplings of said transmission speed,
means responsive to said control signal for shifting said transmission to the gear calculated by said one portion of said gear-calculating means with respect to a selected one of said consecutive samplings of said transmission speed.

68. A control as set forth in claim 66 wherein said transmission has a neutral position and wherein said gear-selecting cane is operable to select said neutral position, said control further including:
means for generating a neutral position command signal in immediate response to selection of said neutral position by said gear-selecting cane,
means responsive to generation of said neutral position command signal for immediately shifting said transmission to said neutral position.

69. A control as set forth in claim 66 and wherein said transmission has a reverse gear lower than said automatic range and wherein said gear-selecting cane is operable to select said reverse gear, said control further including:
means responsive to the selection of said reverse gear by said cane for generating a reverse gear command signal,
means operable when said actual gear is in said automatic range at the time said reverse gear is selected by said cane for delaying generation of said reverse command signal until such time as said transmission has been downshifted to said minimum gear of said automatic range and said actual speed is less than a predetermined low limit,
means responsive to generation of said reverse command signal for shifting said transmission to said reverse gear.

70. A control as set forth in claim 69 and further including:
means for generating an automatic-range command signal in response to selection of any gear in said automatic range by said gear-selecting cane,
means operable when said transmission is operating in said reverse gear at the time of selection by said cane of a gear in said automatic range for delaying generation of said automatic-range command signal until such time as said actual transmission speed is less than a predetermined low limit,
means responsive to generation of said automatic-range command signal for shifting said transmission to said minimum gear of said automatic range.

71. A control as set forth in claim 70 wherein said transmission has a neutral position and wherein said gear-selecting cane is operable to select said neutral position, said control further including:
means for generating a neutral position command signal in immediate response to selection of said neutral position by said gear-selecting cane,
means responsive to generation of said neutral position command signal for immediately shifting said transmission to said neutral position.

72. A control as set forth in claim 66 and wherein said transmission has a first forward gear lower than said automatic range and wherein said gear-selecting cane is operable to select said first forward gear, said control further including:
means responsive to the selection of said first forward gear by said cane for generating a first forward gear command signal,
means operable when said actual gear is in said automatic range at the time said first forward gear is selected by said cane for delaying generation of said first forward command signal until such time as said transmission has been downshifted to said minimum gear of said automatic range and said actual speed is less than a predetermined low limit,
means responsive to generation of said first forward command signal for shifting said transmission to said first forward gear.

73. Apparatus for upshifting a transmission having an automatic range comprising a plurality of gears progressively increasing in ratio from a minimum gear to a maximum gear, said apparatus comprising:
(a) means for generating an upshift speed point signal for each of the gears in said range,
(b) means for generating separate signals indicative of the actual gear that said transmission is in and of selected gears progressively higher than said actual gear,
(c) means for generating a signal indicative of said maximum gear,
(d) means for generating a speed signal indicative of the actual speed of said transmission,
(e) first comparator means for comparing said maximum gear signal separately with said signals for said actual gear and said progressively higher gears,
(f) second comparator means for comparing said transmission speed signal separately with the upshift speed point signals for said actual gear and said progressively higher gears,
(g) gear-determining means responsive to said first and second comparator means for determining the lowest gear wherein both of the following two conditions are met:
(1) such gear is less or equal to said maximum gear,
(2) such gear has an upspeed shift point higher than the actual transmission speed,
(h) means responsive to said gear-determining means for shifting said transmission from said actual gear to said lowest gear determined by said gear-determining means.

74. Apparatus for downshifting a transmission having an automatic range comprising a plurality of gears progressively increasing in ratio from a minimum gear to a maximum gear, said apparatus comprising:
(a) means for generating a downshift speed point signal for each of the gears in said range, (b) means for generating separate signals indicative of the actual gear that said transmission is in and of selected gears progressively lower than said actual gear, (c) means for generating a signal indicative of said minimum gear, (d) means for generating a speed signal indicative of the actual speed of said transmission, (e) first comparator means for comparing said minimum gear signal separately with said signals for said actual gear and said progressively lower gears, (f) second comparator means for comparing said transmission speed signal separately with the downshift speed point signals for said actual gear and said progressively higher gears, (g) gear-determining means responsive to said first and second comparator means for determining the highest gear wherein both of the following two conditions are met:
  (1) such gear is greater or equal to said minimum gear,
  (2) such gear has a downshift shift point lower than the actual transmission speed.

(h) means responsive to said gear-determining means for shifting said transmission from said actual gear to said highest gear determined by said gear-determining means.

75. A control as set forth in claim 74 and further including:
means for generating a malfunction signal in response to a loss of said actual speed signal,
means responsive to the generation of said malfunction signal for inhibiting shifting of said transmission from said actual gear to the gear calculated by said gear calculating means.

76. A control for a system including an engine and a transmission coupled to the output of said engine, said transmission having a plurality of gears in an automatic range which progressively increase in ratio from a preselected minimum automatic gear, said transmission having associated therewith an operator-controllable gear-selecting cane for selecting any of the gears of said transmission, said control comprising:
means for generating an actual gear signal uniquely indicative of the actual gear existing in said transmission and for maintaining said signal until such time as said transmission is shifted from such gear,
means for generating a cane signal uniquely indicative of the gear selected by said gear-selecting cane and for maintaining said signal until such time as the gear selection is changed,
means for establishing a series of successive operating cycles for said control,
means for generating an actual speed signal once for each cycle of operation and for maintaining said signal during the cycle for which it is generated, each such speed signal being indicative of the actual transmission speed when such speed signal is generated,
means for producing gear test signals indicative of said actual gear and of gears progressively higher than said actual gear,
a first comparator means for comparing and determining the relationship of selected of said gear test signals to said cane signal,
means responsive to said gear test signals for producing predetermined upshift speed point signals for each one of said gear test signals,
a second comparator means for comparing and determining the relationship of produced speed point signals to an actual speed signal,
an upshift test means operable during a cycle of operations and responsive to said first and second comparator means for (1) determining that an upshift condition exists when said first comparator means determines that said actual gear is below the gear selected by said cane and said second comparator means determines that the actual speed is greater than the upshift speed point for said actual gear, and for (2) determining the desired and lowest gear above said actual gear which either said first comparator means determines is the same as the gear selected by said cane or said second comparator means determines to have an upshift speed point above said actual speed, and for (3) generating a new gear signal during said cycle of operation when said desired gear has been determined.

77. A control as set forth in claim 76, and further including:
means responsive to said upshift test means and responsive to the generation of a new gear signal by said test means for shifting said transmission from said actual gear to the desired gear determined by said test means.

78. A control as set forth in claim 76, and further including:
storage means operatively associated with said automatic upshift and automatic downshift test means and responsive to the generation of a new gear signal thereby for storing a gear signal indicative of the desired gear determined by said test means,
counting means operatively associated with said upshift test means for generating a control signal when said test means has determined the existence of a shift condition in each of a predetermined number of successive cycles of operation of said control,
means responsive to the generation of said control signal for selecting one of the desired gear signals stored in said storage means and for shifting said transmission from said actual gear to the desired gear indicated by the selected desired gear signal.

79. A control as set forth in claim 78, and further including:
means for periodically determining the actual speed of said engine and for producing an overspeed signal if such speed exceeds a predetermined limit,
means responsive to said overspeed signal for causing an immediate upshift of said transmission.

80. A control for a system including an engine and a transmission coupled to the output of said engine, said transmission having a plurality of gears in an automatic range which progressively increase in ratio from a preselected minimum automatic gear to a maximum gear, said control comprising:
means for generating an actual gear signal uniquely indicative of the actual gear existing in said transmission and for maintaining said signal until such time as said transmission is shifted from such gear,
means for generating and maintaining a minimum gear signal uniquely indicative of said minimum gear of said automatic gear,
means for establishing a series of successive operating cycles for said control,
means for generating an actual speed signal once for each cycle of operation and for maintaining said signal during the cycle for which it is generated, each such speed signal being indicative of the actual transmission speed when such speed signal is generated, means for producing gear test signals indicative of said actual gear and of gears progressively lower than said actual gear, a first comparator means for comparing and determining the relationship of selected of said gear test signals to said minimum gear signal, means responsive to said gear test signals for producing predetermined downshift speed point signals for each one of said gear test signals, a second comparator means for comparing and determining the relationship of produced speed point signals to an actual speed signal, a downshift test means operable during a cycle of operations and responsive to said first and second comparator means for (1) determining that a downshift condition exists when said first comparator means determines that said actual gear is above said minimum gear and said second comparator means determines that the actual speed is below the downshift speed point for said actual gear, and for (2) determining the desired and highest gear below said actual gear which either said first comparator means determines is the same as said minimum gear or said second comparator means determines to have a downshift speed point below said actual speed, and for (3) generating a new gear signal during said cycle of operation when said desired gear has been determined.

81. A control as set forth in claim 80, and further including:

means responsive to said downshift test means, and responsive to the generation of a new gear signal by said test means for shifting said transmission from said actual gear to the desired gear determined by said test means.

82. A control as set forth in claim 81, and further including:

a hold switch, means for generating a hold signal when said hold switch is operated, means responsive to the presence of said hold signal for inhibiting the shifting of said transmission from said actual gear for as long as said hold signal is present.

83. A control as set forth in claim 82, and further including:

means for periodically determining the actual speed of said engine and for producing an underspeed signal when the speed of said engine is less than a predetermined limit, means responsive to the production of said underspeed signal for terminating said hold signal to remove the inhibition of shifting when said underspeed signal is produced.

84. A control as set forth in claim 80, and further including:

storage means operatively associated with said downshift test means and responsive to the generation of a new gear signal thereby for storing a gear signal indicative of the desired gear determined by said test means, counting means operatively associated with said downshift test means for generating a control signal when said test means has determined the existence of a shift condition in each of a predetermined number of successive cycles of operation of said control, means responsive to the generation of said control signal for selecting one of the desired gear signals stored in said storage means and for shifting said transmission from said actual gear to the desired gear indicated by the selected desired gear signal.

85. A control for a system including an engine and a transmission coupled to the output of said engine, said transmission having a plurality of gears in an automatic range which progressively increase in ratio from a preselected minimum automatic gear, said transmission having associated therewith an operator-controllable gear-selecting cane for selecting any of the gears of said transmission in said range, said control comprising:

means for generating an actual gear signal uniquely indicative of the actual gear existing in said transmission and for maintaining said signal until such time as said transmission is shifted from such gear, means for generating a cane signal uniquely indicative of the gear selected by said gear-selecring cane and for maintaining said signal until such time as the gear selection is changed, means for generating and maintaining a minimum gear signal uniquely indicative of said minimum gear of said automatic gear, means for establishing a series of successive operating cycles for said control, means for generating an actual speed signal once for each cycle of operation and for maintaining said signal during the cycle for which it is generated, each such speed signal being indicative of the actual transmission speed when such speed signal is generated, means for producing gear test signals indicative of said actual gear and of gears progressively higher and lower than said actual gear, a first comparator means for comparing and determining the relationship of selected of said gear test signals to said cane signal, a second comparator means for comparing and determining the relationship of selected of said gear test signals to said minimum gear signal, means responsive to said gear test signals for producing predetermined upshift and downshift speed point signals for each one of said gear test signals, a third comparator means for comparing and determining the relationship of produced speed point signals to an actual speed signal, an automatic upshift test means operable during a cycle of operations and responsive to said first and third comparator means for (1) determining that an upshift condition exists when said first comparator means determines that said actual gear is below the gear selected by said cane and said third comparator means determines that the actual speed is greater than the upshift speed point for said actual gear, and for (2) determining the desired and lowest gear above said actual gear which either first comparator means determines is the same as the gear selected by said cane or said third comparator means determines to have an upshift speed point above said actual speed, and for (3) generating a new gear signal during said cycle of operation when said desired gear has been determined, an automatic downshift test means operable during a cycle of operations and responsive to said second and third comparator means for (1) determining that a downshift condition exists when said second comparator means determines that said actual gear is above said minimum gear and said third comparator means determines that the actual speed is below the downshift speed point for said actual gear, and for (2) determining the desired and highest gear below said actual gear which either said second comparator means determines is the same as said minimum gear or said third comparator means determines to have a downshift speed point below said actual speed, and for (3) generating a new gear signal during said cycle of operation when said desired gear has been determined.

86. A control as set forth in claim 85 and further including:
means responsive to said automatic upshift test means and said automatic downshift test means, and responsive to the generation of a new gear signal by one of said test means for shifting said transmission from said actual gear to the desired gear determined by said one test means.

87. A control as set forth in claim 85, and further including:
storage means operatively associated with said automatic upshift and downshift test means and responsive to the generation of a new gear signal by one of said test means for storing a gear signal indicative of the desired gear determined by said test means,
counting means operatively associated with said automatic upshift and automatic downshift test means for generating a control signal when either one of said test means has itself determined the existence of a shift condition in each of a predetermined number of successive cycles of operation of said control,
means responsive to the generation of said control signal for selecting one of the desired gear signals stored in said storage means and for shifting said transmission from said actual gear to the desired gear indicated by the selected desired gear signal.

88. A control as set forth in claim 85, and further including:
a forced downshift test means operable during a cycle of operation of said control and responsive to said first and third comparator means for (1) determining that a forced downshift shift condition exists when said first comparator means determines that the actual gear is higher than the gear selected by said cane, and when said third comparator determines that the actual speed is below the downshift speed point for said actual gear, and for (2) determining from the determinations of said first and third comparator means the desired and highest gear below the actual gear which is either the same as the gear selected by said cane or which has a downshift speed point lower than the actual transmission speed, and for (3) generating a new gear signal during said cycle of operation when said desired gear is determined.

89. A control as set forth in claim 88 and further including:
means responsive to said forced downshift test means, said automatic upshift test means and said automatic downshift test means, and responsive to the generation of a new gear signal by one of said test means for shifting said transmission from said actual gear to the desired gear determined by said one test means.

90. A control as set forth in claim 88, and further including:
storage means operatively associated with said forced downshift, automatic upshift and automatic downshift test means and responsive to the generation of a new gear signal by one of said test means for storing a gear signal indicative of the desired gear determined by said test means,
counting means operatively associated with said forced downshift, automatic upshift and automatic downshift test means for generating a control signal when any one of said test means has itself determined the existence of a shift condition in each of a predetermined number of successive cycles of operation of said control,
means responsive to the generation of said control signal for selecting one of the desired gear signals stored in said storage means and for shifting said transmission from said actual gear to the desired gear indicated by the selected desired gear signal.

91. A control for a system including an engine and a transmission coupled to the output of said engine, said transmission having a plurality of gears in an automatic range which progressively increase in ratio from a preselected minimum automatic gear, said transmission having associated therewith an operator-controllable gear-selecting cane for selecting any of the gears of said transmission, said control comprising:
means for generating an actual gear signal uniquely indicative of the actual gear existing in said transmission and for maintaining said signal until such time as said transmission is shifted from such gear,
means for generating a cane signal uniquely indicative of the gear selected by said gear-selecting cane and for maintaining said signal until such time as the gear selection is changed,
means for generating and maintaining a minimum gear signal uniquely indicative of said minimum gear of said automatic gear,
means for establishing a series of successive operating cycles for said control,
means for generating an actual speed signal once for each cycle of operation and for maintaining said signal during the cycle for which it is generated, each such speed signal being indicative of the actual transmission speed when such speed signal is generated,
gear signal stepping means for producing a gear-indicative signal at the output thereof and operative when energized to incrementally increase or decrease said gear-indicative signal to indicate progressively higher or lower gears, respectively,
a first comparator means for comparing and determining the relationship between said gear-indicative signal of said stepping means and said cane signal,
a second comparator means for comparing and determining the relationship between said gear-indicative signal of said stepping means and said minimum gear signal,
means responsive to the gear-indicative signals of said stepping means for producing predetermined upshift and downshift speed point signals for each gear indicated by such gear-indicating signals, a third comparator means for comparing and determining the relation between a produced speed point signal and one of said actual speed signals, means operable in each cycle of operation of said control for initially setting said stepping means to produce a gear-indicative signal which is indicative of said actual gear, an automatic upshift test means operable during a cycle of operation of said control for (1) determining the existence of an upshift shift condition and energizing said stepping means to increase said gear-indicative signal by one each time during a cycle of operation that said first comparator determines that the gear then indicated by said stepping means is lower than the gear selected by said cane and said third comparator means determines that said actual speed is above the upshift speed point for said gear then indicated by said stepping means, and (2) for generating a new gear signal during the same cycle of operation and when said stepping means has been increased at least once and either said first comparator determines that the gear then indicated by said stepping means is the same as the gear selected by said cane, or said third comparator determines that said actual speed is less than the upshift speed point for said gear then indicated by said stepping means, an automatic downshift test means operable during a cycle of operation of said control for (1) determining the existence of a downshift shift condition and energizing said stepping means to decrease said gear-indicative signal by one each time during a cycle of operation that said second comparator determines that the gear then indicated by said stepping means is greater than said minimum gear and said third comparator means determining that said actual speed is below the downshift speed point for said gear then indicated by said stepping means, and (2) for generating a new gear signal during the same cycle of operation and when said stepping means has been increased at least once and either said second comparator determines that the gear then indicated by said stepping means is the same as said minimum gear, or said third comparator determines that said actual speed is greater than the downshift speed point for said gear then indicated by said stepping means.

92. A control as set forth in claim 91, and wherein all of said means for generating signals indicative of gears and signals indicative of actual speed and speed points each include means for generating such signals in binary coded form.

93. A control as set forth in claim 91 wherein said means for producing speed point signals comprises an addressable and programmable memory matrix, said matrix being addressed by said gear-indicative signals of said stepping means, and said memory matrix being programmed with predetermined upshift and downshift speed points for each of the gears of said automatic range whereby upshift and downshift speed point signals are producible for each, and in accordance with, the gear-indicative signal addressed to said matrix.

94. A control as set forth in claim 91 wherein said gear signal stepping means comprises a binary up/down counter.

95. A control as set forth in claim 91, and further including:

storage means responsive to the generation of a new gear signal for storing the calculated gear-indicative signal of said stepping means which is present when said new gear signal is generated, means for shifting said transmission from said actual gear to the gear indicated by the calculated gear-indicative signal stored in said storage means.

96. A control as set forth in claim 95 wherein said storage means comprises a plurality of serially arranged shift registers, the first of which is connected to receive gear-indicative signals from said stepping means, and includes means for shifting the calculated gear-indicative signals in said registers from one register to a successive register in response to the generation of a new gear signal, and further including means operable when said control signal of said counting means has been generated for selecting the calculated gear-indicative signal of one of said registers as indicative of the gear to which said transmission is to be shifted.

97. A control as set forth in claim 95 and further including:

a hold switch, means for generating a hold signal when said hold switch is operated, means responsive to the presence of said hold signal for inhibiting the shifting of said transmission from said actual gear for as long as said hold signal is present.

98. A control as set forth in claim 97, and further including:

means for periodically determining the actual speed of said engine and for producing an underspeed signal when the speed of said engine is less than a predetermined limit, means responsive to the production of said underspeed signal for terminating said hold signal to remove the inhibition of shifting when said underspeed signal is produced.

99. A control as set forth in claim 95 and further including:

means responsive to each actual speed signal for generating a malfunction signal in the event a speed signal is indicative that the actual transmission speed is less than a predetermined low reference limit, means responsive to the generation of said malfunction signal for inhibiting shifting of said transmission to the gear indicated by the calculated gear-indicative signal stored in said storage means.

100. A control as set forth in claim 95, and wherein said system includes a torque converter interposed between said engine output and said transmission, and means responsive to a lock-up clutch signal for actuating said torque converter to connect said transmission to said engine for direct mechanical drive when said signal is present and for actuating said torque converter to connect said transmission to said engine for torque converter drive when said signal is not present, said control further comprising:

means responsive to the operation of said transmission in any gear above said minimum gear for generating said lock-up clutch signal, means responsive to the presence of said timer signal for inhibiting the generation of said lock-up clutch signal during the duration of said timer signal, means for generating a speed reference signal when said transmission is operating in said minimum gear and for applying said speed reference to said third comparator means for comparison of said speed reference signal with each said actual speed signal, means responsive to said second and third comparator means for (a) generating said lock-up clutch signal when said second comparator means determines that said actual gear is the same as said minimum gear and said third comparator means determines that the actual speed is greater than said reference speed, and (b) for inhibiting generation of said lock-up clutch signal when said second comparator means determines that said actual gear is the same as said minimum gear and said third comparator determines that the actual speed is lower than said reference speed.

101. A control as set forth in claim 95, and wherein said system includes a torque converter interposed between said engine output and said transmission, and means responsive to a lock-up clutch signal for actuating said torque converter to connect said transmission to said engine for direct mechanical drive when said signal is present and for actuating said torque converter to connect said transmission to said engine for torque converter drive when said signal is not present, said control further comprising:

means responsive to the operation of said transmission in any gear above said minimum gear for generating said lock-up clutch signal, a timer means for generating a signal of predetermined duration in response to the initiation of a shift of said transmission, means responsive to the presence of said timer signal for inhibiting the generation of said lock-up clutch signal during the duration of said timer signal, means for generating a speed reference signal when said transmission is operating in said minimum gear of said automatic range and for comparing said reference signal with said actual speed signals, means for generating said lock-up clutch signal when said transmission is operating in said minimum gear and a comparison of said reference signal and said actual speed signals is indicative that the actual speed is greater than said reference speed and for inhibiting the generation of said lock-up clutch signal when said transmission is operating in said minimum gear and a comparison of said reference signal and said actual speed signals is indicative that the actual speed is less than said reference speed.

102. A control as set forth in claim 91, and further including:

means responsive to the generation of a new gear signal for storing the gear-indicative signal of said stepping means which is present when said new gear signal is generated, a fourth comparator means for comparing and determining the relationship between said stored gear-indicative signal and said actual gear signal and for producing an upshift signal when, and for as long as, the gear indicated by said stored gear-indicative signal is higher than said actual gear and for producing a downshift signal when, and for as long as, the gear indicated by said stored gear-indicative signal is lower than said actual gear, means for applying the stored gear-indicative signal to said fourth comparator means, means for upshifting said transmission in response to the presence of said upshift signal and for downshifting said transmission in response to the presence of said downshift signal.

103. A control as set forth in claim 102, and wherein said system includes a torque converter interposed between said engine output and said transmission, and means responsive to a lock-up clutch signal for actuating said torque converter to connect said transmission to said engine for direct mechanical drive when said signal is present and for actuating said torque converter to connect said transmission to said engine for torque converter drive when said signal is not present, said control further comprising:

means responsive to the operation of said transmission in any gear above said minimum gear for generating said lock-up clutch signal, a timer means responsive to the production of either an upshift signal or a downshift signal for generating a signal of predetermined duration, means responsive to the presence of said timer signal for inhibiting the generation of said lock-up clutch signal during the duration of said timer signal.

104. A control as set forth in claim 102, and further including:

means responsive to the production of either an upshift signal or a downshift signal for generating an anti-hunt signal of predetermined duration, means responsive to the presence of said anti-hunt signal for inhibiting the determination of a new gear to which said transmission should be shifted until after the end of said anti-hunt signal.

105. A control as set forth in claim 91, and further including:

storage means operatively associated with said stepping means for storing the gear-indicative signal of said stepping means which is present during one of a predetermined number of successive operating cycles of said control and which is present during said one cycle at the time said new gear signal is generated during that cycle, counting means operatively associated with said automatic upshift and automatic downshift test means for generating a control signal when either one of said test means has itself determined the existence of a shift condition in each of a predetermined number of successive cycles of operation of said control, means responsive to the generation of said control signal for shifting said transmission from said actual gear to the gear indicated by the gear-indicative signal stored in said storage means.

106. A control as set forth in claim 105, and further including:

means for periodically determining the speed of said engine and for generating an overspeed signal in the event the speed of said engine exceeds a predetermined limit, means for continuously generating a gear signal indicative of one gear higher than said actual gear, means responsive to the generation of said overspeed signal for immediately applying said last-referred-to gear signal to said fourth comparator means in place of said stored gear-indicative signal.

107. A control as set forth in claim 91, and further including:

storage means operatively associated with said stepping means for storing the gear-indicative signal of said stepping means which is present during one of a predetermined number of successive operating cycles of said control and which is present during said one cycle of the time said new gear signal is generated during that cycle, counting means operatively associated with said automatic upshift and automatic downshift test means for generating a control signal when either one of said test means has itself determined the existence of a shift condition in each of a predetermined number of successive cycles of operation of said control, a fourth comparator means for comparing and determining the relationship between said stored gear-indicative signal and said actual gear signal and for producing an upshift signal when, and for as long as, the gear indicated by said stored gear-indicative signal is higher than said actual gear and for producing a downshift signal when, and for as long as, the gear indicated by said stored gear-indicative signal is lower than said actual gear, means for applying the stored gear-indicative signal to said fourth comparator means when said control signal of said counting means is generated, means for upshifting said transmission in response to the presence of said upshift signal and for downshifting said transmission in response to the presence of said downshift signal.

108. A control as set forth in claim 91 and further including:

a forced downshift test means operable during a cycle of operation of said control for (1) determining the existence of a forced downshift shift condition and energizing said stepping means to decrease said gear-indicative signal by one each time during a cycle of operation that said first comparator means determines that the gear then indicated by said stepping means is higher than the gear selected by said cane and said third comparator means determines that said actual speed is below the downshift speed point for said gear then indicated by said stepping means; and (2) for generating a new gear signal during the same cycle of operation of said control when either said first comparator means determines that the gear then indicated by said stepping means is the same as the gear selected by said cane, or said third comparator means determines that said actual speed is higher than the downshift speed point for the gear then indicated by said stepping means.

109. A control as set forth in claim 108, and further including:

means for inhibiting operation of said upshift test means during a cycle of operation of said control when said first comparator means determines that the gear initially indicated by said stepping means is higher than the gear selected by said cane.

110. A control as set forth in claim 108, and further including:

storage means responsive to the generation of a new gear signal for storing the gear-indicative signal of said stepping means which is present when said new gear signal is generated, means for shifting said transmission from said actual gear to the gear indicated by the gear-indicative signal stored in said storage means.

111. A control as set forth in claim 110, wherein said transmission has a neutral position and wherein said gear-selecting cane is operable to select said neutral position, said control further including:

means for generating a neutral position command signal in immediate response to the selection of said neutral position by said gear-selecting cane, means reponsive to the generation of said neutral position command signal for immediately shifting said transmission to said neutral position.

112. A control as set forth in claim 110, and wherein said transmission includes a reverse gear and wherein said gear-selecting cane is operable to select said reverse gear, said control further including:

means responsive to the selection of said reverse gear by said cane for generating a reverse gear command signal, means for generating a low speed limit signal when the actual speed signal is indicative that the actual transmission speed is less than a predetermined low limit, means operable when said actual gear is in said automatic range at the time said reverse gear is selected by said cane and responsive to said second comparator means and said low speed limit signal for delaying generation of said reverse command signal until such time as said second comparator means determines that said actual gear is the same as said minimum gear and said low speed limit signal has been generated, means responsive to the generation of said reverse command signal for shifting said transmission to said reverse gear.

113. A control as set forth in claim 112, and further including:

means for generating an automatic-range command signal in response to selection of any gear in said automatic range by said gear-selecting cane, means operable when said transmission is operating in said reverse gear for delaying generation of said automatic-range command signal until such time as said low speed limit signal is generated, means responsive to the generation of said automatic-range signal for shifting said transmission from said reverse gear to said minimum gear of said automatic range.

114. A control as set forth in claim 113, wherein said transmission has a neutral position and wherein said gear-selecting cane is operable to select said neutral position, said control further including:

means for generating a neutral position command signal in immediate response to the selection of said neutral position by said gear-selecting cane, means responsive to the generation of said neutral position command signal for immediately shifting said transmission to said neutral position.

115. A control as set forth in claim 110, and wherein said transmission includes a first forward gear lower than said automatic range and wherein said gear-selecting cane is operable to select said first forward reverse gear, said control further including:

means responsive to the selection of said first forward gear by said cane for generating a first forward gear command signal, means for generating a low speed limit signal when the actual speed signal is indicative that the actual transmission speed is less than a predetermined low limit, means operable when said actual gear is in said automatic range at the time said first forward gear is selected by said cane and responsive to said second comparator means and said low speed limit signal for delaying generation of said first forward command signal until such time as said second comparator means determines that said actual gear is the same as said minimum gear and said low speed limit signal has been generated, means responsive to the generation of said first forward command signal for shifting said transmission to said first forward gear.

116. A control as set forth in claim 108, and further including:

means responsive to the generation of a new gear signal for storing the gear-indicative signal of said stepping means which is present when said new gear signal is generated, a fourth comparator means for comparing and determining the relationship between said stored gear-indicative signal and said actual gear signal and for producing an upshift signal when, and for as long as, the gear indicated by said stored gear-indicative signal is higher than said actual gear and for producing a downshift signal when, and for as long as, the gear indicated by said stored gear-indicative signal is lower than said actual gear, means for applying the stored gear-indicative signal to said fourth comparator means, means for upshifting said transmission in response to the presence of said upshift signal and for downshifting said transmission in response to the presence of said downshift signal.

117. A control as set forth in claim 108, and further including:

storage means operatively associated with said stepping means for storing the gear-indicative signal of said stepping means which is present during one of a predetermined number of successive operating cycles of said control and which is present during said one cycle at the time said new gear signal is generated during that cycle, counting means operatively associated with said forced downshift, automatic upshift and automatic downshift test means for generating a control signal when any one of said test means has itself determined the existence of a shift condition in each of a predetermined number of successive cycles of operation of said control, means responsive to the generation of said control signal for shifting said transmission from said actual gear to the gear indicated by the gear-indicative signal stored in said storage means.

118. A control as set forth in claim 108, and further including:

storage means operatively associated with said stepping means for storing the gear-indicative signal of said stepping means which is present during one of a predetermined number of successive operating cycle of said control and which is present during said one cycle at the time said new gear signal is generated during that cycle, counting means operatively associated with said forced downshift, automatic upshift and automatic downshift test means for generating a control signal when any one of said test means has itself determined the existence of a shift condition in each of a predetermined number of successive cycles of operation of said control, a fourth comparator means for comparing and determining the relationship between said stored gear-indicative signal and said actual gear signal and for producing an upshift signal when, and for as long as, the gear indicated by said stored gear-indicative signal is higher than said actual gear and for producing a downshift signal when, and for as long as, the gear indicated by said stored gear-indicative signal is lower than said actual gear, means for applying the stored gear-indicative signal to said fourth comparator means when said control signal of said counting means is generated, means for upshifting said transmission in response to the presence of said upshift signal and for downshifting said transmission in response to the presence of said downshift signal.

119. A control as set forth in claim 118, wherein said transmission has a neutral position and wherein said gear-selecting cane is operable to select said neutral position, said control further including:

said means for generating an actual gear signal including means for generating an actual gear signal indicative of said neutral position of said transmission and indicative of said neutral position being lower than the gears of said automatic range, means responsive to the selection of said neutral position by said gear-selecting cane for generating a gear-indicative signal indicative of said neutral position, means for generating a neutral position command signal in immediate response to the selection of said neutral position by said gear-selecting cane, means responsive to the generation of said neutral position command signal for immediately shifting said transmission to said neutral position, means responsive to the generation of said neutral command signal for immediately applying said gear-indicative signal indicative of neutral position to said fourth comparator means in lieu of said stored gear-indicative signal for comparison of said neutral gear-indicative signal with said actual gear signal.

120. A control as set forth in claim 118, and wherein said transmission includes a reverse gear lower than said automatic range and wherein said gear-selecting cane is operable to select said reverse gear, said control further including:

said means for generating an actual gear signal further includes means for generating an actual gear signal indicative of said reverse gear when said transmission is actually in such gear, means for generating a reverse gear-indicative signal in response to selection of such gear by said gear-selecting cane, means for generating a reverse gear command signal in response to selection of such gear by said gear-selecting cane, means for generating a low speed limit signal when the actual speed signal is indicative that the actual transmission speed is less than a predetermined low limit, means operable when said actual gear is in said automatic range at the time said reverse gear is selected by said cane and responsive to said second comparator means and said low speed limit signal for delaying generation of said reverse command signal until such time as said second comparator means determines that said actual gear is the same as said minimum gear and said low speed limit signal has been generated, means responsive to the generation of said reverse command signal for applying said reverse gear-indicative signal to said fourth comparator means in lieu of a stored gear-indicative signal for comparison of said reverse gear-indicative signal with said actual gear signal.

121. A control as set forth in claim 120, and further including:
means for generating an automatic-range command signal in response to selection of any gear in said automatic range by said gear-selecting cane,
means operable when said transmission is operating in said reverse gear for delaying generation of said automatic-range command signal until such time as said low speed limit signal is generated,
means responsive to the generation of said automatic-range signal for shifting said transmission from said reverse gear to said minimum gear of said automatic range,
means responsive to the generation of said automatic-range signal for applying said minimum gear signal to said fourth comparator means for comparison with said actual gear signal.

122. A control as set forth in claim 121, wherein said transmission has a neutral position and wherein said gear-selecting cane is operable to select said neutral position, said control further including:
said means for generating an actual gear signal including means for generating an actual gear signal indicative of said neutral position of said transmission and indicative of said neutral position being lower than the gears of said automatic range,
means responsive to the selection of said neutral position by said gear-selecting cane for generating a gear-indicative signal indicative of said neutral position,
means for generating a neutral position command signal in immediate response to the selection of said neutral position by said gear-selecting cane,
means responsive to the generation of said neutral position command signal for immediately shifting said transmission to said neutral position,
means responsive to the generation of said neutral command signal for immediately applying said gear-indicative signal indicative of neutral position to said fourth comparator means in lieu of said stored gear-indicative signal for comparison of said neutral gear-indicative signal with said actual gear signal.

123. A control as set forth in claim 118, and wherein said transmission includes a first forward gear lower than said automatic range and wherein said gear-selecting cane is operable to select said first forward gear, said control further including:
said means for generating an actual gear signal further includes means for generating an actual gear signal indicative of said first forward gear when said transmission is actally in such gear,
means for generating a first forward gear-indicative signal in response to selection of such gear by said gear-selecting cane,
means for generating a first forward gear command signal in response to selection of such gear by said gear-selecting cane,
means for generating a low speed limit signal when the actual speed signal is indicative that the actual transmission speed is less than a predetermined low limit,
means operable when said actual gear is in said automatic range at the time said first forward gear is selected by said cane and responsive to said second comparator means and said low speed limit signal for delaying generation of said first forward command signal until such time as said second comparator means determines that said actual gear is the same as said minimum gear and said low speed limit signal has been generated,
means responsive to the generation of said first forward command signal for applying said first forward gear-indicative signal to said fourth comparator means in lieu of a stored gear-indicative signal for comparison of said first forward gear-indicative signal with said actual gear signal.

* * * * *